(12) United States Patent
Shikata

(10) Patent No.: US 8,791,983 B2
(45) Date of Patent: Jul. 29, 2014

(54) IMAGE PICKUP APPARATUS AND ASSOCIATED METHODOLOGY FOR GENERATING PANORAMIC IMAGES BASED ON LOCATION AND ORIENTATION INFORMATION

(75) Inventor: Yasuhito Shikata, Tokyo (JP)

(73) Assignee: Sony Corporation, Tokyo (JP)

(*) Notice: Subject to any disclaimer, the term of this patent is extended or adjusted under 35 U.S.C. 154(b) by 1145 days.

(21) Appl. No.: 12/730,523

(22) Filed: Mar. 24, 2010

(65) Prior Publication Data

US 2010/0302347 A1 Dec. 2, 2010

(30) Foreign Application Priority Data

May 27, 2009 (JP) ................................. 2009-127127

(51) Int. Cl.
*H04N 7/00* (2011.01)
*H04N 5/232* (2006.01)

(52) U.S. Cl.
CPC ................................. *H04N 5/23238* (2013.01)
USPC .......................................................... 348/36

(58) Field of Classification Search
CPC .................................................. H04N 5/23238
USPC .......................................................... 348/36
See application file for complete search history.

(56) References Cited

U.S. PATENT DOCUMENTS

| | | | |
|---|---|---|---|
| 6,486,908 B1 | 11/2002 | Chen et al. | |
| 6,563,529 B1 | 5/2003 | Jongerius | |
| 2003/0063089 A1 | 4/2003 | Chen et al. | |
| 2003/0063816 A1 | 4/2003 | Chen et al. | |
| 2006/0039693 A1 | 2/2006 | Lee et al. | |
| 2008/0063139 A1* | 3/2008 | Pantsar et al. | 378/40 |
| 2008/0074500 A1 | 3/2008 | Chen et al. | |

FOREIGN PATENT DOCUMENTS

| | | |
|---|---|---|
| EP | 1 628 474 A2 | 2/2006 |
| JP | 2000-76284 | 3/2000 |
| JP | 2001-154647 A | 6/2001 |
| JP | 2001-169223 | 6/2001 |
| JP | 2002-94870 A | 3/2002 |
| JP | 2002-185954 | 6/2002 |
| JP | 2005-26859 | 1/2005 |
| JP | 2005-122100 A | 5/2005 |
| JP | 2006-211105 A | 8/2006 |
| JP | 2007-267063 | 10/2007 |
| JP | 2008-243027 | 10/2008 |
| JP | 2008-288798 A | 11/2008 |
| NL | 9202047 | 6/1994 |

OTHER PUBLICATIONS

Partial European Search Report issued Oct. 24, 2012 in European Patent Application No. 10158670.9.

(Continued)

*Primary Examiner* — Sath V Perungavoor
*Assistant Examiner* — James Pontius
(74) *Attorney, Agent, or Firm* — Oblon, Spivak, McClelland, Maier & Neustadt, L.L.P.

(57) ABSTRACT

An imaging apparatus captures images of a subject and determines a location where each image is captured at the time of each image capture. The imaging apparatus also obtains the orientation at which an image is captured. With this information, the imaging apparatus generates a panoramic image by combining all of the captured images based on their corresponding capture locations and orientations. A location and orientation for the panoramic image is also calculated and recorded.

20 Claims, 34 Drawing Sheets

(56) References Cited

OTHER PUBLICATIONS

European Search Report issued Dec. 10, 2012, in Patent Application No. 10158670.9.
European Office Action issued Dec. 18, 2012, in Patent Application No. 10 158 670.9.

Angel D. Sappa, "Automatic Extraction of Planar Projections from Panoramic Range Images", Proceedings of the $2^{nd}$ International Symposium on 3D Data Processing, Visualization, and Transmission (3DPVT'04), XP 010725106, Sep. 6, 2004, pp. 231-234.

* cited by examiner

FIG. 3A
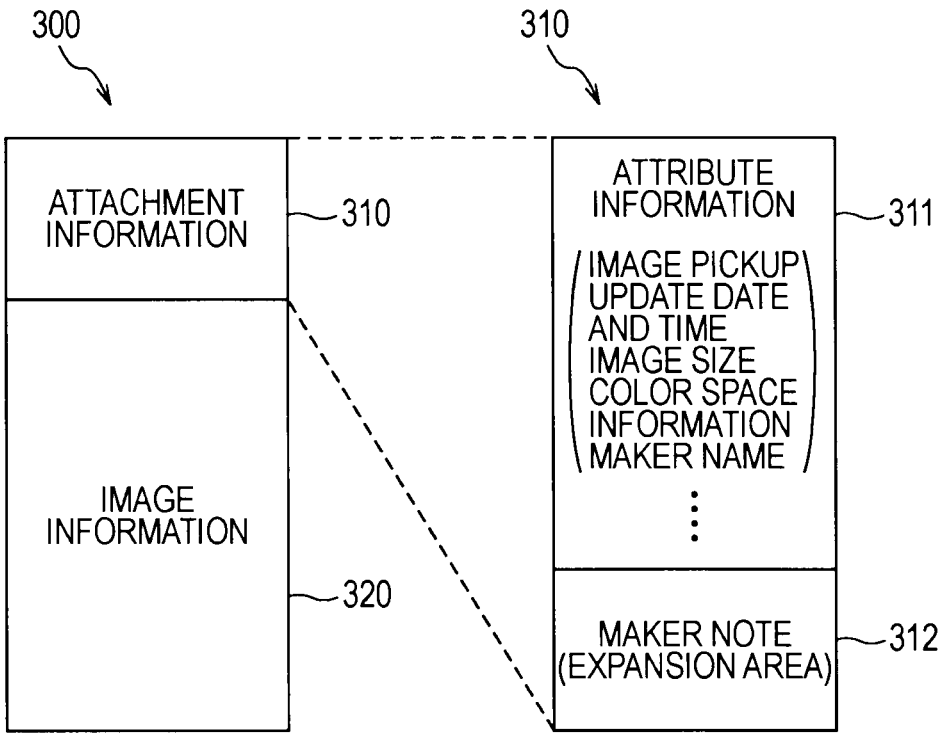
FIG. 3B
FIG. 3C
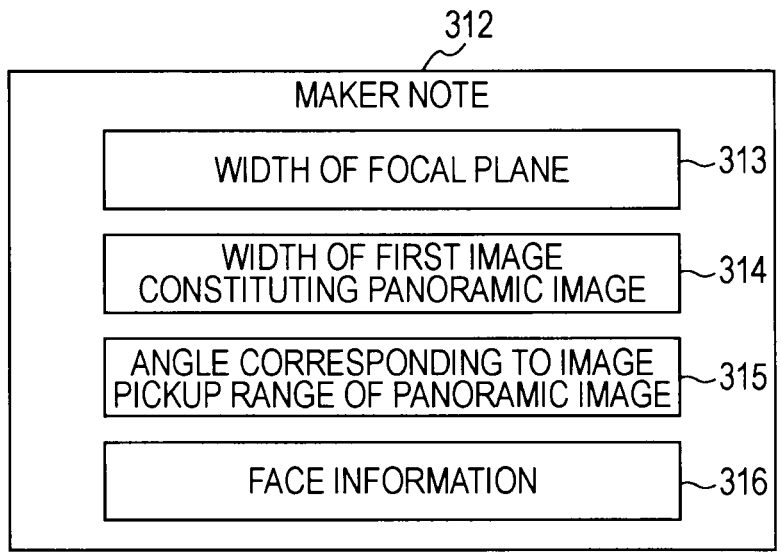

FIG. 15A
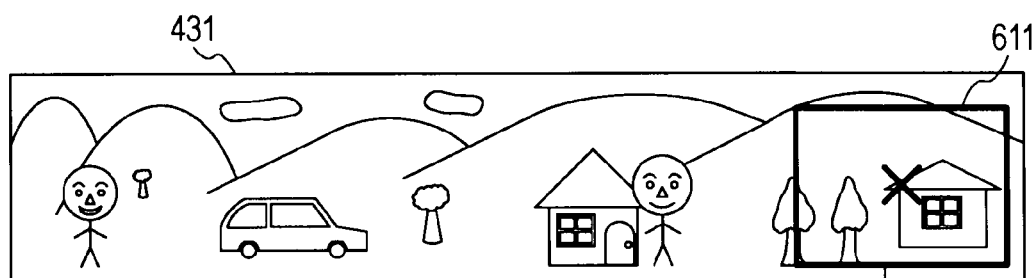
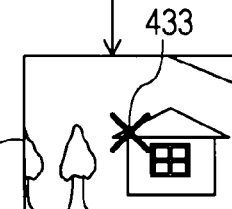
FIG. 15B
FIG. 15C
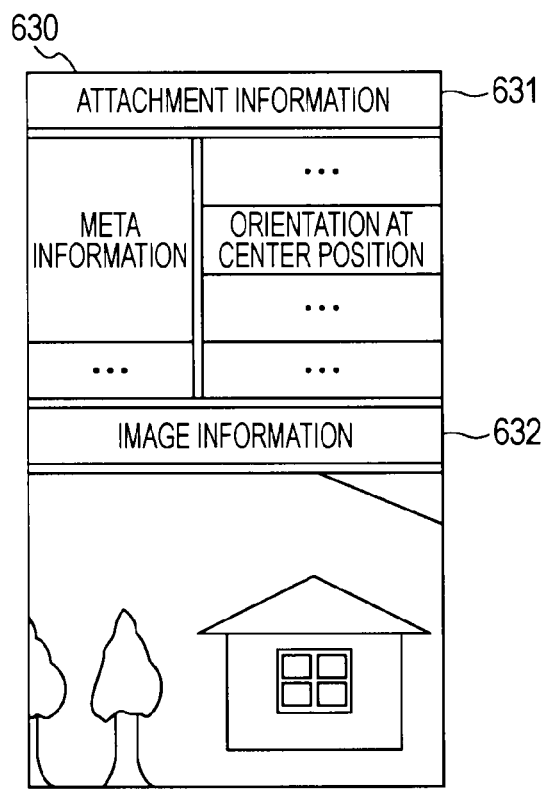

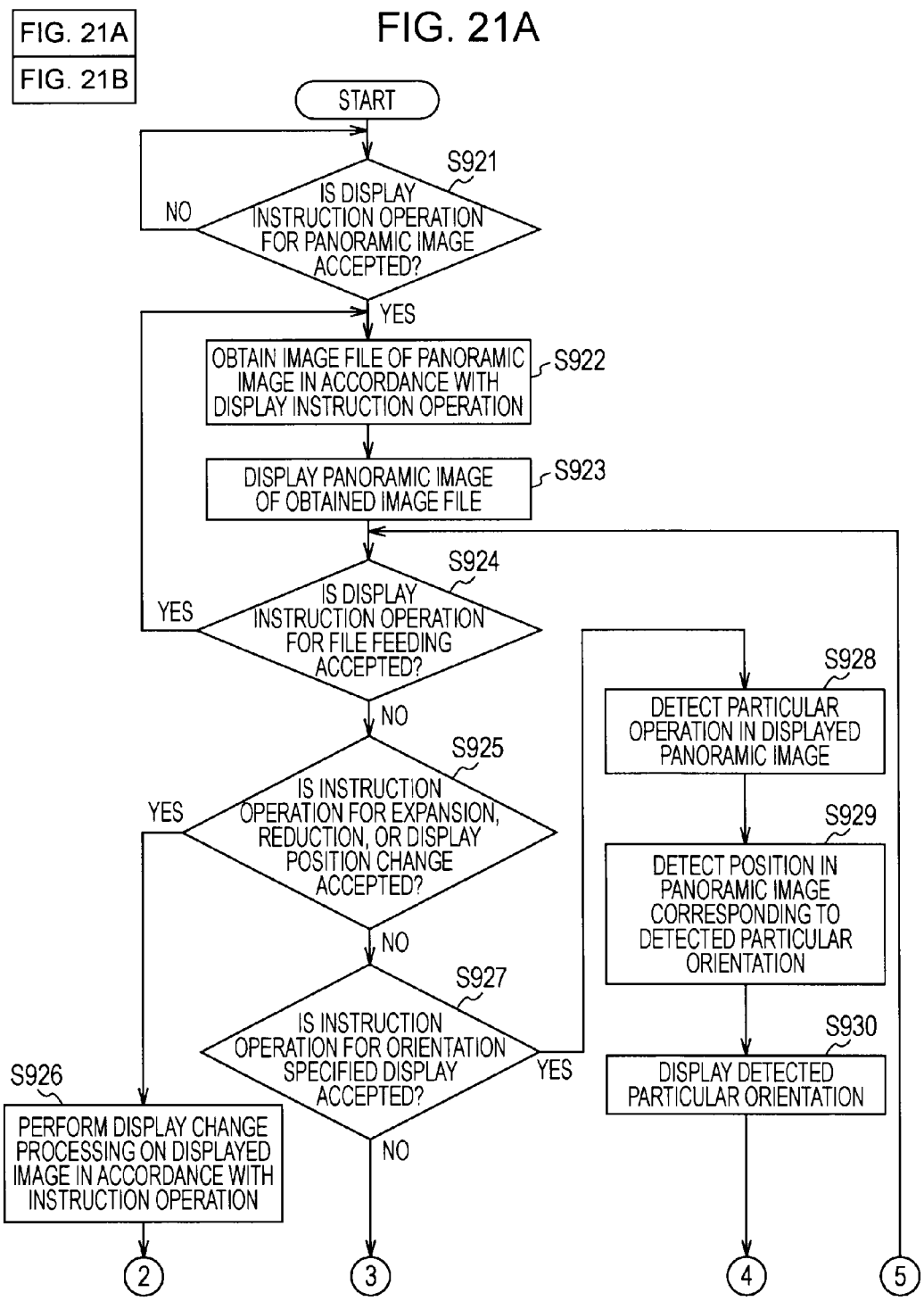

FIG. 24A
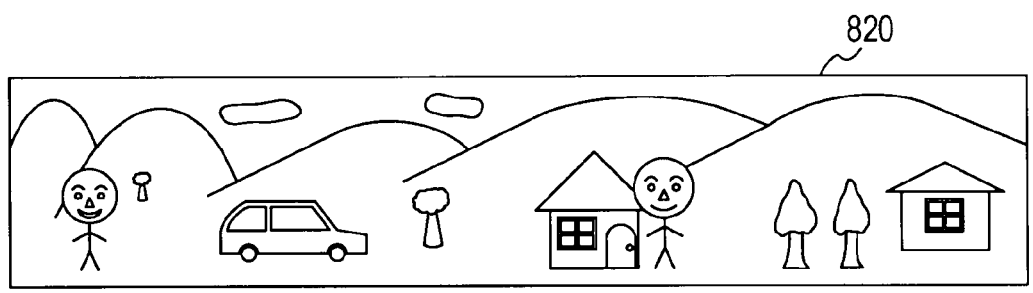
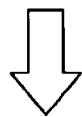
FIG. 24B

FIG. 25A
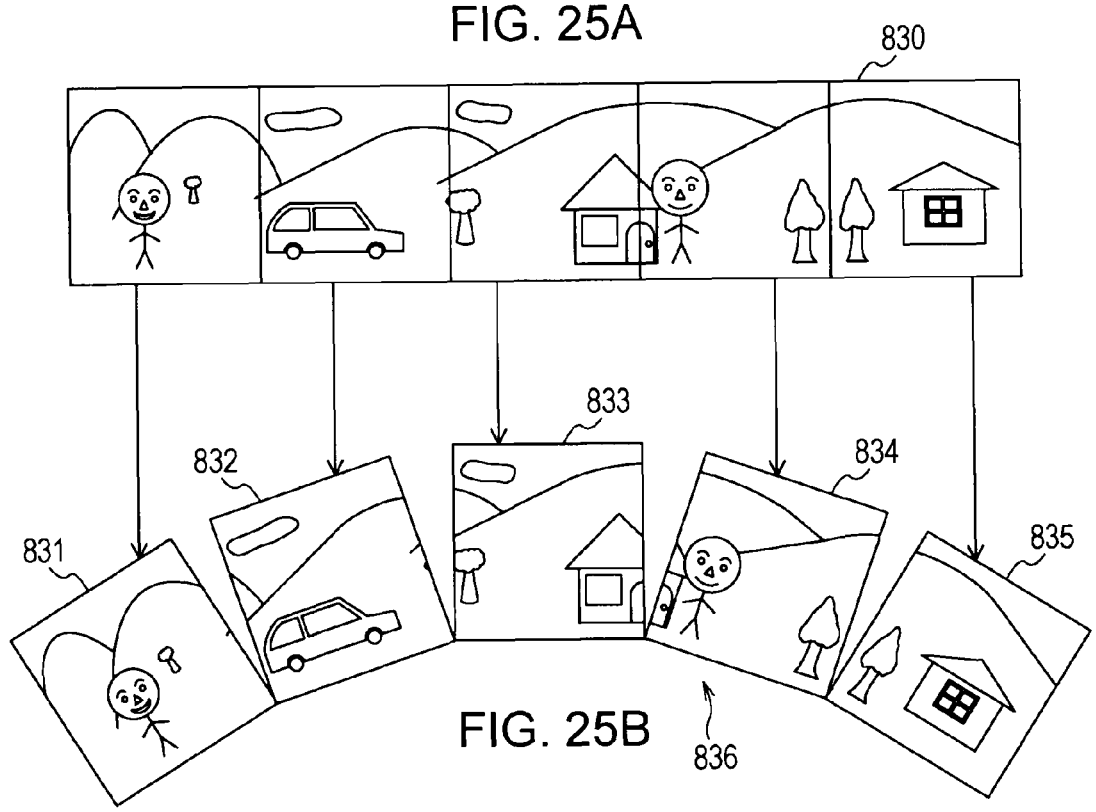
FIG. 25B
FIG. 25C
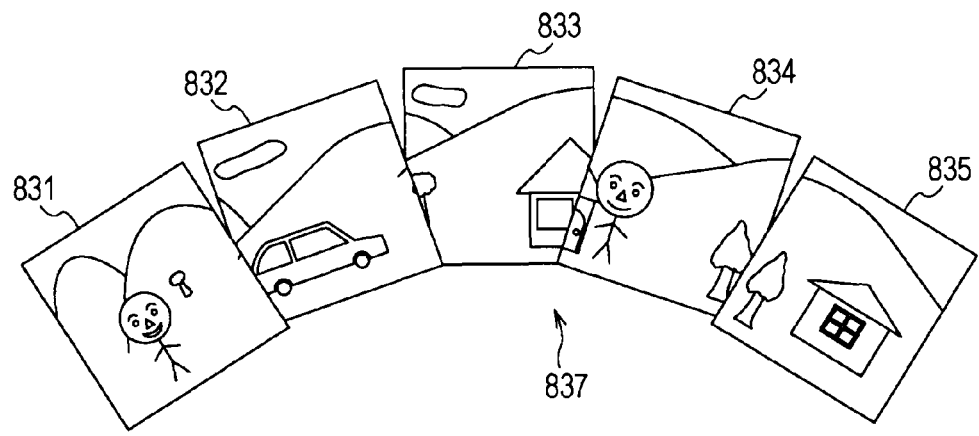

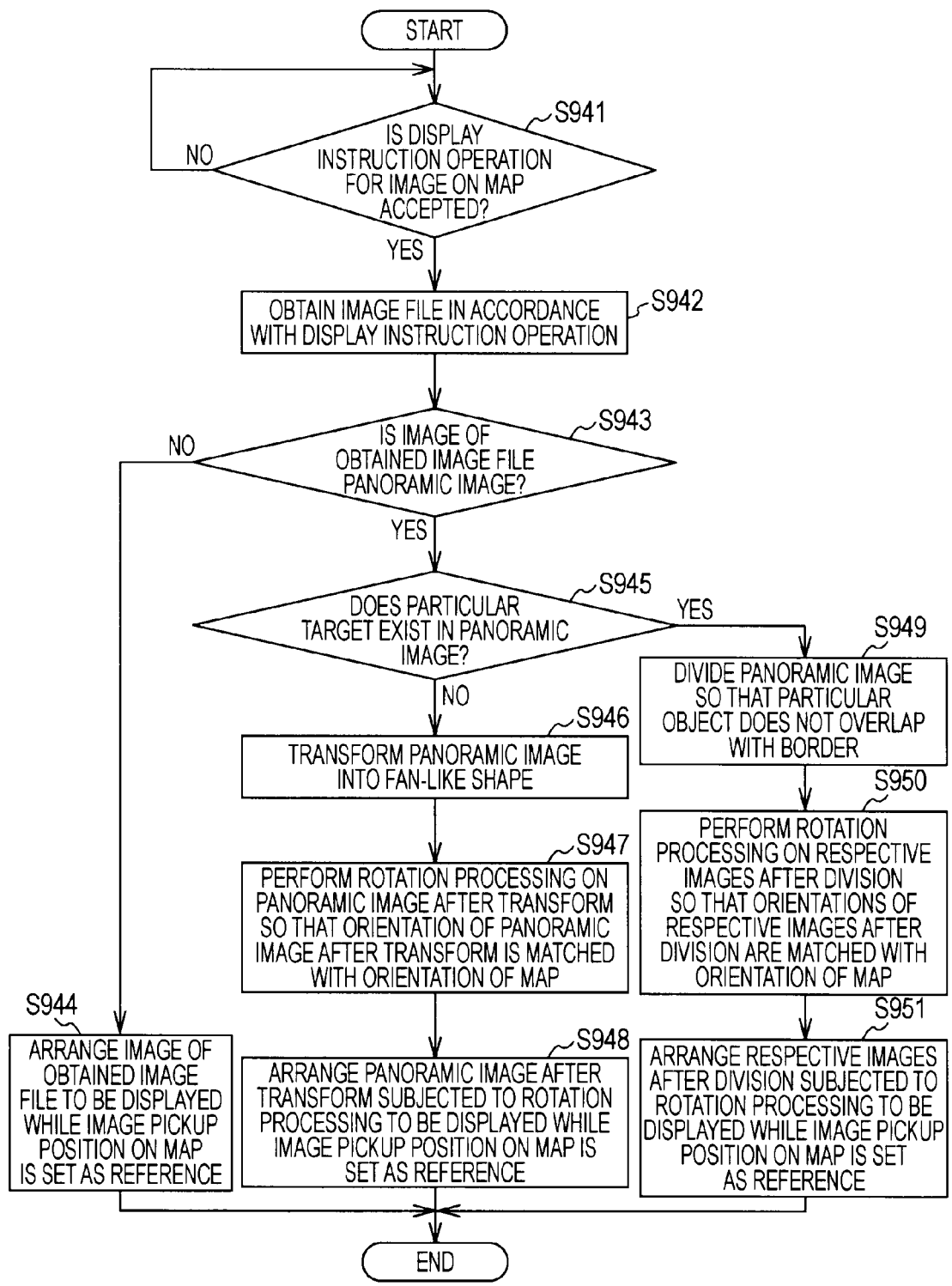

IMAGE PICKUP APPARATUS AND ASSOCIATED METHODOLOGY FOR GENERATING PANORAMIC IMAGES BASED ON LOCATION AND ORIENTATION INFORMATION

BACKGROUND OF THE INVENTION

1. Field of the Invention

The present invention relates to an image pickup apparatus. In particular, the invention relates to an image pickup apparatus configured to perform an image processing on a panoramic image, an electronic device, a processing method therefor, and a program for instructing a computer to execute the method.

2. Description of the Related Art

In recent years, an image pickup apparatus such as a digital still camera is widely used which is configured to generate a pickup image by picking up an image of a subject such as a landscape and record the generated pickup image as an image file. Also, a panoramic image generation method of generating a panoramic image containing a subject in a relatively wide range by joining a plurality of pickup images continuously generated by such an image pickup apparatus is proposed. As the panoramic image generation method, for example, a panoramic image generation method of detecting a motion vector between continuously generated pickup images and combining the respective pickup images on the basis of this detected motion vector to join the respective pickup images is proposed.

Also, an image pickup apparatus configured to obtain an orientation of the thus generated panoramic image and perform a display control or the like on the panoramic image by using this orientation is proposed. For example, an image pickup apparatus configured to generate a plurality of pickup images while changing a direction of an apparatus main body and add the orientations at the time of these image pickups to the respective corresponding pickup images for conducting the recording is proposed (for example, see Japanese Unexamined Patent Application Publication No. 2005-26859 (FIG. 1)).

SUMMARY OF THE INVENTION

According to the above-mentioned technology in a related art, it is possible to perform the display control on the respective pickup images by using the orientations obtained for the respective pickup images constituting the panoramic image.

Here, for example, a case is supposed in which one panoramic image is recorded as one image file. For example, in a case where one image file is recorded on a recording medium on the basis of Exif (Exchangeable image file format), basically, only one piece of orientation information is recorded in one image file. For this reason, for example, also in a case where an image file of one panoramic image is recorded on a recording medium on the basis of Exif, similarly, only one piece of orientation information is recorded in one image file. In view of the above, according to the above-mentioned technology in the related art, it is supposed that any one of the orientations obtained for the respective images constituting the panoramic image is recorded in the image file as the orientation information of the panoramic image.

However, as the panoramic image contains a subject in a relatively wide range, it is supposed that the orientation of the subject contained in the panoramic image becomes a relatively wide range. For this reason, at the time of recording the panoramic image, it is important to record an orientation of an appropriate position in the panoramic image. Also, when the panoramic image is used, it is important to appropriately use the orientation in accordance with the usage.

The present invention has been made in view of the above-mentioned circumstances, and it is desirable to appropriately use an orientation related to a panoramic image.

The present invention has been made to solve the above-mentioned problems, and an embodiment of the present invention relates to an image pickup apparatus including: an image pickup unit configured to pick up an image of a subject and generate a plurality of pickup images; an orientation obtaining unit configured to set an image pickup position at a time of picking up one pickup image among the plurality of generated pickup images as a reference and obtain an orientation related to the pickup image; an image combining unit configured to combine the plurality of generated pickup images and generating a panoramic image; a representative position calculation unit configured to calculate a representative position in a horizontal direction in the generated panoramic image; an orientation calculation unit configured to calculate an orientation at the calculated representative position on the basis of characteristic information of the image pickup unit, the calculated representative position, and the obtained orientation; and a recording control unit configured to record the calculated orientation while being associated with the generated panoramic image, a panoramic image recording method, and a program for instructing a computer to execute the method. With this configuration, such an effect is attained that the orientation with regard to the one pickup image among the plurality of generated pickup images is obtained, the panoramic image is generated by combining the plurality of pickup images, the representative position in the horizontal direction in this generated panoramic image is calculated, the orientation at the representative position in the panoramic image is calculated on the basis of the characteristic information of the image pickup unit, the calculated representative position, and the obtained orientation, and this calculated orientation is recorded while being associated with the panoramic image.

Also, according to the above-mentioned embodiment, the orientation obtaining unit may obtain an orientation at a center position in a first pickup image on a time axis among the plurality of generated pickup images as the orientation related to the pickup image, and the representative position calculation unit may calculate a center position in the generated panoramic image as the representative position in the panoramic image. With this configuration, such an effect is attained that the orientation at the center position of the first pickup image on the time axis among the plurality of generated pickup images is obtained, and the center position in the generated panoramic image is calculated as the representative position in the panoramic image.

Also, according to the above-mentioned embodiment, the characteristic information may include a width of a focal plane and a focal distance of the pickup image generated by the image pickup unit. With this configuration, such an effect is attained that the orientation at the representative position in the panoramic image is calculated by using the characteristic information including the width of the focal plane and the focal distance of the pickup image generated by the image pickup unit.

Also, according to the above-mentioned embodiment, the image pickup apparatus may further includes an image pickup operation determination unit configured to determine an image pickup operation state at a time of the generation of the plurality of pickup images, and the orientation calculation unit may set the obtained orientation as the representative position in a case where a particular image pickup operation state is determined as the image pickup operation state. With this configuration, such an effect is attained that in a case where the particular image pickup operation state is determined, the orientation obtained with regard to the one pickup image among the plurality of pickup images is set as the orientation at the representative position in the panoramic image.

Also, another embodiment of the present invention relates to an electronic device including: an operation acceptance unit configured to accept a specification operation of specifying a range of a part in a panoramic image generated by combining a plurality of pickup images; an image extraction unit configured to extract an image included in the specified range from the panoramic image; an orientation calculation unit configured to calculate an orientation corresponding to a representative position in the extracted image on the basis of characteristic information of an image pickup unit by which the plurality of pickup images are generated, a representative position in the panoramic image, an orientation corresponding to the representative position, and the representative position in the extracted image; and a recording control unit configured to record the calculated orientation while being associated with the extracted image, a processing method therefor, and a program for instructing a computer to execute the method. With this configuration, such an effect is attained that the image included in the specified range is extracted from the panoramic image, the orientation corresponding to the representative position in the extracted image is calculated on the basis of the characteristic information of the image pickup unit, the representative position in the panoramic image, the orientation associated with this representative position, and the representative position in the extracted image, and this calculated orientation is recorded while being associated with the extracted image.

Also, another embodiment of the present invention relates to an electronic device including: an operation acceptance unit configured to accept a specification operation of specifying a range of a part in a panoramic image generated by combining a plurality of pickup images; an image extraction unit configured to extract an image included in the specified range from the panoramic image; an orientation calculation unit configured to calculate an orientation at the representative position in the extracted image on the basis of a size in a horizontal direction in the panoramic image, an angle corresponding to an image pickup range for the panoramic image, a representative position in the panoramic image, an orientation associated with the representative position, and the representative position in the extracted image; and a recording control unit configured to record the calculated orientation while being associated with the extracted image, a processing method therefor, and a program for instructing a computer to execute the method. With this configuration, such an effect is attained that the image included in the specified range is extracted from the panoramic image, the orientation at the representative position in the extracted image is calculated on the basis of the size in the horizontal direction in the panoramic image, the angle corresponding to the image pickup range for the panoramic image, the representative position in the panoramic image, the orientation associated with this representative position, and the representative position in the extracted image, and this calculated orientation is recorded while being associated with the extracted image.

Also, another embodiment of the present invention relates to an electronic device including: a particular orientation position calculation unit configured to calculate, on the basis of a size in a horizontal direction in a panoramic image generated by combining a plurality of pickup images, a representative position in the panoramic image, an orientation associated with the representative position, and characteristic information of an image pickup unit by which the plurality of pickup images are generated, a particular orientation in the panoramic image and a position in the panoramic image corresponding to the particular orientation; an image extraction unit configured to extract an image included in a predetermined range including the calculated position in the panoramic image from the panoramic image; and a display control unit configured to display the extracted image while being associated with the particular orientation, a processing method therefor, and a program for instructing a computer to execute the method. With this configuration, such an effect is attained that the particular orientation in the panoramic image and the position in the panoramic image corresponding to this particular orientation are calculated on the basis of the size in the horizontal direction in the panoramic image, the representative position in the panoramic image, the orientation associated with this representative position, and the characteristic information of the image pickup unit, the image included in the predetermined range including the calculated position in the panoramic image is extracted from the panoramic image, and this extracted image is displayed while being associated with the particular orientation.

Also, according to the above-mentioned embodiment, in a case where a plurality of particular orientations exist in the panoramic image, the particular orientation position calculation unit may calculate the plurality of particular orientations, the display control unit may display the calculated respective particular orientations, the electronic device may further includes an operation acceptance unit configured to accept a selection operation of selecting a desired particular orientation from the displayed particular orientations, the image extraction unit may extract an image included in a predetermined range including a position corresponding to the selected particular orientation from the panoramic image, and the display control unit may display the extracted image while being associated with the selected particular orientation. With this configuration, such an effect is attained that the calculated respective particular orientations are displayed, when the selection operation of selecting the desired particular orientation among the displayed particular orientations is accepted, the image included in the predetermined range including the position corresponding to this selected particular orientation is extracted from the panoramic image, and this extracted image is displayed while being associated with the selected particular orientation.

Also, another embodiment of the present invention relates to an electronic device including: a particular target detection unit configured to detect a particular target contained in a panoramic image generated by combining a plurality of pickup images; a particular target orientation calculation unit configured to calculate, on the basis of a position in the panoramic image of the detected particular target, characteristic information of an image pickup unit by which the plurality of pickup images are generated, a representative position in the panoramic image, and an orientation associated with the representative position, an orientation corresponding to the position of the detected particular target; an image extraction unit configured to extract an image included in a predetermined range including the detected particular target from the panoramic image; and a display control unit configured to display the extracted image while being associated with the calculated orientation, a processing method therefor, and a program for instructing a computer to execute the method. With this configuration, such an effect is attained that the particular target contained in the panoramic image is detected, the orientation corresponding to the position of the detected particular target is calculated on the basis of the position in the panoramic image of this detected particular target, the characteristic information of the image pickup unit, the representative position in the panoramic image, and the orientation associated with this representative position, the image included in the predetermined range including the detected particular target is extracted from the panoramic image, and this extracted image is displayed while being associated with the calculated orientation.

Also, another embodiment of the present invention relates to an electronic device including: an image transform unit configured to transform a panoramic image generated by combining a plurality of pickup images on the basis of a size in a horizontal direction in the panoramic image, an angle corresponding to an image pickup range for the panoramic image, and a representative position in the panoramic image; and a display control unit configured to arrange and display the transformed panoramic image on a map on the basis of an image pickup position at a time of the generation of the panoramic image, a processing method therefor, and a program for instructing a computer to execute the method. With this configuration, such an effect is attained that the panoramic image is transformed on the basis of the size in the horizontal direction in the panoramic image, the angle corresponding to the image pickup range for the panoramic image, and the orientation associated with the representative position in the panoramic image, and the transformed panoramic image is arranged and displayed on the map on the basis of the image pickup position at the time of the generation of the panoramic image.

Also, according to the above-mentioned embodiment, the image transform unit may transform the panoramic image into a fan-like shape so that an orientation of a subject contained in the transformed panoramic image is substantially matched with an orientation on the map. With this configuration, such an effect is attained that the panoramic image is transformed into the fan-like shape so that the orientation of the subject contained in the transformed panoramic image is substantially matched with the orientation on the map.

Also, according to the above-mentioned embodiment, the display control unit may arrange and display the transformed panoramic image on the map so that a position at a center angle of the transformed panoramic image is substantially matched with the image pickup position on the map. With this configuration, such an effect is attained that the transformed panoramic image is arranged and displayed on the map so that the position at the center angle of the transformed panoramic image is substantially matched with the image pickup position on the map.

Also, according to the above-mentioned embodiment, in a case where the panoramic image contains a particular target, the image transform unit may extract a particular target image containing the particular target and overlap the extracted particular target image on the transformed panoramic image to be combined. With this configuration, such an effect is attained that in a case where the particular target is contained in the panoramic image, the particular target image containing the particular target is extracted, and this extracted particular target image is overlapped on the transformed panoramic image to be combined.

Also, another embodiment of the present invention relates to an electronic device including: an image transform unit configured to divide a panoramic image generated by combining a plurality of pickup images into a predetermined number to generate a plurality of images while a vertical direction in the panoramic image is set as a border, calculate, on the basis of characteristic information of an image pickup unit by which the plurality of pickup images are generated, a representative position in the panoramic image, an orientation associated with the representative position, and representative positions in the respective images after the division, orientations corresponding to the representative positions in the respective images after the division, and rotate the respective images after the division on the basis of the calculated orientations; and a display control unit configured to arrange and display the respective images after the division on a map on the basis of an image pickup position at a time of the generation of the panoramic image, a processing method therefor, and a program for instructing a computer to execute the method. With this configuration, such an effect is attained that while the vertical direction in the panoramic image is set as the border, the panoramic image is divided into the predetermined number to generate the plurality of images, the orientations corresponding to the representative positions in the respective images after the division are calculated on the basis of the characteristic information of the image pickup unit, the representative position in the panoramic image, the orientation associated with this representative position, and the representative positions in the respective images after the division, the respective images after the division are rotated on the basis of this calculated orientation, and the respective images after the division are arranged and displayed on the map on the basis of the image pickup position at the time of the generation of the panoramic image.

Also, according to the above-mentioned embodiment, the image transform unit may rotate the respective images after the division so that an orientation at a representative position in the respective images after the division is substantially matched with an orientation in the map. With this configuration, such an effect is attained that the representative position in the respective images are rotated so that the orientation at the representative position in the respective images after the division is substantially matched with the orientation on the map.

Also, according to the above-mentioned embodiment, in a case where the panoramic image contains a particular target, the image transform unit may change a position of the border so that the particular target does not overlap the border, and may divide the panoramic image. With this configuration, such an effect is attained that in a case where the particular target is contained in the panoramic image, and the panoramic image is divided while the position of the border is changed so that the particular target does not overlap the border.

According to the above-mentioned embodiments of the present invention, the excellent effect may be obtained that it is possible to appropriately use the orientation related to the panoramic image.

BRIEF DESCRIPTION OF THE DRAWINGS

FIGS. 3A to 3C show an example of a file structure of an image file stored in an image storage unit according to the first embodiment of the present invention;

FIGS. 15A to 15C schematically show a relation between a trimming image generated by an image extraction unit and an image file of the trimming image stored in the image storage unit according to the second embodiment of the present invention;

FIGS. 24A and 24B show an example of a transition of the panoramic image transformed by the image transform unit according to the third embodiment of the present invention;

FIGS. 25A to 25C show an example of the transition of the panoramic image transformed by the image transform unit according to the third embodiment of the present invention;

FIG. 32 is a flow chart for a processing procedure of an image display processing by the image pickup apparatus according to the third embodiment of the present invention.

DESCRIPTION OF THE PREFERRED EMBODIMENTS

Hereinafter, a description will be given of embodiments for carrying out the present invention (hereinafter, which will be referred to as embodiments). The description is carried out in the following order.

1. First Embodiment (an orientation calculation control for a representative position in a panoramic image: an example in which an orientation of a panoramic image is calculated by using an orientation of one pickup image)

2. Second Embodiment (an orientation calculation in a panoramic image and an image extraction control using an orientation: examples of an orientation calculation when a part of an image is extracted from a panoramic image and an image extraction from a panoramic image by using an orientation)

3. Third Embodiment (a conversion control for a panoramic image: examples of a panoramic image transform by using an orientation and an arrangement on a map)

4. Modified Examples

1. First Embodiment

Configuration Example of an Image Pickup Apparatus

Figure 1:
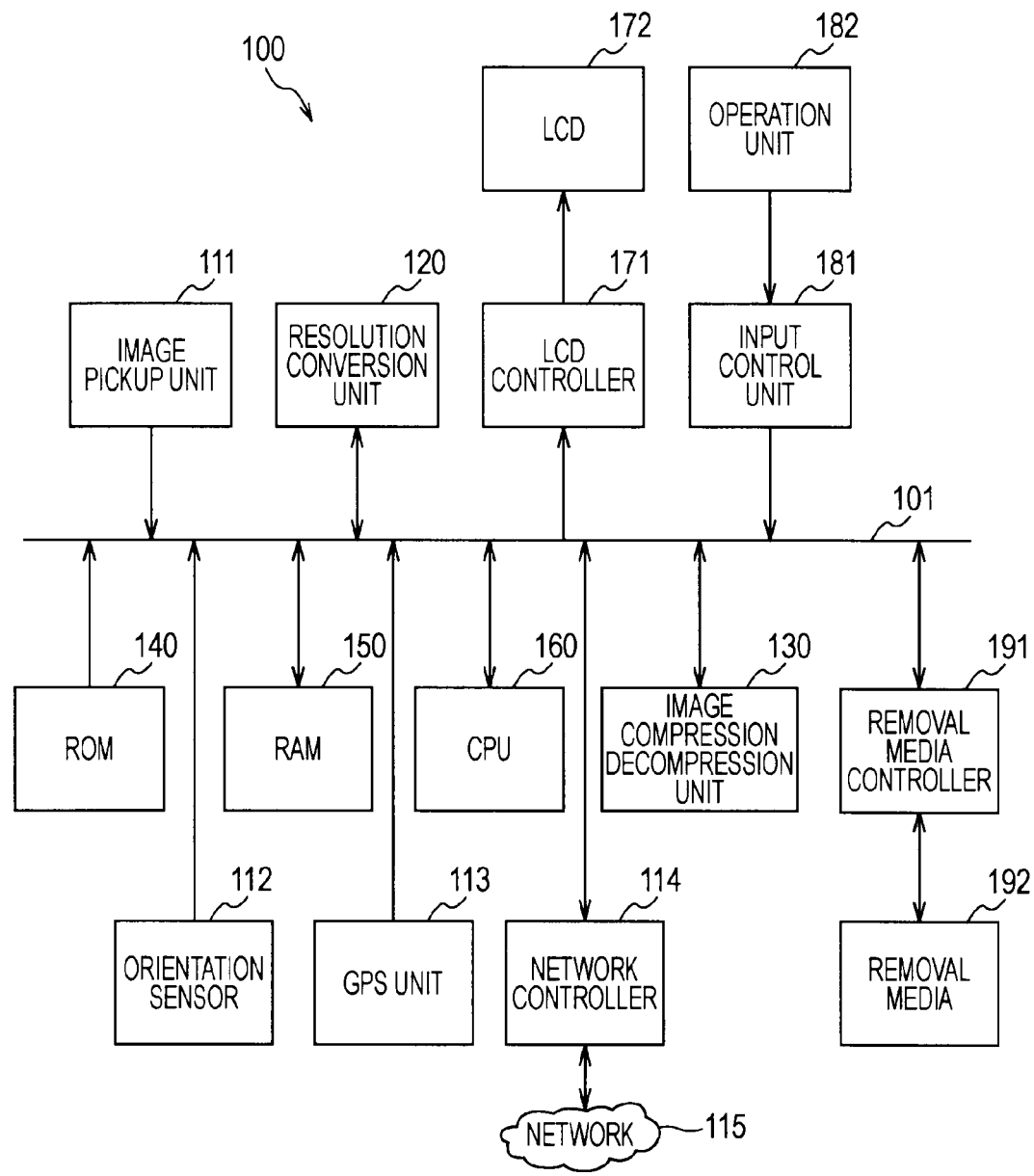
FIG. 1 is a block diagram of an internal configuration example of an image pickup apparatus according to a first embodiment of the present invention.

FIG. 1 is a block diagram of an internal configuration example of an image pickup apparatus 100 according to a first embodiment of the present invention. The image pickup apparatus 100 is provided with an image pickup unit 111, an orientation sensor 112, a GPS (Global Positioning System) unit 113, a network controller 114, a resolution conversion unit 120, and an image compression decompression unit 130. Also, the image pickup apparatus 100 is provided with a ROM (Read Only Memory) 140, a RAM (Random Access Memory) 150, and a CPU (Central Processing Unit) 160. Also, the image pickup apparatus 100 is provided with an LCD (Liquid Crystal Display) controller 171, an LCD 172, an input control unit 181, an operation unit 182, a removal media controller 191, and removal media 192. It should be noted that interactions between the respective units constituting the image pickup apparatus 100 are carried out via a bus 101. The image pickup apparatus 100 can be realized, for example, by a digital still camera which can generate a panoramic image by picking up images of a subject to generate a plurality of pickup images and combining these plural images.

The image pickup unit 111 is configured to generate image data (pickup image) by converting an incident light from the subject on the basis of a control of the CPU 160 and supply the generated image data to the RAM 150. To be more specific, the image pickup unit 111 is provided with an optical unit, an image pickup element, and a signal processing unit. The optical unit is composed of a plurality of lenses for collecting the light from the subject (such as a zoom lens and a focus lens) and the incident light from the subject via these lenses and iris is supplied to the image pickup element. Also, an optical image of the subject incident via the optical unit is imaged on an imaging plane of the image pickup element. In this state, the image pickup element carries out an image pickup operation and an image pickup signal to the signal processing unit. Then, image data is generated as the signal processing unit carries out a signal processing on the image pickup signal, and this generated image data is sequentially supplied to the RAM 150 to be temporarily stored. It should be noted that for the image pickup element, for example, a CCD (Charge Coupled Device) sensor, a CMOS (Complementary Metal Oxide Semiconductor) sensor, or the like can be used.

The orientation sensor 112 is a sensor for measuring an orientation on the earth by utilizing the terrestrial magnetism and outputting the measured orientation to the CPU 160. For example, the orientation sensor 112 is a magnetic field sensor composed of mutually-perpendicular biaxial coils (for example, the x axis and the y axis) and an MR element (magnetoresistive element) arranged at a center part thereof. This MR element is an element for sensing the terrestrial magnetism and changing a resistance value due to a magnitude of the magnetism. The resistance change of the MR element is divided into components in two directions by the two axes of coils (for example, components in the x axis and the y axis), and an orientation is calculated on the basis of a terrestrial magnetism ratio of the components in two directions. Herein, according to the first embodiment of the present invention, the orientation sensor 112 measures an orientation of an image pickup direction of the image pickup apparatus 100. This image pickup direction is a direction from an image pickup position (for example, a position where the image pickup apparatus 100 exists) to a position where the subject contained in the pickup image which is generated by the image pickup unit 111. For example, this image pickup direction can be set as an optical axis direction on the subject side. Also, for example, with regard to the image pickup direction, while the image pickup position is set as a reference, the direction of the subject existing at the center position in the pickup image can be set as the image pickup direction. It should be noted that according to the first embodiment of the present invention, an example of obtaining the image pickup direction by using the orientation sensor 112 is illustrated, but an image pickup direction obtained through another obtaining method for the image pickup direction may also be used. For example, an orientation measured on the basis of a GPS signal may be used.

The GPS unit 113 is configured to calculate image pickup position information on the basis of a GPS signal received by a GPS signal reception antenna (not shown) and output the calculated image pickup position information to the CPU 160. This calculated image pickup position information includes the respective pieces of data related to degrees of latitude, longitude, altitude, and the like. It should be noted that according to the first embodiment of the present invention, an example of using the image pickup position information calculated on the basis of the GPS signal is illustrated, but image pickup position information obtained through another obtaining method for the image pickup position information may also be used. For example, image pickup position information is derived by using access point information through a wireless LAN (Local Area Network) existing in the surrounding, and this image pickup position information may be obtained and used.

The network controller 114 is connected to a network 115 and carries out a communication control conducted via the network 115 on the basis of an instruction from the CPU 160. The network 115 is, for example, a network such as the wireless LAN. The network controller 114 supplies, for example, an image file stored in the removal media 192 (image content) to another apparatus via the network 115 (for example, a personal computer). Also, the network controller 114 obtains, for example, a content such as the image file via the network 115. Then, this obtained content is supplied to the removal media 192 to be stored.

The resolution conversion unit 120 is configured to convert the input various pieces of image data into resolutions suitable to the respective image processings on the basis of a control signal from the CPU 160.

The image compression decompression unit 130 is configured to compress or decompress the input various pieces of image data in accordance with the respective image processings on the basis of the control signal from the CPU 160. The image compression decompression unit 130 compresses or decompresses, for example, the input various pieces of image data into the image data in JPEG (Joint Photographic Experts Group) format.

The ROM is a read-only memory and is configured to store various control programs and the like.

The RAM 150 is a memory used for a main memory of the CPU 160 (main storage apparatus) and is provided with a work area or the like for a program executed on the CPU 160, where programs and data used for the CPU 160 to carry out various processings are temporarily stored. Also, the RAM 150 is provided with an image saving area for various image processings.

The CPU 160 is configured to control the respective units of the image pickup apparatus 100 on the basis of various control programs stored in the ROM 140. Also, the CPU 160 controls the respective units of the image pickup apparatus 100 on the basis of operation inputs and the like accepted by the operation unit 182.

The LCD controller 171 is configured to display various pieces of image data on the LCD 172 on the basis of the control signal from the CPU 160.

The LCD 172 is a display unit for displaying images corresponding to the various pieces of image data supplied from the LCD controller 171. The LCD 172 sequentially displays, for example, the pickup images corresponding to the image data generated by the image pickup unit 111. Also, the LCD 172 displays, for example, the image corresponding to the image file stored in the removal media 192. It should be noted that instead of the LCD 172, for example, a display panel such as an organic EL (Electro Luminescence) panel may be used. Also, instead of the LCD 172, for example, a touch panel may be used with which a user can conduct an operation input by touching or approaching a display surface with the finger.

The input control unit 181 is configured to conduct a control related to the operation input accepted by the operation unit 182 on the basis of an instruction from the CPU 160.

The operation unit 182 is an operation unit for accepting an operation input operated by the user and outputs a signal in accordance with the accepted operation input to the CPU 160. For example, the image pickup apparatus 100 is provided with an operation member such as a shutter button for instructing a panoramic image pickup operation start and a panoramic image pickup operation end in a panoramic image pickup mode for recording a panoramic image. Also, the operation unit 182 and the LCD 172 may be integrally structured.

The removal media controller 191 is connected to the removal media 192 and is configured to read and write the data to the removal media 192 on the basis of the control signal from the CPU 160. For example, the removal media controller 191 records various pieces of image data such as the image data generated by the image pickup unit 111 as the image file (image content) in the removal media 192. Also, the removal media controller 191 reads out the content such as the image file from the removal media 192 to be output via the bus 101 to the RAM 150 or the like.

The removal media 192 is a recording device for recording the image data supplied from the removal media controller 191. In the removal media 192, for example, various pieces of data such as image data in JPEG (Joint Photographic Experts Group) format are recorded. As the removal media 192, for example, a tape (for example, a magnetic tape) and an optical disc (for example, a recordable DVD (Digital Versatile Disc)) can be used. Also, as the removal media 192, for example, a magnetic disc (for example, a hard disc), a semiconductor memory (for example, a memory card), an opto-magnetic disc (for example, an MD (MiniDisc)) may be used.

Figure 2:
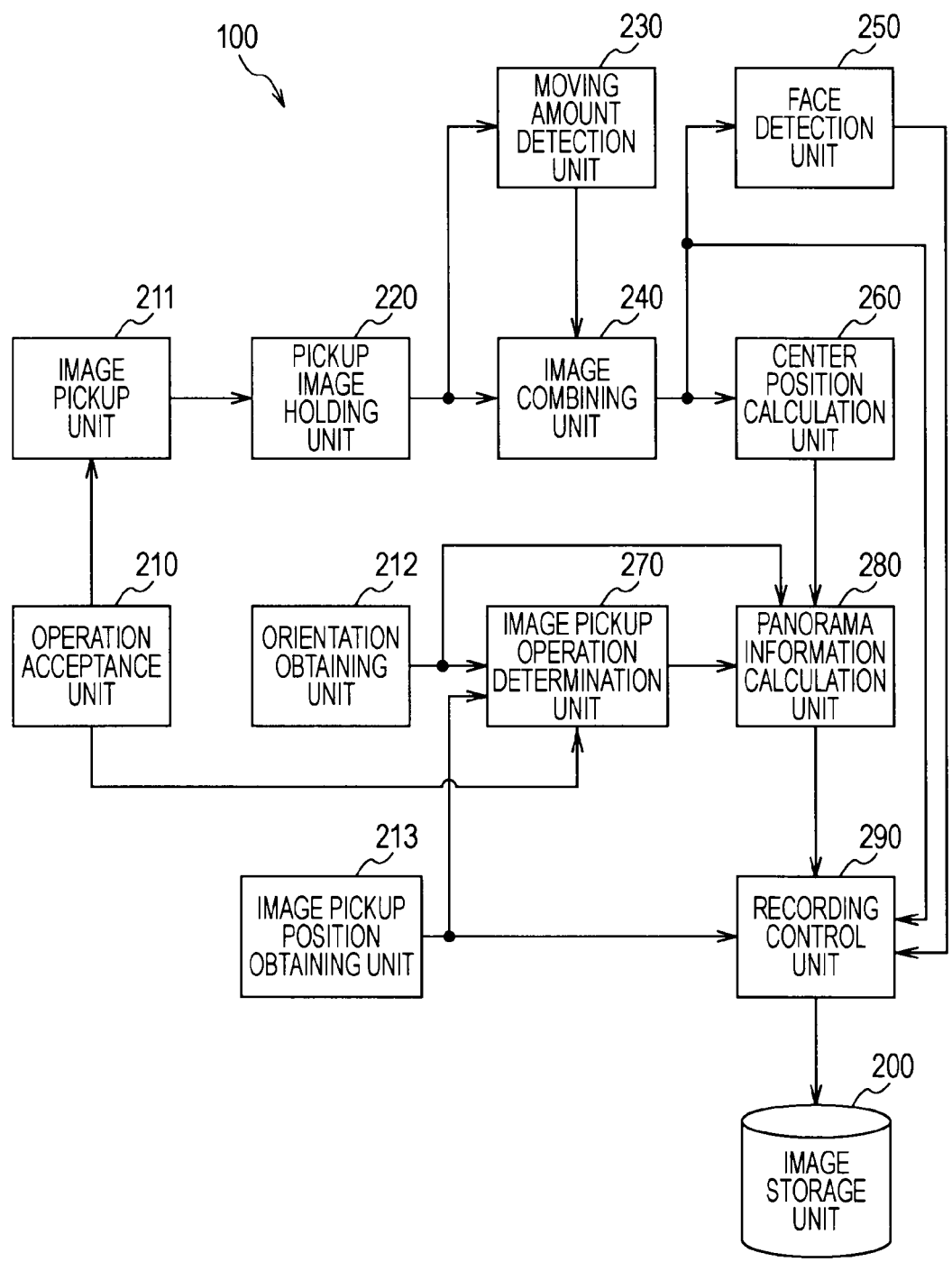
FIG. 2 is a block diagram of a functional configuration example of the image pickup apparatus according to the first embodiment of the present invention.

FIG. 2 is a block diagram of a functional configuration example of the image pickup apparatus 100 according to the first embodiment of the present invention. The image pickup apparatus 100 is provided with an image storage unit 200, an operation acceptance unit 210, an image pickup unit 211, an orientation obtaining unit 212, an image pickup position obtaining unit 213, a pickup image holding unit 220, and a moving amount detection unit 230. Also, the image pickup apparatus 100 is provided with an image combining unit 240, a face detection unit 250, a center position calculation unit 260, an image pickup operation determination unit 270, a panorama information calculation unit 280, and a recording control unit 290. Herein, according to the respective embodiments of the present invention, in a case where a term "image" is described, the image at least includes any one of meanings of an image itself and image data for displaying the image.

The image storage unit 200 is configured to record the panoramic image output from the image combining unit 240 and respective pieces of information related to this panoramic image as image files on the basis of a control of the recording control unit 290. It should be noted that the image storage unit 200 corresponds to the removal media 192 shown in FIG. 1.

The operation acceptance unit 210 is an operation acceptance unit for accepting an operation input from the user and outputting an operation content in accordance with the accepted operation input to the image pickup unit 211 and the image pickup operation determination unit 270. For example, in a case where the panoramic image pickup mode is set, when a start instruction operation for instructing the panoramic image pickup operation start is accepted, the operation acceptance unit 210 output the operation content to the image pickup unit 211 and the image pickup operation determination unit 270. Also, while the image pickup operation for the panoramic image is carried out, in a case where an end instruction operation for instructing the panoramic image pickup operation end is accepted, the operation acceptance unit 210 outputs the operation content to the image pickup unit 211 and the image pickup operation determination unit 270. These start instruction operation and end instruction operation are conducted, for example, through shutter operations. Also, in a case where the panoramic image pickup mode is set, when an operation input for setting whether or not a decision method for the orientation in accordance with the image pickup operation state is changed is accepted, the operation acceptance unit 210 outputs the operation content to the image pickup operation determination unit 270. It should be noted that the operation acceptance unit 210 corresponds to the input control unit 181 and the operation unit 182 shown in FIG. 1.

The image pickup unit 211 is configured to pick up an image of the subject for generating a pickup image and sequentially supply the generated pickup images to the pickup image holding unit 220. For example, in a case where the panoramic image pickup mode is set, when the start instruction operation for instructing the panoramic image pickup operation start is accepted by the operation acceptance unit 210, the image pickup unit 211 starts the generation of the pickup image. Also, in a case where the end instruction operation for instructing the panoramic image pickup operation end is accepted by the operation acceptance unit 210, the image pickup unit 211 ends the generation of the pickup image. It should be noted that the image pickup unit 211 corresponds to the image pickup unit 111 shown in FIG. 1.

The orientation obtaining unit 212 is configured to obtain an orientation related to the image pickup direction and output the obtained orientation to the image pickup operation determination unit 270 and the panorama information calculation unit 280. It should be noted that the orientation obtaining unit 212 corresponds to the orientation sensor 112 shown in FIG. 1.

The image pickup position obtaining unit 213 is configured to obtain image pickup position information related to the image pickup position and output the obtained image pickup position information to the image pickup operation determination unit 270 and the recording control unit 290. It should be noted that the image pickup position obtaining unit 213 corresponds to the GPS unit 113 shown in FIG. 1.

The pickup image holding unit 220 is configured to hold the respective pickup images output from the image pickup unit 211 and supply the respective held pickup images to the moving amount detection unit 230 and the image combining unit 240. It should be noted that the pickup image holding unit 220 corresponds to the RAM 150 shown in FIG. 1.

The moving amount detection unit 230 is configured to detect the moving amount and the moving direction between adjacent pickup images with regard to the respective pickup images supplied from the pickup image holding unit 220 and output the detected moving amount and moving direction to the image combining unit 240. It should be noted that the moving amount detection unit 230 corresponds to the CPU 160 shown in FIG. 1.

The image combining unit 240 is configured to generate a panoramic image by combining the respective pickup images held by the pickup image holding unit 220 on the basis of the moving amount and the moving direction output from the moving amount detection unit 230. Then, the image combining unit 240 outputs the generated panoramic image to the face detection unit 250, the center position calculation unit 260, and the recording control unit 290. It should be noted that the generation of the panoramic image will be described in detail with reference to FIGS. 5A, 5B, and FIGS. 6A to 6C. Also, the image combining unit 240 corresponds to the CPU 160 shown in FIG. 1.

The face detection unit 250 is configured to detect a face contained in the panoramic image which is output from the image combining unit 240 and output face information related to the detected face to the recording control unit 290. As a face detection method, for example, a face detection method through a matching between a template where luminance distribution information of the face is recorded and the pickup image (see for example, Japanese Unexamined Patent Application Publication No. 2004-133637) and a face detection method based on a part of a skin color contained in the pickup image and a characteristic amount of the human face can be used. Also, the face information includes the position and the size of the detected face. Herein, the position of the detected face is, for example, a rectangular position containing at least a part of the detected face (for example, coordinates at the upper left corner of the rectangular). Also, the size of the detected face is, for example, a size of the rectangular (for example, the respective pixel numbers in the horizontal direction and the vertical direction of the rectangular). It should be noted that as a detection target, an object other than the human face may be set as the target. Also, the face detection unit 250 corresponds to the CPU 160 shown in FIG. 1.

The center position calculation unit 260 is configured to calculate the center position in the panoramic image on the basis of the length in the horizontal direction of the panoramic image output from the image combining unit 240. Then, the center position calculation unit 260 outputs the calculated center position and the length in the horizontal direction of the panoramic image which is set as the calculation target to the panorama information calculation unit 280. It should be noted that the center position calculation unit 260 corresponds to the CPU 160 shown in FIG. 1. Also, the center position calculation unit 260 is an example of a representative position calculation unit described in the scope of the claims.

The image pickup operation determination unit 270 is configured to determine the image pickup operation state of the image pickup apparatus 100 on the basis of the orientation output from the orientation obtaining unit 212 and the image pickup position information output from the image pickup position obtaining unit 213. Then, the image pickup operation determination unit 270 outputs the determination result to the panorama information calculation unit 280. For example, in a case where the panoramic image pickup mode is set, when an operation input indicating that the decision method for the orientation in accordance with the image pickup operation state is changed is accepted by the operation acceptance unit 210, the image pickup operation determination unit 270 determines the image pickup operation state of the image pickup apparatus 100. On the other hand, in a case where an operation input indicating that the decision method for the orientation in accordance with the image pickup operation state is not changed is accepted by the operation acceptance unit 210, the image pickup operation determination unit 270 does not determine the image pickup operation state of the image pickup apparatus 100. For example, in a case where the panoramic image pickup mode is set, on the basis of the orientation and the image pickup position information when the start instruction operation and the end instruction operation are accepted by the operation acceptance unit 210, the image pickup operation state of the image pickup apparatus 100 is determined. Also, the image pickup operation determination unit 270 outputs a status indicating that the start instruction operation and the end instruction operation is accepted to the panorama information calculation unit 280. It should be noted that the determination on the image pickup operation state will be described in detail with reference to FIGS. 10A and 10B. Also, the image pickup operation determination unit 270 corresponds to the image pickup unit 111 shown in FIG. 1.

The panorama information calculation unit 280 is configured to calculate an orientation related to the panoramic image generated by the image combining unit 240 and an angle (panorama angle) corresponding to an image pickup range for the panoramic image and output the calculated orientation and panorama angle to the recording control unit 290. For example, the panorama information calculation unit 280 calculates the orientation at the center position in the panoramic image on the basis of the orientation output from the orientation obtaining unit 212, the center position in the panoramic image output from the center position calculation unit 260, and the characteristic information of the image pickup unit 211. Also, the panorama information calculation unit 280 calculates a panorama angle on the basis of the length in the horizontal direction of the panoramic image output from the center position calculation unit 260 and the characteristic information of the image pickup unit 211. It should be noted that the characteristic information of the image pickup unit 211 may be held by the panorama information calculation unit 280 and may also be sequentially supplied from the image pickup unit 211. It should be noted that a calculation method for the orientation at the center position in the panoramic image and a calculation method for the panorama angle will be described in detail with reference to FIGS. 7, 8A, and 8B. It should be noted that the panorama information calculation unit 280 corresponds to the CPU 160 shown in FIG. 1. Also, the panorama information calculation unit 280 is an example of an orientation calculation unit described in the scope of the claims.

The recording control unit 290 is configured to record the panoramic image output from the image combining unit 240 and respective pieces of information related to the panoramic image as the image file in the image storage unit 200. As the respective pieces of information related to the panoramic image, for example, the recording control unit 290 records the orientation and the panorama angle output from the panorama information calculation unit 280 in the image storage unit 200 while being associated with the corresponding image file. Also, the image file is, for example, subjected to a resolution conversion to be compressed and recorded in the JPEG format. It should be noted that the recording control unit 290 corresponds to the resolution conversion unit 120, the image compression decompression unit 130, the CPU 160, and the removal media controller 191 shown in FIG. 1.

Configuration Example of an Image File of a Panoramic Image

FIGS. 3A to 3C show an example of a file structure of the image file stored in the image storage unit 200 according to the first embodiment of the present invention. According to the example shown in FIGS. 3A to 3C, an outline of a file structure of a still image file recorded on the basis of DCF (Design rule for Camera File system) standard is shown. The DCF is a file system standard for realizing a mutual utilization of an image via a recording medium between devices such as a digital still camera and a printer. Also, the DCF regulates a way of setting a file name and a structure of a folder in a case where the recording based on Exif (Exchangeable image file format) is conducted on the recording medium. The Exif is a standard for adding image data and camera information in the image file and regulates a format for recording the image file (file format). FIG. 3A shows a configuration example of an image file 300, FIG. 3B shows a configuration example of attachment information 310, and FIG. 3C shows a configuration example of a maker note 312.

The image file 300 is a still image file recorded on the basis of the DCF standard and is composed of as shown in FIG. 3A, the attachment information 310 and image information 320. The image information 320 is generated, for example, by the image pickup unit 111 and is image data obtained by being subjected to the resolution conversion by the resolution conversion unit 120 and compressed by the image compression decompression unit 130 in the JPEG format.

The attachment information 310 is composed of attribute information 311 and the maker note 312 as shown in FIG. 3B. The attribute information 311 is attribute information or the like related to the image file 300 which includes, for example, GPS information, orientation information, the characteristic information of the image pickup unit (for example, a device characteristic), image pickup update day and time, a image size, color space information, a maker (manufacturer) name, and the like. The GPS information includes, for example, the image pickup position information such as degrees of latitude and longitude (for example, TAGID=1000001 to 1000004). Also, the orientation information includes the orientation information (for example, TAGID=1000016 and 1000017) indicating the orientation of the pickup image. Herein, as a unit of the orientation of the pickup image (for example, TAGID=1000016), for example, 0.01 degree is recorded. Also, the direction of the pickup image (for example, TAGID=1000017), for example, while north is set as 0 degree (or 360 degree), east is set as 90 degrees, south is set as 180 degrees, and west is set as 270 degrees, a numeric value corresponding to the orientation obtained by the orientation sensor 112 is recorded. It should be noted that this numeric value indicating the angle may also be referred to as orientation angle. Also, the characteristic information of the image pickup unit includes, for example, the characteristic information of the image pickup unit (for example, TAGID=37386) such as a lens focal distance. This lens focal distance is, for example, a lens focal distance f shown in FIG. 7.

The maker note 312 is an expansion area where unique data of the user is recorded in general and the respective makers can freely record information (TAGID=37500, MakerNote). As shown in FIG. 3C, in the maker note 312, as the characteristic information of the image pickup unit, for example, a width 313 of a focal plane is recorded. This width 313 of the focal plane is, for example, a width W of the focal plane shown in FIG. 7. Also, in the maker note 312, a width 314 of the first image constituting the panoramic image, an angle 315 corresponding to the image pickup range for the panoramic image, and face information 316 are recorded. It should be noted that in the maker note 312, the image pickup position information, the orientation information, the presence or absence of the panoramic image may be recorded.

The width 314 of the first image constituting the panoramic image is a value indicating the width of the first image on the time axis among a plurality of pickup images constituting the panoramic image generated by the image combining unit 240. This value can be represented by the number of pixels in the horizontal direction of the panoramic image (that is, the horizontal resolution), for example, which corresponds to H shown in FIGS. 8A and 8B, and the like.

The angle (panorama angle) 315 corresponding to the image pickup range for the panoramic image is an angle in the horizontal direction of the image pickup range in a case where the image pickup apparatus 100 is set as the reference position at the time of picking up the panoramic image. This angle is, for example, an angle equivalent to the field angle in the horizontal direction of the pickup image, for example, which corresponds to θ0 shown in FIGS. 8A and 8B, and the like.

The face information 316 is information including the position and the size of the face contained in the panoramic image generated by the image combining unit 240.

Figure 4:
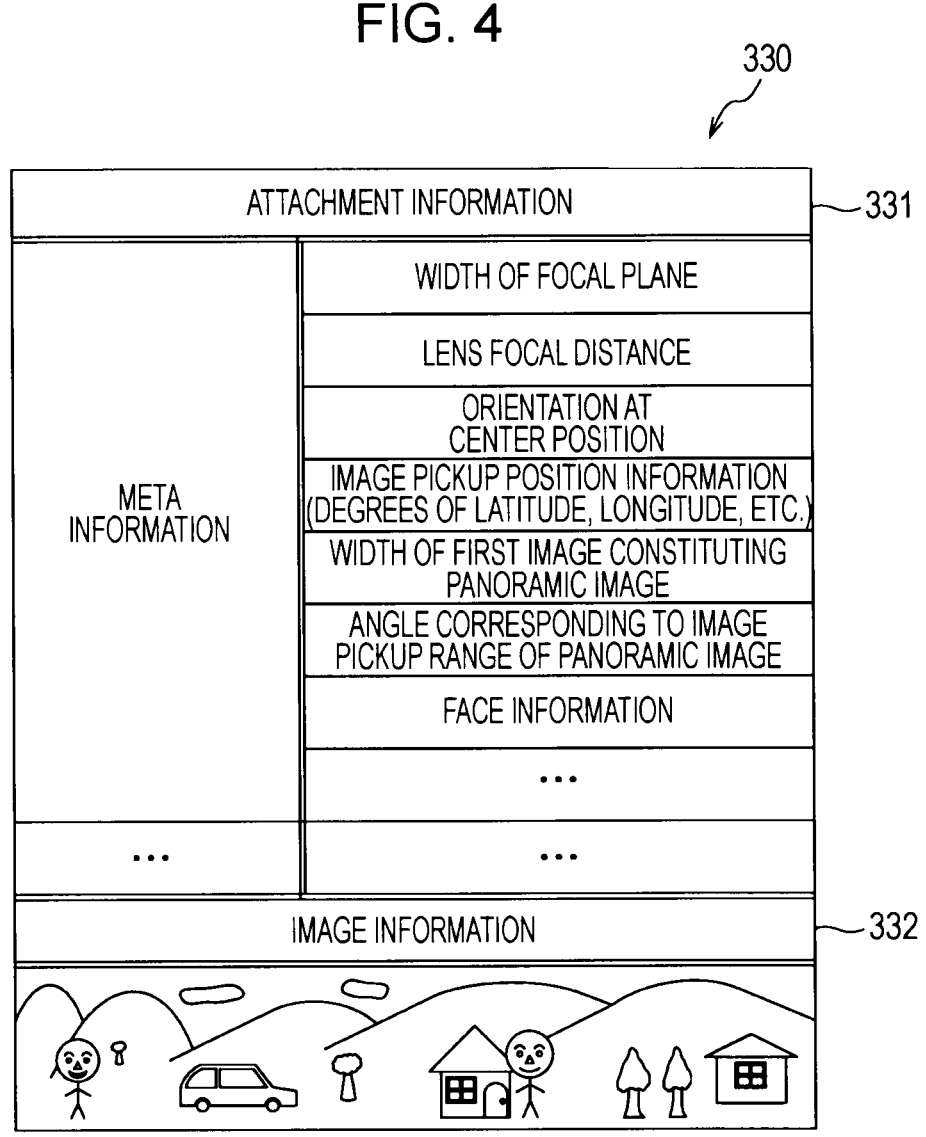
FIG. 4 schematically shows the image file stored in an image storage unit according to the first embodiment of the present invention.

FIG. 4 schematically shows the image file stored in an image storage unit 200 according to the first embodiment of the present invention. An image file 330 is a still image file for the panoramic image generated by the image combining unit 240, in which attachment information 331 and image information 332 are recorded. In the attachment information 331, as meta information, the respective pieces of information shown in FIG. 4 are recorded. These respective pieces of information are similar to those described in FIGS. 3A to 3C, and therefore a description thereof will be omitted this time.

In this manner, in a case where the image pickup operation for the panoramic image is carried out, the panoramic image generated by the image combining unit 240 is recorded in the image information 332, the attachment information related to the panoramic image is recorded in the attachment information 331. It should be noted that the generation method for the panoramic image constituting the image file 330 will be described in detail with reference to FIGS. 5A, 5B, and 6A to 6C.

Generation Example of the Panoramic Image

Figure 5A:
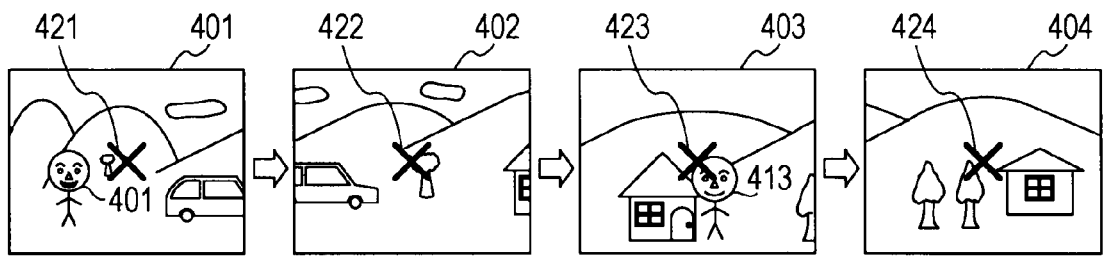
FIGS. 5A and 5B schematically show a relation between a plurality of pickup images constituting a panoramic image generated by an image combining unit and an image pickup operation state of the image pickup apparatus when these pickup images are generated according to the first embodiment of the present invention.
Figure 5B:
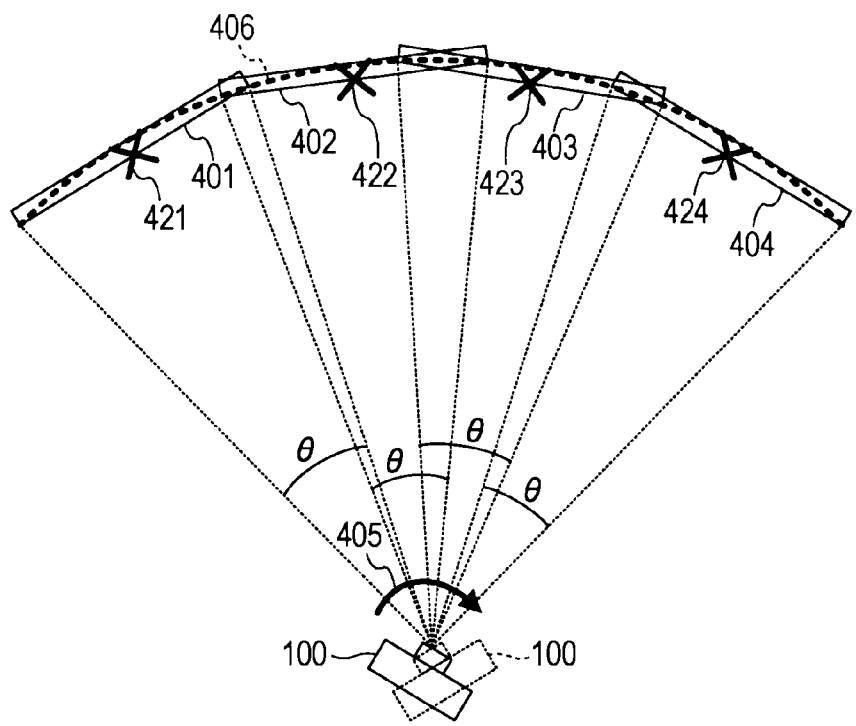

FIGS. 5A and 5B schematically show a relation between a plurality of pickup images constituting a panoramic image generated by the image combining unit 240 and an image pickup operation state of the image pickup apparatus 100 when these pickup images are generated according to the first embodiment of the present invention. FIG. 5A shows pickup images 401 to 404 generated by the image pickup unit 211. FIG. 5B shows a transition of the image pickup operation state of the image pickup apparatus 100 in a case where the pickup images 401 to 404 are generated.

The pickup images 401 to 404 shown in FIG. 5A are images picked up while mountains, a house in front of the mountains, and the like are set as the subjects. The pickup images 401 to 404 are generated, for example, as shown in FIG. 5B, through an image pickup operation (so-called panning operation) in which the image pickup apparatus 100 is moved in the horizontal direction (direction of an arrow 405) while the position of the image pickup apparatus 100 is set as the reference. For example, as the panning operation of the image pickup apparatus 100 is conducted while a photographer keeps pressing the shutter button, the image pickup operation for the panoramic image is carried out (so-called swing panorama). Also, with regard to the pickup images 401 to 404, it is possible to obtain the orientations by the orientation obtaining unit 212. In this example, center positions 421 to 424 of the subjects contained in the pickup images 401 to 404 are indicated by cross marks. Also, the pickup image 401 includes a human face 411, and the pickup image 403 includes a human face 413.

In FIG. 5B, the pickup images 401 to 404 shown in FIG. 5A are virtually arranged on a circle (on a dotted line 406), and positional relations in a case where the pickup images 401 to 404 are viewed from the top are schematically indicated by rectangulars 401 to 404. It should be noted that in FIG. 5B, the same reference symbols as the corresponding pickup images 401 to 404 are assigned to the respective rectangulars. Also, with regard to the center positions of the subjects contained in the pickup images 401 to 404 (positions in the horizontal direction), the same reference symbols as the center positions 421 to 424 shown in FIG. 5A are assigned. Also, a field angle of the pickup images 401 to 404 generated in the image pickup operation state shown in FIG. 5B is denoted by θ. It should be noted that the pickup images 401 to 404 are pickup images generated while the image pickup operation is conducted so that the same subject is contained in at least a part of the areas in the horizontal direction.

Figure 6A:
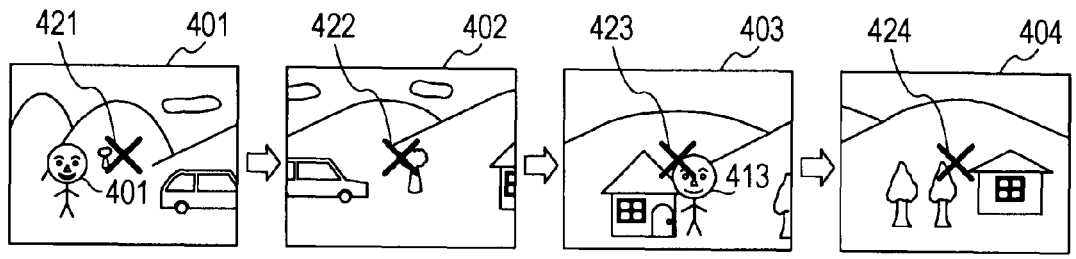
FIGS. 6A to 6C schematically show a generation method for the panoramic image by the image combining unit according to the first embodiment of the present invention.
Figure 6B:
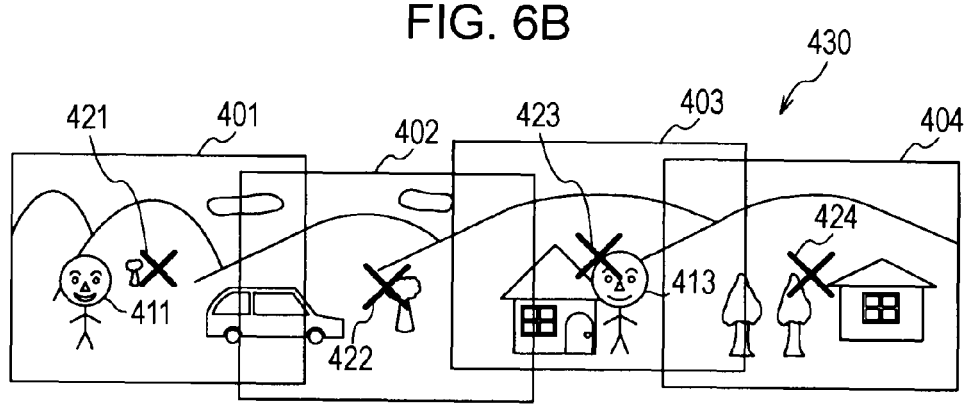
Figure 6C:
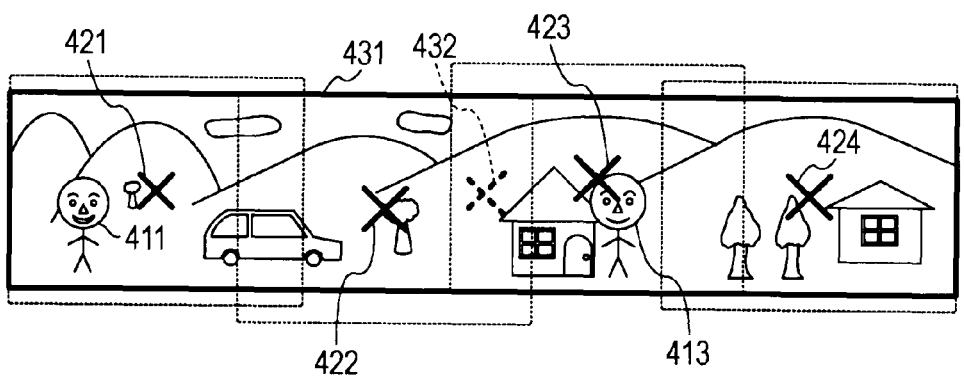

FIGS. 6A to 6C schematically show a generation method for the panoramic image by the image combining unit 240 according to the first embodiment of the present invention. It should be noted that the pickup images 401 to 404 shown in FIG. 6A are the same as those shown in FIG. 5A.

As shown in FIG. 6A, the image pickup unit 211 sequentially generates the pickup images 401 to 404. The thus generated pickup images 401 to 404 are sequentially supplied to the pickup image holding unit 220, and the pickup image holding unit 220 holds a plurality of pickup images. Then, the thus held pickup images are supplied to the moving amount detection unit 230 and the image combining unit 240.

Subsequently, the moving amount detection unit 230 detects the moving amount and the moving direction between the adjacent pickup images (that is, a relative displacement direction between the adjacent pickup images) with regard to the pickup images held by the pickup image holding unit 220. Subsequently, the moving amount detection unit 230 supplies the detected moving amount and moving direction to the image combining unit 240. For example, the moving amount detection unit 230 sequentially compares the pickup images between frames adjacent in a time series manner to detect the moving amount and the moving direction between the adjacent pickup images in the pickup image holding unit 220.

Subsequently, as shown in FIG. 6B, the image combining unit 240 combines the pickup images 401 to 404 held by the pickup image holding unit 220 in a manner that the mutual overlapping areas are mutually overlapped on the basis of the moving amount and the moving direction between the adjacent pickup images. Through this combination, a combined image 430 is generated. In this case, for example, a combined image may be generated by joining in a manner that the mutual overlapping areas are mutually overlapped with regard to partial images existing in a read range at a predetermined width from a part of the pickup image combined on the imaging plane of the image pickup element (for example, see Japanese Unexamined Patent Application Publication No. 2005-33396). Also, for example, by obtaining a relative displacement where the pixel values mutually correlate with each other with regard to the overlapping areas between the respective pickup images and performing the combination processing on the basis of this relative displacement, it is possible to improve the accuracy for a positioning processing when the images are overlapped. It should be noted that through this positioning processing, the relative displacement can be obtained by using a Lucas-Kanade method, a block matching method, or the like.

Subsequently, as shown in FIG. 6C, the image combining unit 240 carries out the trimming processing on the combined image 430 composed of the pickup images 401 to 404. This trimming processing is an image processing of cutting out an image area of a part of a panoramic image (for example, an image area in the vicinity of the center). For example, on the basis of the moving amount and the moving direction between the adjacent pickup images, the image combining unit 240 detects the moving direction between the pickup images from the panoramic image pickup operation start to the panoramic image pickup operation end (for example, the horizontal direction). Then, the image combining unit 240 performs the trimming processing on the combined image 430 on the basis of the detected moving direction to generate a panoramic image 431. In FIG. 6C, the rectangulars corresponding to the pickup images 401 to 404 are represented by dotted lines, and the panoramic image 431 generated through the trimming processing are represented by bold line rectangulars. It should be noted that the image combining unit 240 applies the trimming processing in an oblique direction, for example, in accordance with the moving direction in a case where the moving direction between the pickup images from the panoramic image pickup operation start to the panoramic image pickup operation end has an inclination. The case in which the inclination is generated in such a manner is, for example, supposed to be a case in which the photographer does not keep the image pickup apparatus 100 horizontally, and the image pickup operation is conducted while the image pickup apparatus 100 is inclined, or the like.

It should be noted that according to the first embodiment of the present invention, the example is illustrated in which the panoramic image is generated while the photographer moves the image pickup apparatus 100 in the horizontal direction when the position of the image pickup apparatus 100 is set as the reference. However, for example, the panoramic image may be generated by providing a drive unit for rotating the image pickup apparatus 100 to the image pickup apparatus 100 and moving the image pickup apparatus 100 in the horizontal direction by this drive unit. As a drive source for this drive unit, for example, a stepping motor or the like can be used. Also, for example, a panoramic image generation method of joining the respective pickup images by extracting a characteristic point in the respective pickup images and overlapping this characteristic point may be used.

Also, in this example, the example is illustrated in which the moving amount and the moving direction between the pickup images for generating the panoramic image are detected by the image analysis. However, for example, the change amount in the posture of the image pickup apparatus 100 is detected by using an angular acceleration sensor such as a gyro sensor, and the moving amount and the moving direction between the pickup images are detected on the basis of this detected change amount, so that the moving amount and the moving direction may be used. As the angular acceleration sensor, for example, a sensor for realizing a camera shake prevention function can be used. By using the angular acceleration sensor in this manner, even in a case where the moving amount detection unit 230 does not accurately detect the moving amount and the moving direction, it is possible to detect the relative position between the adjacent pickup images.

Herein, for example, a case is supposed in which the panoramic image 431 is recorded as one image file. For example, in a case where one image file is recorded on the recording medium on the basis of the Exif, basically, one piece of orientation information is recorded in one image file. For this reason, for example, similarly, also in the image file of the panoramic image 431 is recorded on the recording medium on the basis of the Exif, one piece of orientation information is recorded in one image file. As the orientation information recorded in the image file in this manner, for example, the orientation obtained with regard to the center position of the image can be set. For example, by recording the orientation obtained with regard to the center position of the image in the image file as the orientation information, it is possible to display the image while the center position in the horizontal direction of the image is set as the reference.

In view of the above, according to the first embodiment of the present invention, the example in which the representative position in the panoramic image is set as the center position of the subject contained in the panoramic image, and the orientation obtained with regard to this center position is recorded in the image file.

Figure 7:
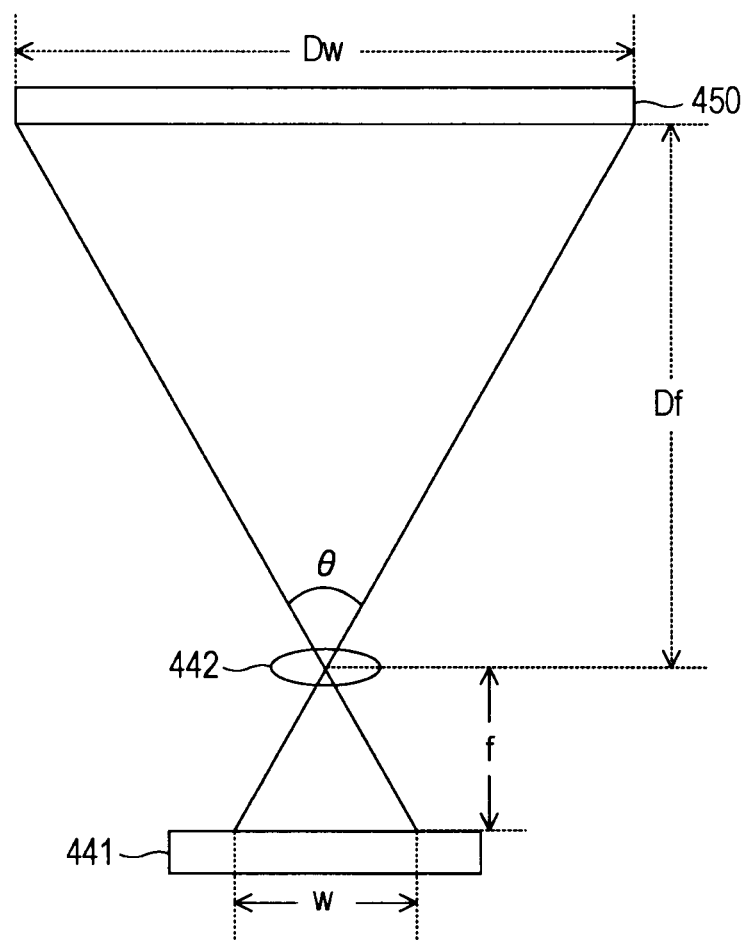
FIG. 7 schematically shows a case in which a relation between a device characteristic of the image pickup unit and a pickup image generated by the image pickup unit is seen from the top according to the first embodiment of the present invention.

Herein, for example, a case is supposed in which the orientations are obtained with regard to the center positions 421 to 424 in the pickup images 401 to 404 constituting the panoramic image 431, and any one of the thus obtained orientations is recorded in the image file as the orientation of the panoramic image 431. In this case, as shown in FIG. 6C, any of these orientations (orientations at the center positions 421 to 424) is an orientation obtained at a position different from a center position 432 in the panoramic image 431. In view of the above, in the following, an example will be illustrated in which the orientation at the representative position in the panoramic image (for example, the center position) is calculated. Calculation example for the orientation at the representative position in the panoramic image FIG. 7 schematically shows a case in which a relation between a device characteristic of the image pickup unit 211 and a pickup image generated by the image pickup unit 211 is seen from the top according to the first embodiment of the present invention. In FIG. 7, an image pickup range 450 in the horizontal direction of the pickup image generated by the image pickup unit 211 is schematically represented by a rectangular as an image pickup range 450. Also, the image pickup unit 211 is provided with the image pickup element 441 and a lens 442. It should be noted that in FIG. 7, the image pickup element 441 is schematically represented by a rectangular, and the lens 442 is schematically represented by one ellipse.

For example, when incident light from the subject contained in the image pickup range 450 enters the image pickup element 441 via the lens 442, the pickup image corresponding to the subject contained in the image pickup range 450 is imaged on the image pickup element 441. In a case where the pickup image of the subject is imaged on the image pickup element 441 in this manner, a length the horizontal direction of the pickup image imaged on the image pickup element 441 is set as a width w of the focal plane, and a focal distance is set as a lens focal distance f. In this case, the width w of the focal plane, the lens focal distance f, a width Dw of the image pickup range, a subject distance Df, and the field angle θ establish a relation shown in FIG. 7. Also, the field angle θ in this case can be obtained by using the following Expression 1.

$$\theta = (180/\pi) \times 2 \tan^{-1}(w/2f) \text{[deg]} \qquad \text{Expression 1}$$

Herein, the width w of the focal plane and the lens focal distance f are characteristic values obtained as the device characteristic of the image pickup unit 211, and the value varies depending on a model of the image pickup apparatus. In the following, an example will be illustrated in which the orientation at the representative position in the panoramic image is calculated by using this device characteristic of the image pickup unit.

Figure 8A:
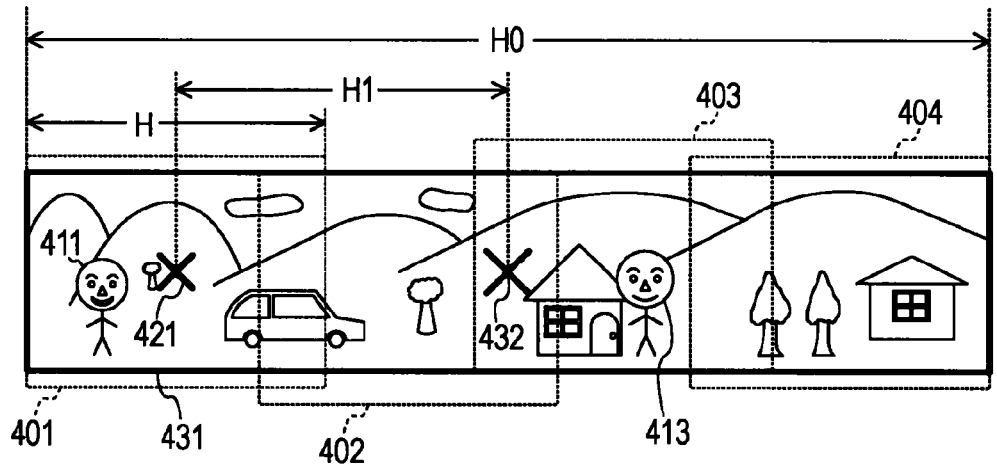
FIGS. 8A and 8B show an outline of an orientation calculation method for a representative position in a panoramic image by a panorama information calculation unit according to the first embodiment of the present invention.
Figure 8B:
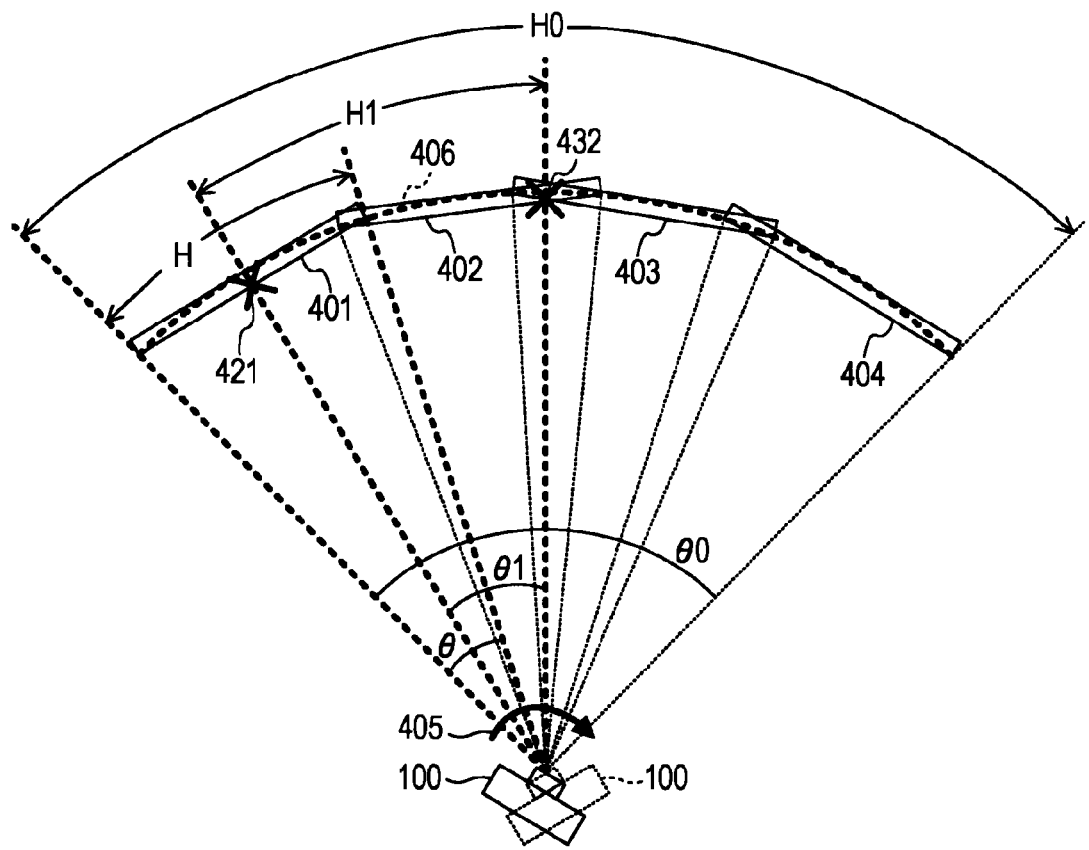

FIGS. 8A and 8B show an outline of an orientation calculation method for a representative position in a panoramic image by the panorama information calculation unit 280 according to the first embodiment of the present invention. FIG. 8A shows the panoramic image 431. It should be noted that the panoramic image 431 is similar to the panoramic image 431 shown in FIG. 6C. In this example, an example will be illustrated in which the orientation at the representative position in the panoramic image is calculated by using the orientation obtained with regard to the pickup image 401 generated for the first time when the panoramic image is generated. For example, according to the example shown in FIG. 8A, an example will be illustrated in which the orientation at the center position 432 in the panoramic image 431 is calculated by using the orientation obtained with regard to the center position 421 of the pickup image 401.

Herein, a length in the horizontal direction of the pickup image 401 generated for the first time when the panoramic image 431 is generated is set as H. Also, a distance from the position where the orientation is obtained with regard to the pickup image 401 (the center position 421 of the pickup image 401) to the center position 432 in the panoramic image 431 is set as a distance H1. Also, a length in the horizontal direction of the panoramic image 431 is set as H0. These lengths can be represented, for example, by the number of pixels in the horizontal direction (that is, the horizontal resolution).

FIG. 8B shows a transition of the image pickup operation state of the image pickup apparatus 100 in a case where the pickup images 401 to 404 constituting the panoramic image 431 are generated. It should be noted that the example shown in FIG. 8B is substantially the same as the example shown in FIG. 5B. For this reason, the common part is assigned with the same reference symbol, and a description thereof will be omitted.

In FIG. 8B, the parts corresponding to H0, H1, and H shown in FIG. 8A are respectively assigned with the same reference symbols. Herein, when an angle defined by the orientation obtained with regard to the center position 421 in the pickup image 401 and the orientation at the center position 432 in the panoramic image 431 is set as θ1, the angle θ1 can be obtained by using the following Expression 2.

$$\theta 1 = (\theta/H) \times H1 \qquad \text{Expression 2}$$

Herein, the field angle θ can be obtained by using the above-mentioned Expression 1. Also, H can be identified by the characteristic information of the image pickup unit 211. By using thus calculated θ1, the orientation at the center position 432 in the panoramic image 431 is calculated. To be more specific, while the position of the image pickup apparatus 100 is set as the reference, a value in a case where the orientation obtained with regard to the center position 421 in the pickup image 401 is rotated by θ1 is calculated as the orientation at the center position 432 in the panoramic image 431.

For example, as the orientations (east, west, south, and north) in a case where the position of the image pickup apparatus 100 (image pickup position) at the time of the image pickup is set as the reference, north is set as 0 degree (360 degrees), east is set as 90 degrees, south is set as 180 degrees, and west is set as 270 degrees. In this case, for example, in a case where the orientation obtained with regard to the center position 421 in the pickup image 401 is 270 degrees, and θ1 calculated by using Expression 2 is 40 degrees, calculated as the orientation at the center position 432 in the panoramic image 431 is 310 degrees.

Also, the angle (panorama angle) corresponding to the image pickup range for the panoramic image 431 is set as θ0, the angle θ0 can be obtained by using the following Expression 3.

$$θ0=(θ/H)×H0 \qquad \text{Expression 3}$$

The orientation at the center position in the thus calculated the panoramic image 431 and the angle θ0 are recorded in the image file of the panoramic image 431.

As illustrated above, by using the orientation of one pickup image for generating the panoramic image, it is possible to calculate the orientation at the representative position. For this reason, at the time of generating the panoramic image, it is possible to suppress the processing load when the pickup images are accumulated (during so-called panning). That is, at the time of generating the panoramic image, the respective pickup images are temporarily held, and the processing load becomes large in a case where the number of pickup images temporarily held is large. In this case, the orientations of the respective pickup images for generating the panoramic image are also sequentially held, the processing load is further increased. In contrast to this, according to the first embodiment of the present invention, the orientations of pickup images other than the first pickup image for generating the panoramic image are not held, and the processing load at the time of generating the panoramic image can be suppressed.

Also, for example, in a case where a panoramic image is generated through the panning operation due to the manual action by the photographer (swing panorama), during a period from the image pickup operation start to the image pickup operation end, the size of the panoramic image to be generated is not decided in many cases. For example, the center position of the panoramic image is not identified during the image pickup operation due to a stop timing of the image pickup operation by the photographer, the shaking of the image pickup apparatus 100, or the like. Also, for example, in a case where the manner of panning the image pickup apparatus 100 by the photographer is not satisfactory, the subject area combined as the panoramic image may be narrowed in some cases. For this reason, which position the center position of the panoramic image to be generated becomes is not decided in many cases during the image pickup operation. In contrast to this, according to the first embodiment of the present invention, at the time of generating the panoramic image, after the length in the horizontal direction of the panoramic image is confirmed, the center position (representative position) is identified. Then, as the orientation at the center position is calculated, an error of the orientation at the center position can be reduced. With this configuration, for example, in a case where the panoramic image is arranged on the map to be displayed, as the orientation at the center position and the orientation on the map can be substantially matched with each other to be arranged, it is possible to arrange the panoramic image in an appropriate direction.

It should be noted that in this example, the example of calculating the orientation at the representative position in the panoramic image by using the orientation obtained with regard to the pickup image picked up for the first time when the panoramic image is generated has been illustrated. However, for example, by using the orientation obtained with regard to the pickup image picked up for the second time or thereafter, the orientation at the representative position in the panoramic image may be calculated. Also, in this example, the center position in the horizontal direction in the panoramic image is exemplified as the representative position in the panoramic image for the description but, for example, the embodiment can be applied similarly also in a case where another position is set as the representative position. For example, in a case where a human face is contained in the panoramic image, the position of the face can be set as the representative position. Also, in a case where a plurality of faces are contained, the position of the face having the highest characteristic amount among the plurality of faces can be set as the representative position.

Operation Example of the Image Pickup Apparatus

Figure 9:
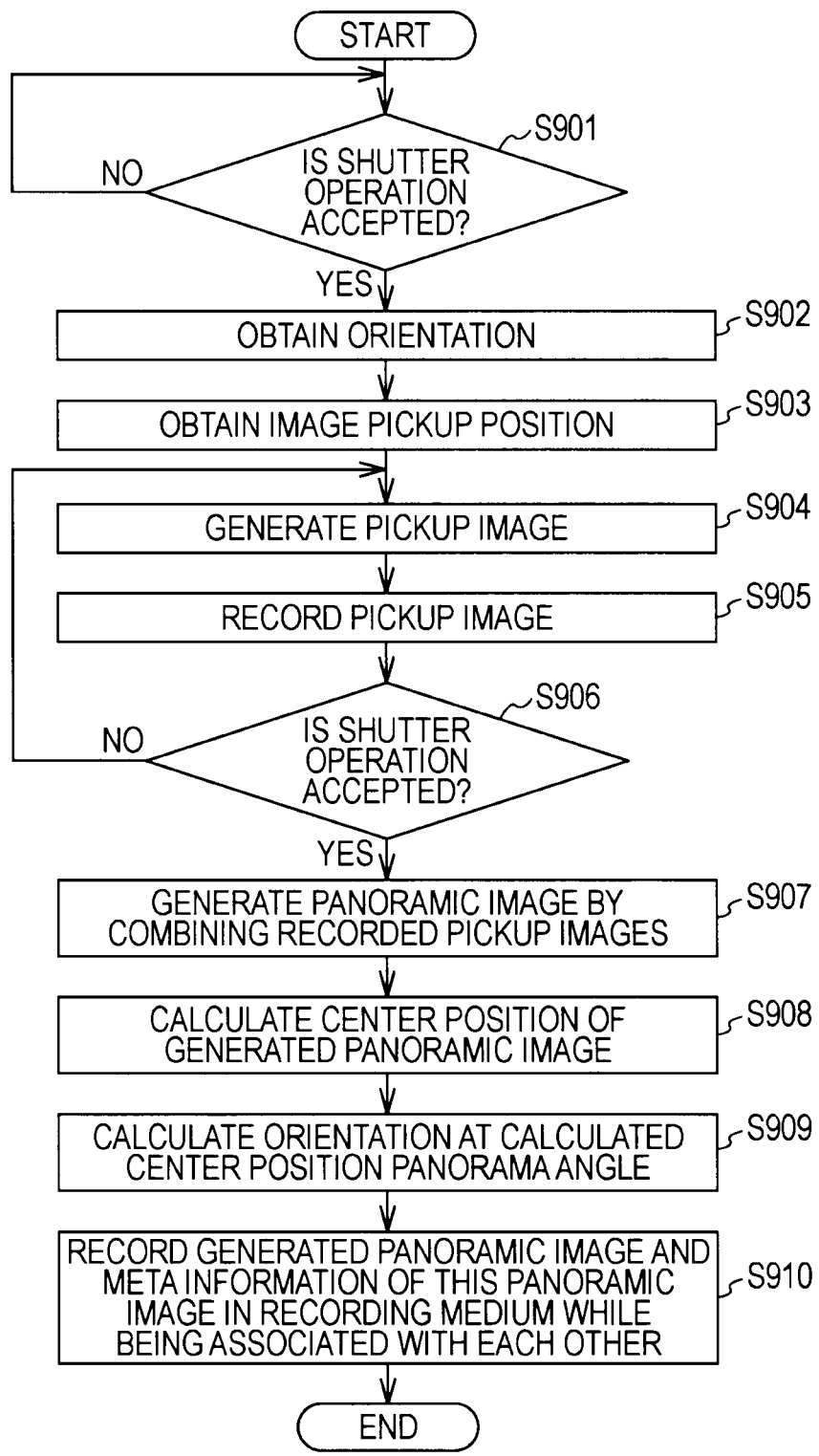
FIG. 9 is a flow chart for a processing procedure of a panoramic image recording processing by the image pickup apparatus according to the first embodiment of the present invention.

FIG. 9 is a flow chart for a processing procedure of a panoramic image recording processing by the image pickup apparatus 100 according to the first embodiment of the present invention. In this example, an example will be illustrated in which in a case where the panoramic image pickup mode is set and an image recording standby state is established, the generation of the panoramic image is stated by the shutter operation.

First, it is determined whether or not the shutter operation (the start instruction operation for instructing the panoramic image pickup operation start) is accepted by the operation acceptance unit 210 (step S901). In a case where the shutter operation is not accepted, the monitoring continues until the shutter operation is accepted. In a case where the shutter operation is accepted (step S901), the orientation obtaining unit 212 obtains the orientation related to the image pickup direction (step S902), and the image pickup position obtaining unit 213 obtains the image pickup position information related to the image pickup position (step S903). It should be noted that step S902 is an example of an orientation obtaining step described in the scope of the claims.

Subsequently, the image pickup unit 211 picks up an image of the subject to generate a pickup image (step S904), and the generated pickup image is held by the pickup image holding unit 220 (step S905). It should be noted that step S904 is an example of an image pickup step described in the scope of the claims. Subsequently, it is determined whether or not the shutter operation (the end instruction operation for instructing the panoramic image pickup operation end) is accepted by the operation acceptance unit 210 (step S906). In a case where the shutter operation is not accepted, the flow returns to step S904. In a case where the shutter operation is accepted (step S906), the image combining unit 240 combines the respective pickup images to generate the panoramic image on the basis of the moving amount and the moving direction related to the respective pickup images held by the pickup image holding unit 220 (step S907). It should be noted that step S907 is an example of an image combining step described in the scope of the claims.

Subsequently, the center position calculation unit 260 calculates the center position in the panoramic image generated by the image combining unit 240 (step S908). It should be noted that step S908 is an example of a representative position calculation step described in the scope of the claims. Subsequently, the panorama information calculation unit 280 calculates an orientation and a panorama angle the panoramic image generated by the image combining unit 240 (step S909). It should be noted that step S909 is an example of an orientation calculation step described in the scope of the claims. Subsequently, the recording control unit 290 records the panoramic image generated by the image combining unit 240 and the orientation and the panorama angle calculated by the panorama information calculation unit 280 as the image file in the image storage unit 200 (step S910). In this case, for example, the resolution conversion is conducted and the compression based on the JPEG format is carried out to record the image file. Then, the operation for the panoramic image recording processing is ended. It should be noted that step S910 is an example of a recording control step described in the scope of the claims.

Modified Example of the Panoramic Image Orientation Calculation

In the above, the description has been given of the orientation calculation example in a case where the photographer performs the panning operation of the image pickup apparatus 100 to generate the panoramic image while the position of the image pickup apparatus 100 is set as the reference. However, for example, a case of generating a panoramic image by moving the image pickup apparatus 100 on a straight line substantially parallel to the subject is also supposed. In a case where the panoramic image is generated in this manner, in the image pickup positions for the respective pickup images for generating the panoramic image, the orientations in the optical axis of the image pickup apparatus 100 are substantially equal to each other. For this reason, without carrying out the above-mentioned orientation calculation, the orientation with regard to any of the pickup images can be used as the orientation at the representative position in the panoramic image. In view of the above, in the following, an example of changing the decision method for the orientation at the representative position in the panoramic image in accordance with the image pickup operation for the panoramic image will be described.

Figure 10A:
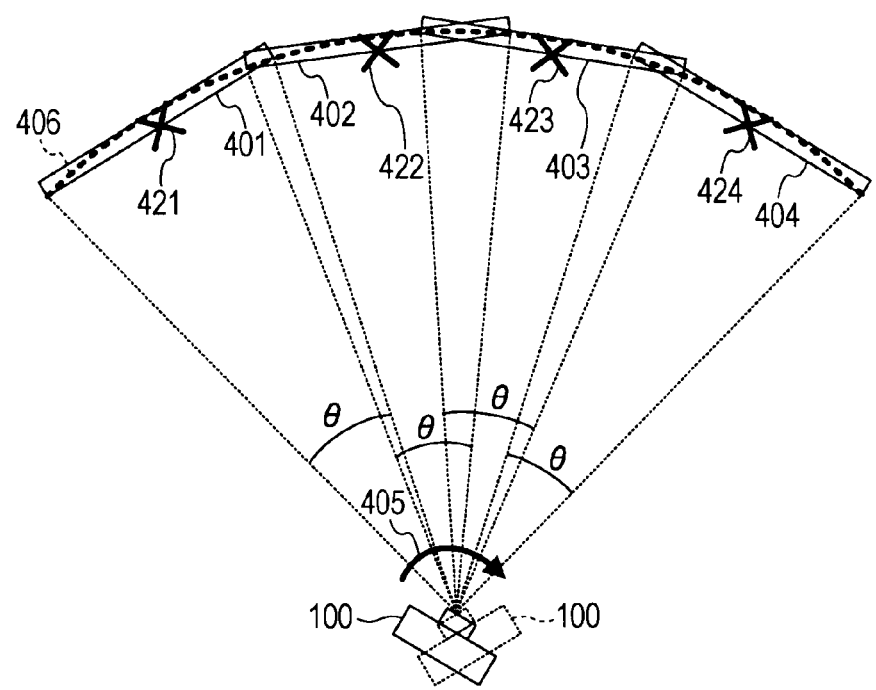
FIGS. 10A and 10B schematically show an image pickup operation when a panoramic image is generated by the image pickup apparatus according to the first embodiment of the present invention.
Figure 10B:
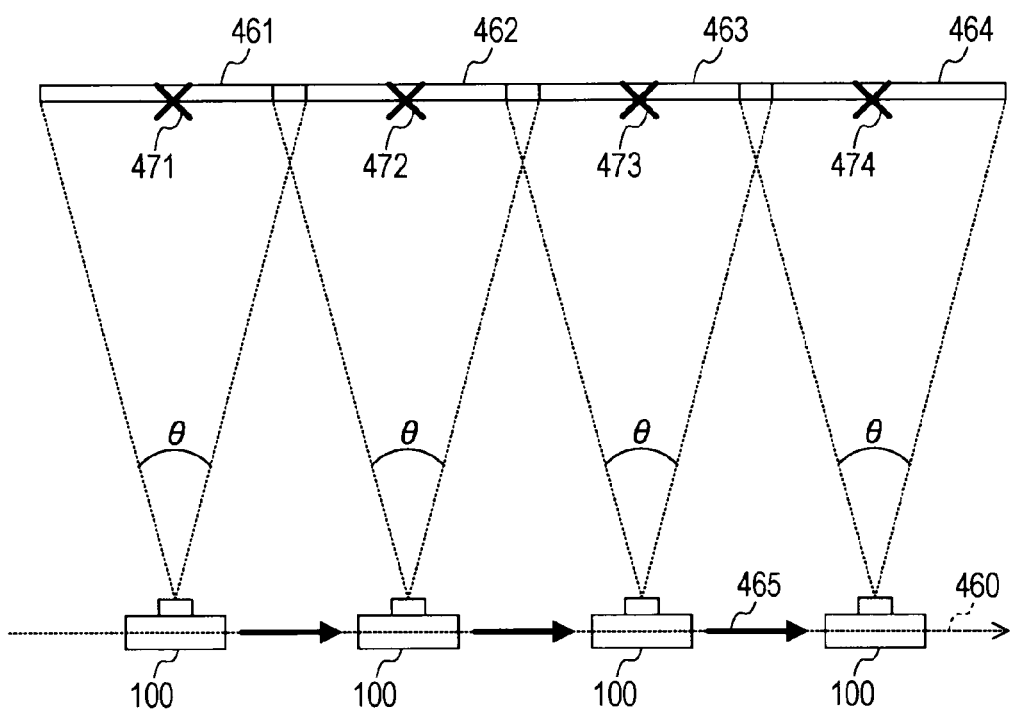

FIGS. 10A and 10B schematically show an image pickup operation when a panoramic image is generated by the image pickup apparatus 100 according to the first embodiment of the present invention. FIG. 10A schematically shows a state of the image pickup operation as viewed from the top for generating the panoramic image by rotating the image pickup apparatus 100 in the horizontal direction while the position of the image pickup apparatus 100 is set as the rotation center. It should be noted that the example shown in FIG. 10A is the same as the example shown in FIG. 5B, and therefore a description thereof will be omitted this time.

FIG. 10B schematically shows a state of the image pickup operation as viewed from the top for generating the panoramic image by moving the image pickup apparatus 100 on a straight line 460 substantially parallel to the subject. The image pickup operation shown in FIG. 10B is, for example, an image pickup operation for the panoramic image which is carried out by using a moving apparatus such as a car capable of moving in a constant speed while a direction straight with respect to a traveling direction 465 is set as an optical axis of the image pickup apparatus 100. For example, a vehicle on which a person rides carrying the image pickup apparatus 100 by hand moves in the traveling direction 465 at a constant speed. In this case, as shown in FIG. 10B, the position of the image pickup apparatus 100 is sequentially changed, but the optical axis of the image pickup apparatus 100 becomes a constant orientation. For this reason, as the orientation at the representative position in the panoramic image composed of a plurality of pickup images generated through the image pickup operation, any one of orientations obtained with regard to central positions 471 to 474 of the pickup images 461 to 464 can be used.

Herein, a case is supposed in which the tilting operation is conducted. For example, the tilting operation is an operation of rotating the image pickup apparatus 100 about the position of the image pickup apparatus 100 in the vertical direction. For this reason, it is possible to generate a panoramic image elongated in the vertical direction. Also, in this case, in a case where the rotation operation is conducted at less than 90 degrees in the vertical direction, the posture of the image pickup apparatus 100 is changed, but the optical axis of the image pickup apparatus 100 becomes a constant orientation. In view of the above, as the orientation at the representative position in the panoramic image generated through the tilting operation, any one of orientations obtained with regard to the respective pickup images for generating the panoramic image can be used. In view of the above, in this example, in accordance with the image pickup operation for the panoramic image, the decision method for the orientation at the representative position in the panoramic image is changed.

Herein, for example, in a case where the panning operation or the tilting operation is conducted, the image pickup position is not changed at the time of the operation, and only the posture of the image pickup apparatus 100 is changed. For this reason, the image pickup position obtained with regard to the first pickup image on the time axis is substantially identical to the image pickup position obtained with regard to the last pickup image on the time axis. In contrast to this, for example, as shown in FIG. 10B, in a case where the panoramic images are generated by moving the image pickup apparatus 100 on the straight line 460, the image pickup apparatus 100 is moved. For this reason, the image pickup position obtained with regard to the first pickup image on the time axis and the image pickup position obtained with regard to the last pickup image on the time axis are different from each other.

Also, for example, in a case where the panning operation is conducted, the orientation is changed at the operation. For this reason, the orientation obtained with regard to the first pickup image on the time axis and the orientation obtained with regard to the last pickup image on the time axis are different from each other. In contrast to this, in a case where the tilting operation is conducted, the orientation is substantially unchanged at the operation. For this reason, the orientation obtained with regard to the first pickup image on the time axis is substantially identical to the orientation obtained with regard to the last pickup image on the time axis.

Also, for example, as shown in FIG. 10B, in a case where the panoramic images are generated by moving the image pickup apparatus 100, the movement is carried out in a state in which the optical axis of the image pickup apparatus 100 faces the same direction, and therefore the orientations obtained with regard to the respective pickup images are substantially identical. For this reason, the orientation obtained with regard to the first pickup image on the time axis is substantially identical to the orientation obtained with regard to the last pickup image on the time axis. In contrast to this, even in a case where the pickup images are generated by moving the image pickup apparatus 100, it is supposed that a panoramic image is not generated by using these pickup images. For example, it is supposed that the image pickup operation is conducted while facing various orientations by moving the image pickup apparatus 100. In this case, the orientation obtained with regard to the first pickup image on the time axis is supposed to be different from the orientation obtained with regard to the last pickup image on the time axis.

In view of the above, among the respective pickup images for generating the panoramic image, on the basis of the orientations and the image pickup positions obtained with regard to the first pickup image and the last pickup image on the time axis, the image pickup operation determination unit 270 determines the image pickup operation state of the image pickup apparatus 100.

For example, the image pickup operation determination unit 270 compares the image pickup position obtained with regard to the first pickup image on the time axis (degrees of latitude and longitude) with the image pickup position obtained with regard to the last pickup image on the time axis. As a result of this comparison, in a case where the two image pickup positions are substantially identical to each other, a case is supposed in which the panning operation or the tilting operation is conducted. For this reason, the image pickup operation determination unit 270 compares the two orientations obtained with regard to the first pickup image and the last pickup image on the time axis, and in a case where the two orientations are different from each other, it is determined that the panning operation is conducted. On the other hand, in a case where the two orientations are substantially identical to each other, it is determined that the tilting operation is conducted.

Also, as a result of comparing the two image pickup positions obtained with regard to the first pickup image and the last pickup image on the time axis, in a case where the two image pickup positions are different from each other, a case is supposed in which the panoramic image is generated by moving the image pickup apparatus 100. In view of the above, the image pickup operation determination unit 270 compares the two orientations obtained with regard to the first pickup image and the last pickup image on the time axis, and in a case where the two orientations are substantially identical to each other, it is determined that the image pickup operation shown in FIG. 10B. On the other hand, in a case where the two orientations are different from each other, it is determined that the image pickup operation is conducted in an image pickup mode other than the image pickup mode for generating the panoramic image.

On the basis of these determination results, the panorama information calculation unit 280 decides the orientation at the representative position in the panoramic image. For example, in a case where it is determined that the panning operation is conducted, the panorama information calculation unit 280 calculates the orientation through the above-mentioned orientation calculation method and decides this calculated orientation as the orientation at the representative position in the panoramic image. Also, for example, in a case where it is determined that the tilting operation or the image pickup operation of FIG. 10B is conducted, the panorama information calculation unit 280 decides any one of the orientations obtained with regard to the respective pickup images through the image pickup operation as the orientation at the representative position in the panoramic image.

In this manner, the image pickup operation determination unit 270 determines the image pickup operation state of the image pickup apparatus 100, and on the basis of this determination result, the orientation at the representative position in the panoramic image is decided. With this configuration, even in a case where the photographer conducts various image pickup operations for the panoramic image, it is possible to decide an appropriate orientation in accordance with the image pickup operation to be recorded in a moving picture file.

In this example, the example has been illustrated in which among the respective pickup images for generating the panoramic image, by using the orientations and the image pickup positions obtained with regard to the first pickup image and the last pickup image on the time axis, the image pickup operation of the image pickup apparatus 100 is determined. However, for example, by using a posture detection censor such as the gyro sensor, the image pickup operation state of the image pickup apparatus 100 may be determined.

Operation Example of the Image Pickup Apparatus

Figure 11:
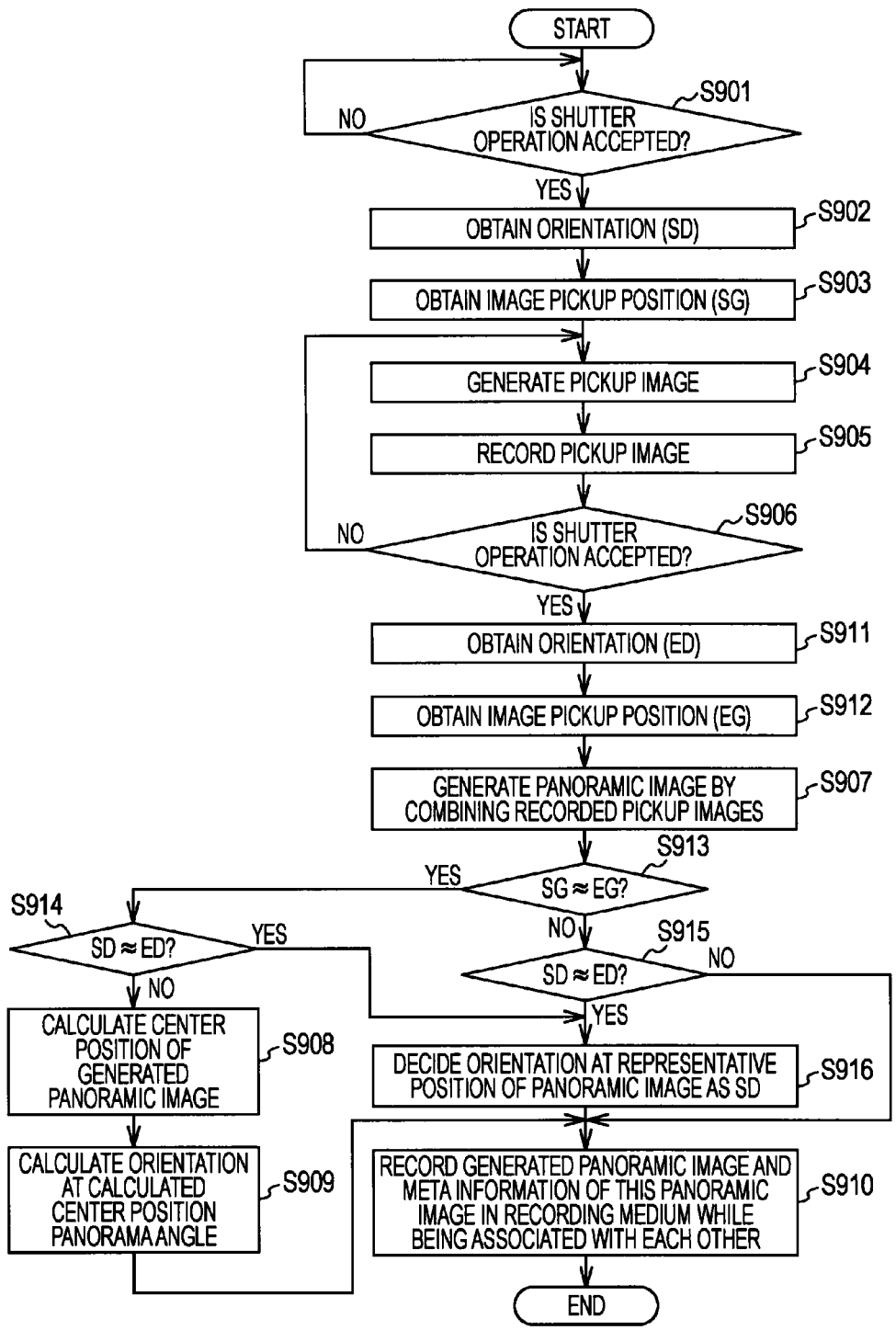
FIG. 11 is a flow chart for a processing procedure of a panoramic image recording processing by the image pickup apparatus according to the first embodiment of the present invention.

FIG. 11 is a flow chart for a processing procedure of a panoramic image recording processing by the image pickup apparatus 100 according to the first embodiment of the present invention. This example is a modified example of the panoramic image recording processing shown in FIG. 9 and is an example of deciding the orientation at the representative position in the panoramic image in accordance with the image pickup operation state of the image pickup apparatus 100. For this reason, the same part as the processing procedure shown in FIG. 9 is assigned with the same reference symbol, and a description thereof will be omitted.

In a case where the shutter operation is accepted (step S901), the orientation obtaining unit 212 obtains the orientation (SD) related to the image pickup direction (step S902), and the image pickup position obtaining unit 213 obtains the image pickup position information related to the image pickup position (SG) (step S903).

Subsequently, In a case where the shutter operation is accepted (step S906), the orientation obtaining unit 212 obtains the orientation (ED) related to the image pickup direction (step S911), and the image pickup position obtaining unit 213 obtains the image pickup position information related to the image pickup position (EG) (step S912). Then, after the image combining unit 240 generates the panoramic image (step S907), the image pickup operation determination unit 270 compares the image pickup position (SG) with the image pickup position (EG) (step S913).

In a case where the image pickup position (SG) is substantially identical to the image pickup position (EG) (step S913), the image pickup operation determination unit 270 compares the orientation (SD) with the orientation (ED) (step S914). In a case where the orientation (SD) is completely different from the orientation (ED) (step S914), the image pickup operation determination unit 270 determines that the panning operation is conducted, and the flow advances to step S908. On the other hand, in a case where the orientation (SD) is substantially identical to the orientation (ED) (step S914), the image pickup operation determination unit 270 determines that the tilting operation is conducted, and the flow advances to step S916.

On the other hand, in a case where the image pickup position (SG) is largely different from the image pickup position (EG) (step S913), the image pickup operation determination unit 270 compares the orientation (SD) with the orientation (ED) (step S915). In a case where the orientation (SD) is completely different from the orientation (ED) (step S914), the image pickup operation determination unit 270 determines that the image pickup operation is conducted in an image pickup mode other than the image pickup mode for generating the panoramic image, and the flow advances to step S910. On the other hand, in a case where the orientation (SD) is substantially identical to the orientation (ED) (step S915), the image pickup operation determination unit 270 determines that the image pickup operation shown in FIG. 10B. Then, the panorama information calculation unit 280 decides any one of the orientations obtained with regard to the respective pickup images constituting the panoramic image as the orientation at the representative position in the panoramic image (step S916).

Subsequently, the recording control unit 290 records the panoramic image generated by the image combining unit 240 and the meta information output by the panorama information calculation unit 280 as the image file in the image storage unit 200 (step S910), and the operation for the panoramic image recording processing is ended.

2. Second Embodiment

According to the first embodiment of the present invention, the example has been illustrated in which the orientation at the representative position in the panoramic image is calculated when the panoramic image is generated. Herein, the panoramic image becomes an image elongated in the horizontal direction or in the vertical direction in many cases and therefore is supposed to be unsuitable to a particular application (for example, printing or the like). For this reason, in a case where the panoramic image recorded by the image pickup apparatus is used for a particular application, for example, the trimming processing is performed in some cases for extracting a part of the panoramic image and setting this extracted part of the image as the image file. For example, a case is supposed in which the trimming processing is performed on the panoramic image elongated in the horizontal direction. For example, in a case where an image in the vicinity of en end part in the horizontal direction of the panoramic image which is elongated in the horizontal direction is extracted, an orientation related to a subject contained in this extracted image is supposed to be largely different from the orientation at the center position in the panoramic image. That is, as the position of the image extracted from the panoramic image is deviated from the center position, a larger error in the orientation of the subject is supposed to be generated.

In view of the above, according to a second embodiment of the present invention, in order to avoid the error generation in the orientation in this manner, an example is illustrated in which the orientation of the trimming image is calculated on the basis of the center position of the image (trimming image) extracted through the trimming processing and a difference with the center position of the panoramic image.

Also, as an orientation at an arbitrary position in the panoramic image can be obtained through the calculation in this manner, for example, it is possible to extract an image in which the orientation at the center position becomes a particular orientation from the panoramic image. The particular orientation can be set, for example, as orientation in unit of 90 degrees like east, west, south, and north, or in unit of 45 degrees like southwest, northeast, and the like.

Also, for example, a surrounding image at a position where a particular target (for example, a human face) exists can be extracted from the panoramic image while the orientation is set as the reference.

It should be noted that an internal configuration according to the second embodiment of the present invention is substantially identical to the image pickup apparatus 100 according to the first embodiment of the present invention, and therefore a description thereof will be omitted this time. Also, in the following, the part common to the image pickup apparatus 100 is assigned with the same reference numeral, and a description thereof will be omitted. A point different from the image pickup apparatus 100 will be mainly described.

Functional Configuration Example of the Image Pickup Apparatus

Figure 12:
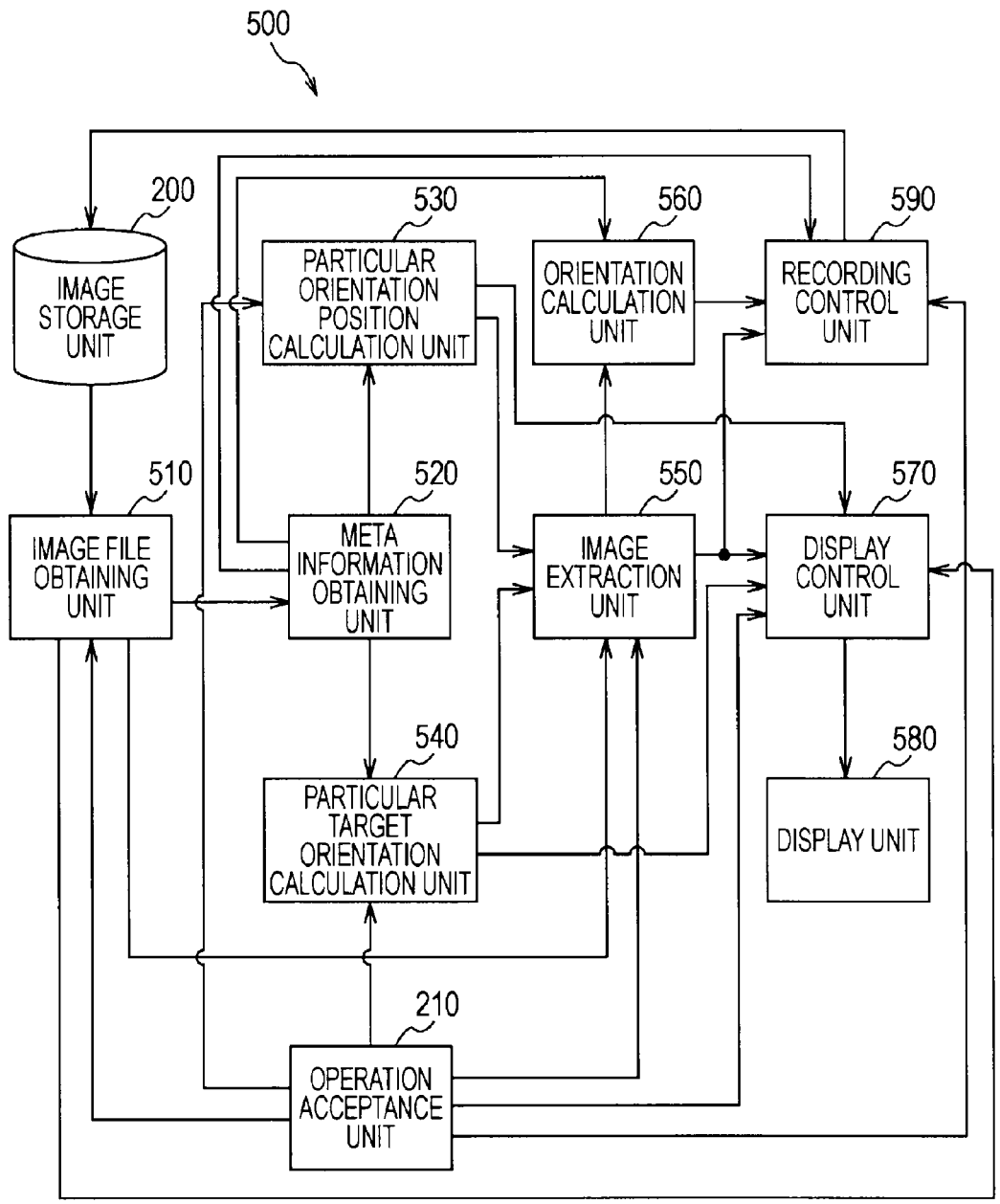
FIG. 12 is a block diagram of a functional configuration example of an image pickup apparatus according to a second embodiment of the present invention.

FIG. 12 is a block diagram of a functional configuration example of an image pickup apparatus 500 according to the second embodiment of the present invention. The image pickup apparatus 500 is provided with the image storage unit 200, the operation acceptance unit 210, the image file obtaining unit 510, a meta information obtaining unit 520, a particular orientation position calculation unit 530, and a particular target orientation calculation unit 540. Also, the image pickup apparatus 500 is provided with an image extraction unit 550, an orientation calculation unit 560, a display control unit 570, a display unit 580, and a recording control unit 590.

The image storage unit 200 is configured to store the image file and supply the stored image file to the image file obtaining unit 510. Also, on the basis of the control of the recording control unit 590, the image storage unit 200 stores the image output from the image extraction unit 550 and respective pieces of information related to this image as the image file. It should be noted that the image storage unit 200 corresponds to the image storage unit 200 shown in FIG. 2.

The operation acceptance unit 210 is an operation acceptance unit for accepting an operation input from the user and outputting an operation content in accordance with the accepted operation input to the respective units. For example, in a case where the panoramic image display mode is set, when the display instruction operation of displaying the panoramic image is accepted, the operation acceptance unit 210 outputs the operation content to the image file obtaining unit 510. Also, for example, in a case where the image such as the panoramic image is displayed, when the instruction operation of instructing the display change such as expansion or reduction on the displayed image is accepted, the operation acceptance unit 210 outputs the operation content to the display control unit 570. Also, for example, in a case where the panoramic image is displayed, when the instruction operation for the orientation instruction display is accepted, the operation acceptance unit 210 outputs the operation content to the particular orientation position calculation unit 530 or the particular target orientation calculation unit 540. Also, for example, in a case where the particular orientation is displayed, when the selection operation of selecting any one of the particular orientations is accepted, the operation acceptance unit 210 outputs the operation content to the image extraction unit 550. Also, for example, in a case where the image extracted from the panoramic image is displayed, when the recording instruction operation of recording the image as a new image file is accepted, the operation acceptance unit 210 outputs the operation content to the recording control unit 590. For example, in a case where the image extracted from the panoramic image is displayed, when the instruction operation for the trimming processing is accepted, the operation acceptance unit 210 outputs the operation content to the image extraction unit 550. It should be noted that the operation acceptance unit 210 corresponds to the operation acceptance unit 210 shown in FIG. 2.

In accordance with the operation input accepted by the operation acceptance unit 210, the image file obtaining unit 510 obtains the image file stored in the image storage unit 200 and supplies the content of the obtained image file to the respective units. For example, the image file obtaining unit 510 outputs the panoramic image of the obtained image file to the image extraction unit 550 and the display control unit 570. This panoramic image is decoded and subjected to the resolution conversion to be output. Also, the image file obtaining unit 510 outputs the meta information of the obtained image file to the meta information obtaining unit 520. It should be noted that the image file obtaining unit 510 corresponds to the resolution conversion unit 120, the image compression decompression unit 130, the CPU 160, and the removal media controller 191 shown in FIG. 1.

The meta information obtaining unit 520 is configured to obtain the meta information output from the image file obtaining unit 510 and output the content of the obtained meta information to the respective units. For example, the meta information obtaining unit 520 outputs the content of the obtained meta information to the particular orientation position calculation unit 530, the particular target orientation calculation unit 540, the orientation calculation unit 560, and the recording control unit 590. It should be noted that the meta information obtaining unit 520 corresponds to the CPU 160 shown in FIG. 1.

In accordance with the operation input accepted by the operation acceptance unit 210, on the basis of the meta information output from the meta information obtaining unit 520, the particular orientation position calculation unit 530 detects the particular orientation in the panoramic image and the position in the panoramic image in this particular orientation. Then, the particular orientation position calculation unit 530 outputs the detected particular orientation in the panoramic image to the display control unit 570. Also, the particular orientation position calculation unit 530 outputs the detected particular orientation in the panoramic image and the position to the image extraction unit 550. The detection method for this particular orientation in the panoramic image and the position will be described in detail with reference to FIGS. 17A, 17B, 18A, and 18B. It should be noted that the particular orientation position calculation unit 530 corresponds to the CPU 160 shown in FIG. 1.

In accordance with the operation input accepted by the operation acceptance unit 210, on the basis of the meta information output from the meta information obtaining unit 520, the particular target orientation calculation unit 540 is configured to detect the position and the orientation of the particular target contained in the panoramic image. Then, the particular target orientation calculation unit 540 outputs the detected orientation of the particular target to the display control unit 570. Also, the particular target orientation calculation unit 540 outputs the position and the orientation of the particular target contained in the panoramic image to the image extraction unit 550. It should be noted that in this example, the example is illustrated in which the particular target is detected on the basis of the meta information recorded at the time of generating the panoramic image, but, for example, the particular target may be detected from the panoramic image through the image analysis (for example, the face processing by the face detection unit 250 shown in FIG. 2). It should be noted that the particular target orientation calculation unit 540 corresponds to the CPU 160 shown in FIG. 1. Also, the particular target orientation calculation unit 540 is a part of a particular target detection unit described in the scope of the claims.

In accordance with the operation input accepted by the operation acceptance unit 210, the image extraction unit 550 is configured to extract a part of the image in the panoramic image output from the image file obtaining unit 510 and output the extracted image to the display control unit 570 and the recording control unit 590. Also, for example, in accordance with the operation input accepted by the operation acceptance unit 210, the image extraction unit 550 outputs the position in the panoramic image of the extracted image to the orientation calculation unit 560. Also, in accordance with the operation input accepted by the operation acceptance unit 210, the image extraction unit 550 extracts a surrounding image at the position in the particular orientation in the panoramic image output from the particular orientation position calculation unit 530 and this surrounding image and the particular orientation to the recording control unit 590. Also, in accordance with the operation input accepted by the operation acceptance unit 210, the image extraction unit 550 extracts the panoramic image output from a surrounding image at the position of the particular subject contained in the particular target orientation calculation unit 540 and outputs this surrounding image and the particular orientation to the recording control unit 590. These image extraction methods will be described in detail with reference to FIGS. 13A and 13B to FIGS. 20A and 20B, and the like. It should be noted that the image extraction unit 550 corresponds to the CPU 160 shown in FIG. 1.

The orientation calculation unit 560 is configured to calculate the orientation at the representative position in the extracted image on the basis of the meta information output from the meta information obtaining unit 520 and the position in the panoramic image of the image extracted by the image extraction unit 550. Then, the orientation calculation unit 560 outputs the calculated orientation to the recording control unit 590. It should be noted that the calculation method for the orientation at the representative position in the extracted image will be described in detail with reference to FIGS. 14A and 14B and the like. It should be noted that the orientation calculation unit 560 corresponds to the CPU 160 shown in FIG. 1.

In accordance with the operation input accepted by the operation acceptance unit 210, the display control unit 570 displays various images on the display unit 580. For example, in accordance with the operation input accepted by the operation acceptance unit 210, the display control unit 570 displays the panoramic image output from the image file obtaining unit 510 on the display unit 580. Also, in accordance with the operation input accepted by the operation acceptance unit 210, the display control unit 570 displays the image output from the image extraction unit 550 on the display unit 580. Also, in accordance with the operation input accepted by the operation acceptance unit 210, the display control unit 570 displays the particular orientation in the panoramic image output from the particular orientation position calculation unit 530 or output the orientation of the particular target from the particular target orientation calculation unit 540 on the display unit 580. These display examples will be described in detail with reference to FIGS. 13A, 13B, 16A, 16B, 19A, 19B, and the like. It should be noted that the display control unit 570 corresponds to the CPU 160 and the LCD controller 171 shown in FIG. 1.

The display unit 580 is a display unit for displaying various images on the basis of the control of the display control unit 570. The display unit 580 corresponds to the LCD 172 shown in FIG. 1.

In accordance with the operation input accepted by the operation acceptance unit 210, the recording control unit 590 records the image output from the image extraction unit 550 and the orientation at the representative position in the image output from the orientation calculation unit 560 as the image file in the image storage unit 200. It should be noted that in this image file, a part of the meta information output from the meta information obtaining unit 520 (meta information related to the extracted image) is also recorded. Also, the image file is, for example, subjected to the resolution conversion and compressed on the basis of the JPEG format to be recorded. It should be noted that the recording control unit 590 corresponds to the resolution conversion unit 120, the image compression decompression unit 130, the CPU 160, and the removal media controller 191 shown in FIG. 1.

Extraction of the Image Through the Trimming Processing

Figure 13A:
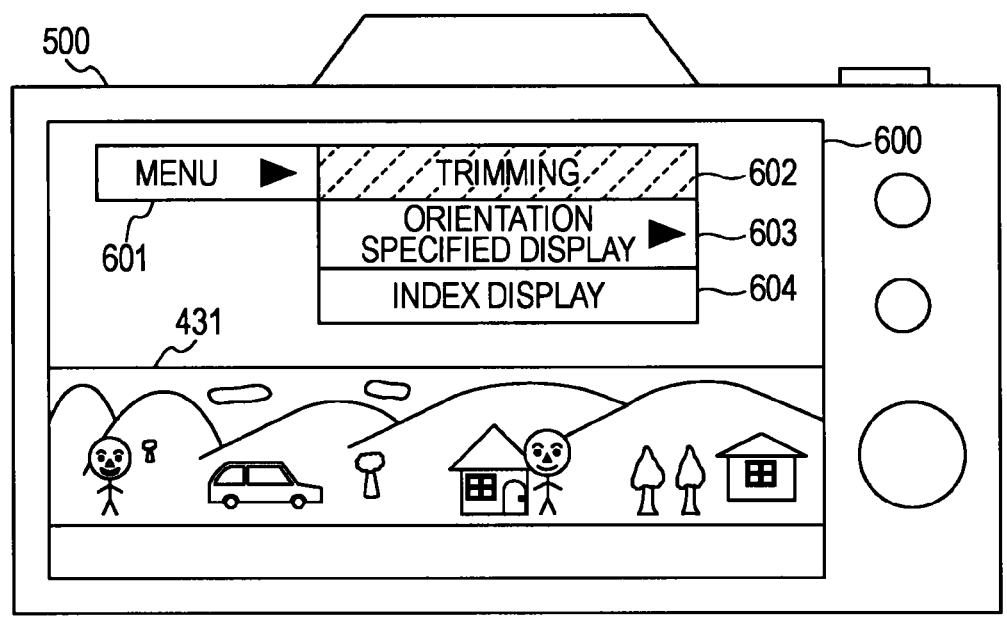
FIGS. 13A and 13B show a display example of a display screen in a display unit according to a second embodiment of the present invention.
Figure 13B:
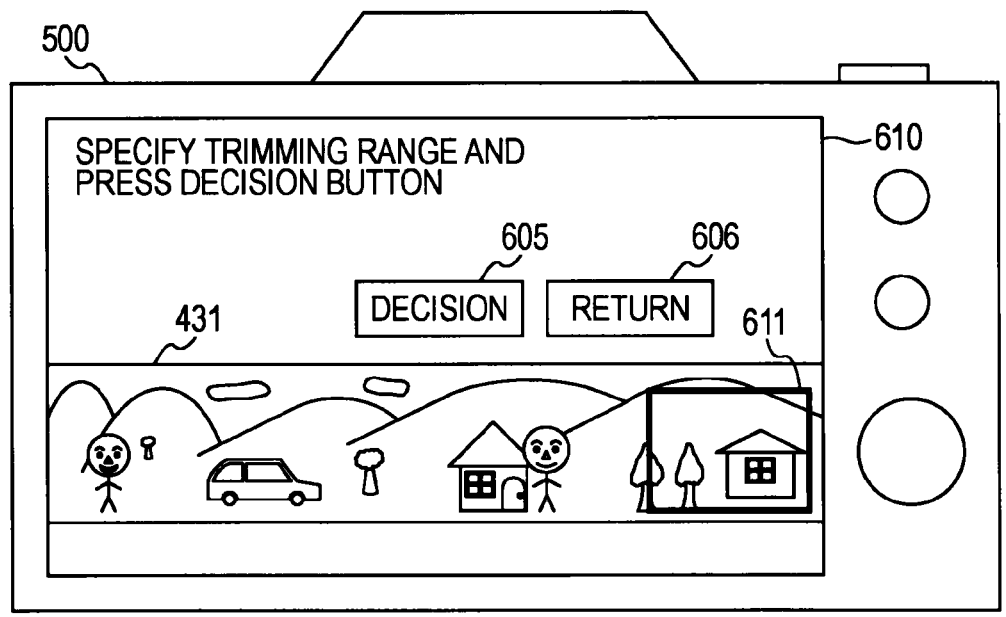

FIGS. 13A and 13B show a display example of the display screen in the display unit 580 according to the second embodiment of the present invention.

FIG. 13A shows a menu screen 600 for carrying out various processing on the panoramic image 431. On the menu screen 600, for example, on an index screen of the panoramic image (not shown), the panoramic image 431 selected by the user operation is displayed. It should be noted that the panoramic image 431 is the same as the panoramic image 431 shown in FIG. 6C and the like. Also, on the menu screen 600, a menu button 601, the trimming button 602, an orientation specified display button 603, and an index display button 604 are displayed together with the panoramic image 431. It should be noted that with regard to the buttons shown in the respective drawings, buttons added with diagonal lines are in a selected state. Also, in the following, a description will be given while an operation of selecting the respective buttons is referred as pressing.

The menu button 601 is a button to be pressed when the respective items for performing the respective processings on the panoramic image 431 are displayed. For example, on the menu screen 600, when the menu button 601 is pressed, on the right side of the menu button 601, the trimming button 602, the orientation specified display button 603, and the index display button 604 are displayed.

The trimming button 602 is a button to be pressed when the trimming processing is performed on the panoramic image 431. This trimming processing will be described in detail with reference to FIGS. 14A, 14B, and 15A to 15C.

The orientation specified display button 603 is a button to be pressed when the subject corresponding to the position in the specified orientation is displayed by specifying the orientation with regard to the panoramic image 431. This orientation specified display will be described in detail with reference to FIGS. 16A and 16B to FIGS. 20A and 20B.

The index display button 604 is a button to be pressed when an index screen for selecting a panoramic image to be displayed on the menu screen 600 is displayed.

For example, in a state in which the menu screen 600 is displayed the display unit 580, when presses the menu button 601 and then presses the trimming button 602, a trimming processing screen 610 shown in FIG. 13B is displayed. The trimming processing screen 610 is a screen for conducting the trimming processing on the panoramic image 431 displayed on the menu screen 600 shown in FIG. 13A. On the trimming processing screen 610, together with the panoramic image 431, a decision button 605 and a return button 606 are displayed.

The decision button 605 is a button to be pressed when the range of the image to be extracted through the trimming processing is decided. The return button 606 is a button to be pressed when the screen returns to the menu screen 600 shown in FIG. 13A.

Herein, a specification operation of specifying the range of the image to be extracted through the trimming processing on the trimming processing screen 610 shown in FIG. 13B will be described. For example, as shown in FIG. 13B, a case will be described in which an image in a rectangular 611 is specified as the image to be extracted through the trimming processing. For example, in a case where a touch panel is adopted as the display unit 580, as a range comparable to the rectangular 611 is traced by the user with finger, the rectangular 611 can be specified. Also, as the user presses the center position of the area in the rectangular 611 with finger and sequentially expands the range of the rectangular in accordance with the number of pressings, the rectangular 611 can be specified. Also, as the user presses two points forming opposing corners of the rectangular 611 with fingers, the rectangular 611 can be specified by the two points.

In this manner, in a case where the range of the image which is the extraction target is specified, and the trimming processing is performed on this specified image, the user presses the decision button 605 to decide the range of the image which is the extraction target. In this manner, when the operation input of deciding the range of the image which is the extraction target is performed, the image extraction unit 550 extracts an image contained in the decided range. Then, the recording control unit 590 records the extracted image (trimming image) as a new image file in the image storage unit 200. Herein, an orientation related to the trimming image recording as the new image file is different from the orientation at the center position in the panoramic image in many cases. In view of the above, in the following, a calculation method for the orientation to be recorded in the image file of the thus extracted trimming image will be described.

Orientation Calculation Example for the Trimming Image

Figure 14A:
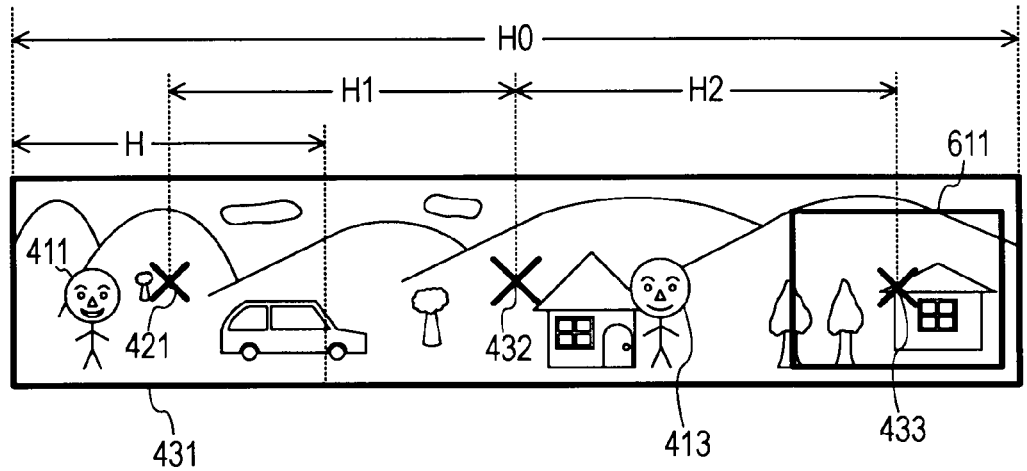
FIGS. 14A and 14B show an outline of an orientation calculation method for a representative position in a trimming image by an orientation calculation unit according to the second embodiment of the present invention.
Figure 14B:
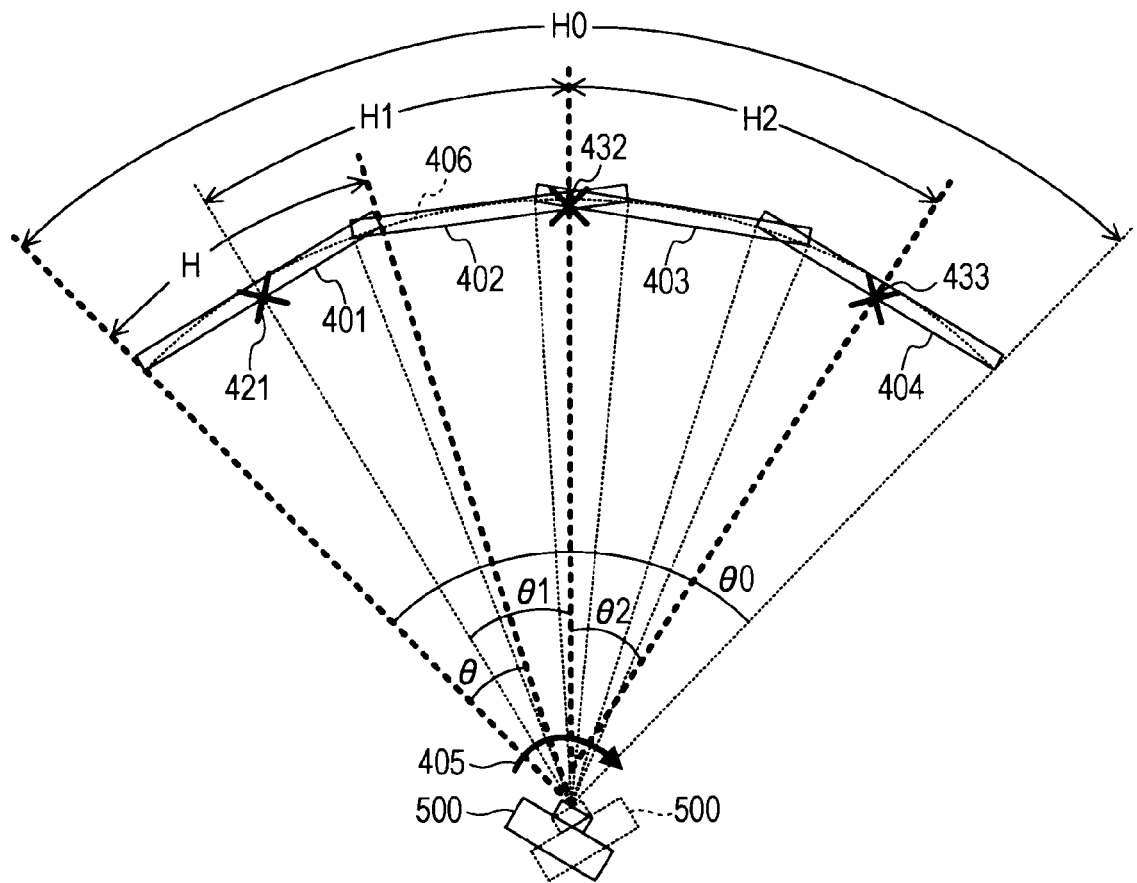

FIGS. 14A and 14B show an outline of an orientation calculation method for a representative position in a trimming image by the orientation calculation unit 560 according to the second embodiment of the present invention. FIG. 14A shows the panoramic image 431. It should be noted that the panoramic image 431 is the same panoramic image as the panoramic image 431 shown in FIG. 8A, and the common part is assigned with the same reference symbol. In this example, an example is illustrated in which the orientation at the representative position in the trimming image is calculated by using the width in the horizontal direction of the pickup image generated for the first time when the panoramic image is generated. For example, according to the example shown in FIG. 16A, an example is illustrated in which the orientation of the center position 433 of the image in the rectangular 611 is calculated by using the orientation obtained with regard to the center position 421 in the pickup image 401. Herein, a distance from the center position 432 in the panoramic image 431 to the center position 433 of the image in the rectangular 611 is set as a distance H2.

FIG. 14B shows a transition of the image pickup operation state of the image pickup apparatus 100 in a case where the pickup images 401 to 404 constituting the panoramic image 431 are generated. It should be noted that an example shown in FIG. 14B is substantially identical to the example shown in FIG. 8B. For this reason, the common part is assigned with the same reference symbol, and a description thereof will be omitted.

In FIG. 14B, the parts corresponding to H, H0, H1, and H2 shown in FIG. 14A are respectively assigned with the same reference numerals. Herein, an angle defined by the center position 432 in the panoramic image 431 and the center position 433 of the image in the rectangular 611 is set as θ2, the angle θ2 can be obtained by using the following Expression 4.

$$\theta 2=(\theta/H)\times H2 \qquad \text{Expression 4}$$

Herein, the field angle θ can be obtained by using the above-mentioned Expression 1. By using the thus calculated θ2, the orientation at the center position 433 of the image in the rectangular 611 is calculated. To be more specific, a value in a case where the position of the image pickup apparatus 500 is set as the reference and the orientation at the center position 432 in the panoramic image 431 is rotated by θ2 is calculated as the orientation at the center position 433 of the image in the rectangular 611. It should be noted that a calculation method for a numeric value for identifying the orientation is similar to the example shown in FIGS. 8A and 8B, and therefore a description thereof will be omitted this time. In this manner, on the basis of the characteristic information of the image pickup unit, the representative position in the panoramic image, the orientation at the representative position, and the representative position in the trimming image, it is possible to calculate the orientation at the representative position in the trimming image.

FIGS. 15A to 15C schematically show a relation between a trimming image generated by the image extraction unit 550 and an image file of the trimming image stored in the image storage unit 200 according to the second embodiment of the present invention. FIG. 15A shows the panoramic image 431 which becomes a target of the trimming processing, and FIG. 15B shows the trimming image 620 extracted from the panoramic image 431.

FIG. 15C schematically shows an image file 630 of the trimming image 620. The image file 630 is an image file of the trimming image generated by the image extraction unit 550, and attachment information 631 and image information 632 are recorded. It should be noted that a configuration of the image file 630 is similar to the image file 330 shown in FIG. 4, and a detailed description thereof will be omitted herein. For example, as the meta information recorded in the attachment information 331, the orientation at the center position in the trimming image calculated by the orientation calculation unit 560 is recorded. It should be noted that as the meta information recorded in the attachment information 331, information similar to the information described in FIGS. 3A to 3C can be recorded.

As illustrated above, it is possible to calculate the orientation at the representative position in the trimming image by using the orientation at the representative position in the panoramic image. With this configuration, the error in the orientation at the representative position in the trimming image can be reduced.

It should be noted that in this example, the example in which the orientation at the representative position in the trimming image is calculated by using the width in the horizontal direction of the pickup image generated for the first time when the panoramic image is generated, but the orientation may be calculated by using the panorama angle. For example, as shown in FIG. 14B, the length in the horizontal direction of the panoramic image 431 is set as H0, and the panorama angle of the panoramic image 431 is set as θ0. Also, when the angle defined by the center position 432 in the panoramic image 431 and the center position 433 of the image in the rectangular 611 is set as θ2, the angle θ2 can be obtained by using the following Expression 5.

$$\theta 2 = (\theta 0/H0) \times H2 \quad \text{Expression 5}$$

Herein, the panorama angle θ0 can be obtained by the above-mentioned Expression 3 and is recorded in the image file of the panoramic image 431 as shown in FIG. 4. In this manner, on the basis of the size in the horizontal direction in the panoramic image, the panorama angle, the representative position in the panoramic image, the orientation at the representative position, and the representative position in the trimming image, it is possible to calculate the orientation at the representative position in the trimming image.

Extraction of the Image Through the Orientation Specification

In the above, the example has been illustrated in which the range of the image extracted through the trimming processing is specified on the basis of the manual operation by the user. Herein, in the image file of the panoramic image, the orientation at the center position in the panoramic image is recorded, and it is therefore possible to obtain the particular orientation in the panoramic image (for example, east, west, south, and north) through the calculation. For this reason, for example, the extraction target range in the panoramic image can be specified on the basis of the particular orientation. In view of the above, in the following, an example will be described in which an image containing a subject located in the particular orientation among subjects contained in the panoramic image is extracted.

Figure 16A:
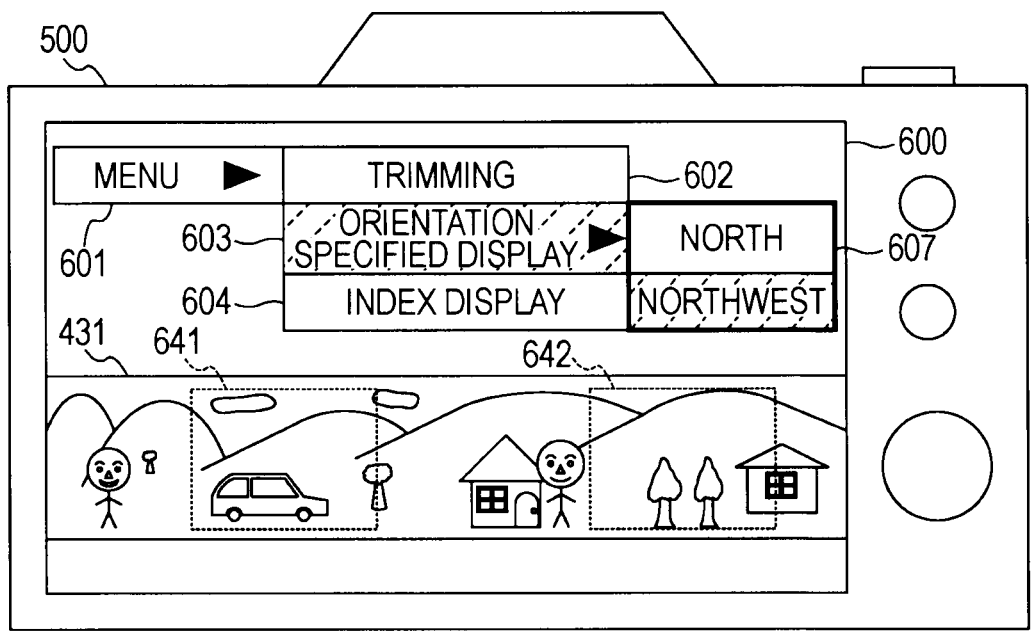
FIGS. 16A and 16B show a display example of a display screen in the display unit according to the second embodiment of the present invention.
Figure 16B:
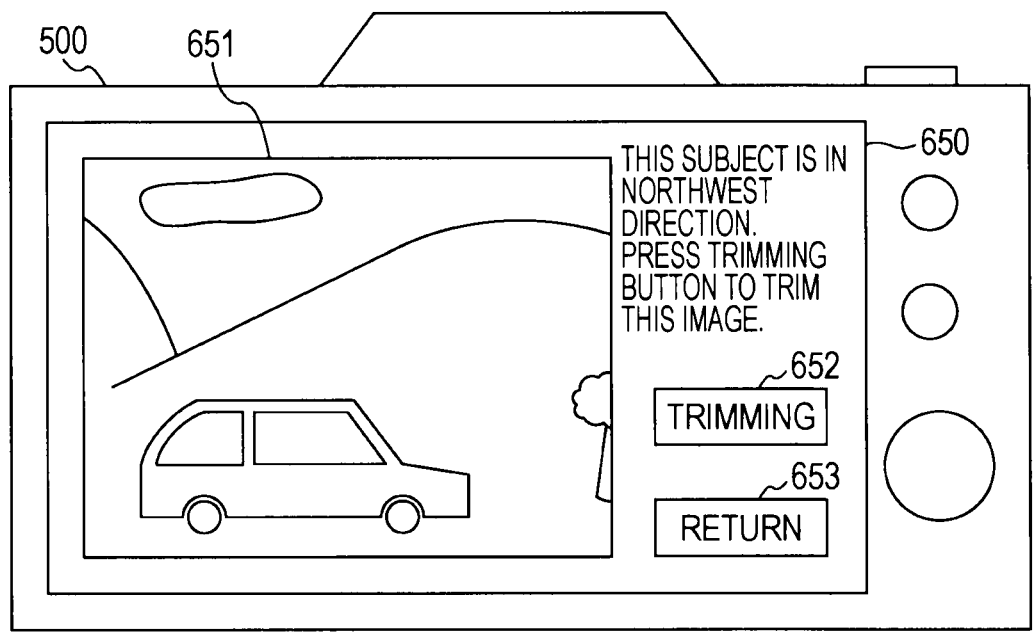

FIGS. 16A and 16B show a display example of the display screen in the display unit 580 according to the second embodiment of the present invention. FIG. 16A shows the menu screen 600 for specifying the particular orientation. It should be noted that the menu button 601, the trimming button 602, the orientation specified display button 603, and the index display button 604 on the menu screen 600 are similar to the example shown in FIG. 13A and assigned with the same reference numeral, and therefore a description thereof will be omitted this time. Also, in this example, an example will be illustrated in which the orientations in unit of 45 degrees such as east, west, south, north, southwest, and northeast are set as the particular orientations.

For example, in a state in which the menu screen 600 is displayed on the display unit 580, the user presses the menu button 601 and then presses the orientation specified display button 603. With this pressing of the orientation specified display button 603, the particular orientation of the subject contained in the panoramic image 431 displayed on the menu screen 600 is detected, and the detected particular orientation is displayed on a particular orientation display area 607. According to the example shown in FIG. 16A, for example, a case will be illustrated in which "north" and "northwest" are detected as the particular orientations of the panoramic image 431. Also, according to the display example shown in FIG. 16A, a range of an image whose center position is at "northwest" detected as the particular orientation of the panoramic image 431 is represented on the panoramic image 431 by a dotted line rectangular 641, and a range of an image whose center position is at "north" is represented on the panoramic image 431 by dotted line rectangular 642. This detection method for the particular orientation will be described in detail with reference to FIGS. 17A, 17B, 18A, and 18B.

For example, the user presses the part for "northwest" among the particular orientations "north" and "northwest" in the particular orientation display area 607 displayed after the orientation specified display button 603 is pressed on the menu screen 600. In this manner, when the part for the particular orientation "northwest" in the particular orientation display area 607 is pressed, as shown in FIG. 16B, an image 651 corresponding to the pressed particular orientation "northwest" is displayed on a specified orientation image display screen 650. That is, the image contained in the dotted line rectangular 641 in the panoramic image 431 shown in FIG. 16A is displayed on the specified orientation image display screen 650. In this case, for example, together with the image 651 corresponding to the pressed particular orientation "northwest", a message related to the particular orientation "northwest" (for example, this is a subject in the northwest direction) is displayed on the specified orientation image display screen 650. Also, together with the image 651, a trimming button 652 and a return button 653 are displayed on the specified orientation image display screen 650.

The trimming button 652 is a button to be pressed when the trimming processing is performed on the image 651 displayed on the specified orientation image display screen 650. That is, by pressing the trimming button 652, the trimming processing is performed on the image displayed on the specified orientation image display screen 650 at the time of the pressing, the image file of the image is recorded. In this case, as the orientation of the image, the particular orientation corresponding to the image is recorded. It should be noted that the trimming processing is similar to the above-mentioned processing, and therefore a description thereof will be omitted this time. The return button 653 is a button to be pressed when the screen is returned to the menu screen 600 shown in FIG. 16A.

Figure 17A:
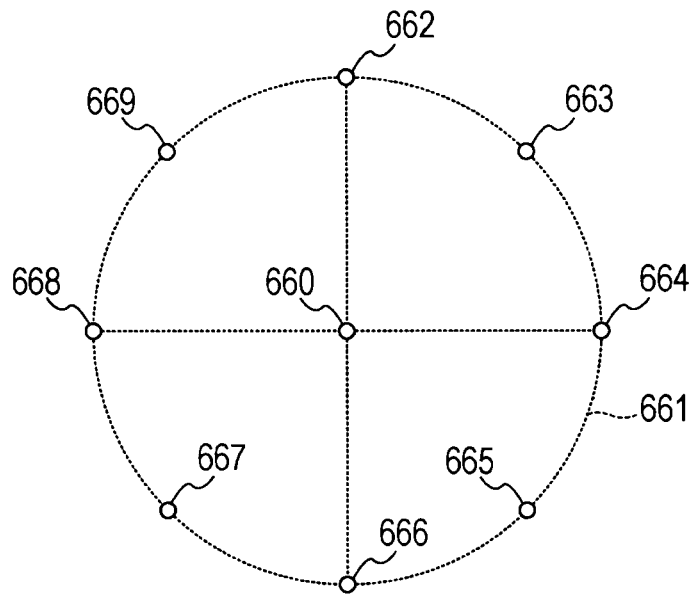
FIGS. 17A and 17B show an outline of a particular orientation and position detection method of detecting the respective particular orientations and positions thereof by a particular orientation position calculation unit according to the second embodiment of the present invention.
Figure 17B:
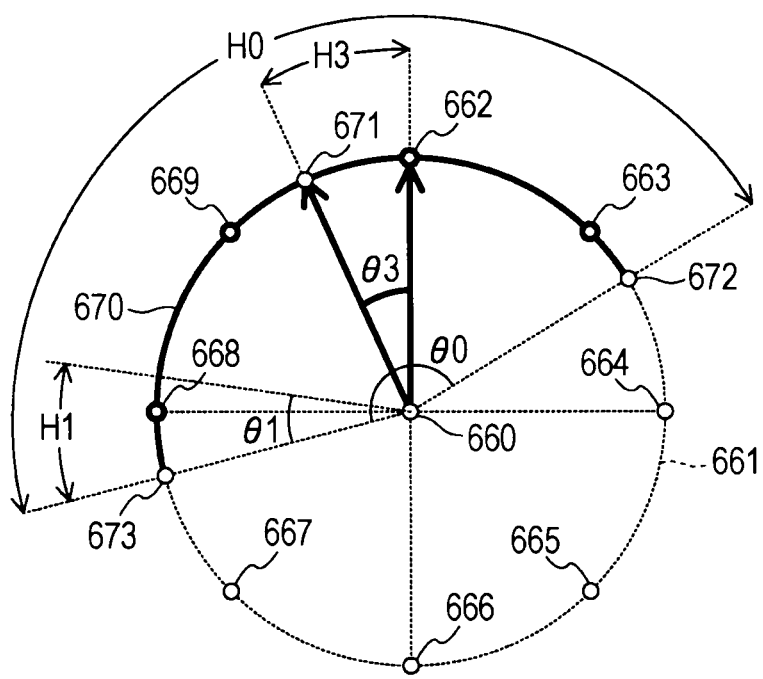

FIGS. 17A and 17B show an outline of a particular orientation and position detection method of detecting the respective particular orientations and positions thereof by the particular orientation position calculation unit 530 according to the second embodiment of the present invention. In this example, an example will be illustrated in which the position in the particular orientation is detected by using the width in the horizontal direction of the pickup image generated for the first time when the panoramic image is generated.

FIG. 17A shows the orientations (east, west, south, and north) on a circle 661 in a case where an image pickup position 660 is set as the reference at the time of the image pickup. According to the example shown in FIGS. 17A and 17B, an example will be illustrated in which in a case where north is set as 0 degree (360 degrees), east is set as 90 degrees, south is set as 180 degrees, and west is set as 270 degrees, the orientations in unit of 45 degrees such as east, west, south, north, southwest, and northeast are detected as the particular orientations. These particular orientations are represented by white circles (particular orientations 662 to 669) on the circle 661.

FIG. 17B schematically shows a relation between a panoramic image 670 and the particular orientations 662 to 669. The panoramic image 670 is, for example, a panoramic image whose orientation at the center position is an orientation between the north 662 and the northwest 669. According to the example shown in FIG. 17B, a positional relation is schematically represented in a case where the panoramic image 670 is virtually arranged on the circle 661 and the panoramic image 670 is viewed from the top. It should be noted that on the circle 661 shown in FIG. 17B, a range corresponding to the panoramic image 670 is represented by a bold line. Also, a center position 671 on the bold line corresponding to the panoramic image 670 and the particular orientation are outlined bold circles. Herein, the number of the particular orientations contained in the panoramic image 670 is four as shown in FIG. 17B (the particular orientation 662, 663, 668, and 669). As described above, it is possible to calculate an arbitrary orientation on the basis of an orientation at a center position 671 in the panoramic image 670, and therefore, for example, it is possible to calculate orientations of both-end parts 672 and 673 in the panoramic image 670. In view of the above, for example, by calculating the orientations of the both-end parts 672 and 673 in the panoramic image 670, it is possible to calculate a particular orientation existing between the orientations of the both-end parts 672 and 673. Then, the position in the panoramic image 670 in the thus detected particular orientation is calculated. For example, a length in the horizontal direction of the panoramic image 670 is set as H0, and a distance in the horizontal direction between the center position 671 in the panoramic image 670 and the position 662 in the particular orientation (north) is set as H3. Also, an angle defined by the orientation of the center position 671 in a case where the image pickup position 660 is set as the reference and the north is set as an angle θ3. Also, a length in the horizontal direction of the pickup image generated for the first time when the panoramic image 670 is generated is set as H. Then, by using the following Expression 6, a distance H3 in the horizontal direction between the center position 671 and the position 622 in the north is calculated.

$$H3 = \theta3/(\theta/H)$$ Expression 6

Herein, the field angle θ can be obtained by using the above-mentioned Expression 1. On the basis of the thus calculated distance H3 and the center position 671 in the panoramic image 670, the position 662 in the particular orientation (north) in the panoramic image 670 is detected. By using thus detected position 662 in the particular orientation (north), among the subjects contained in the panoramic image 670, the image pickup apparatus 500 can display the subject picked up in a state of facing the north direction. For example, in a case where the image pickup apparatus 500 displays the subject picked up in a state of facing the north direction, the image contained in a certain range including the position 662 in the particular orientation (north) in the panoramic image 670 is extracted by the image extraction unit 550. Then, this extracted image is displayed on the display unit 580. Also, other particular orientation existing on the panoramic image 670 can also similarly detected.

It should be noted that in this example, the example has been illustrated in which the particular orientation existing between the both-end parts 672 and 673 in the panoramic image 670 is detected, and the position corresponding to this detected particular orientation is detected. However, for example, the positions in all the particular orientations are detected, and among the detected positions, only the position contained in the panoramic image may be detected as the position in the particular direction. Also, in this example, the example has been illustrated in which the orientations in unit of 45 degrees are detected as the particular orientations, but for example, the orientations in unit of 90 degrees such as east, west, south, and north may be detected as the particular orientations. Also, orientations in further smaller unit than the orientations in unit of 45 degrees may be detected.

Figure 18A:
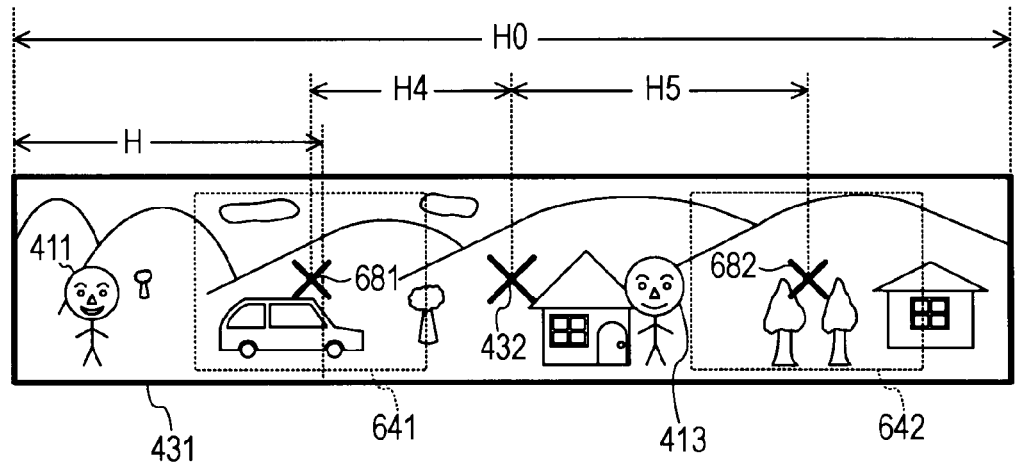
FIGS. 18A and 18B show an outline of a particular orientation and position detection method of detecting the respective particular orientations and positions thereof by the particular orientation position calculation unit according to the second embodiment of the present invention.
Figure 18B:
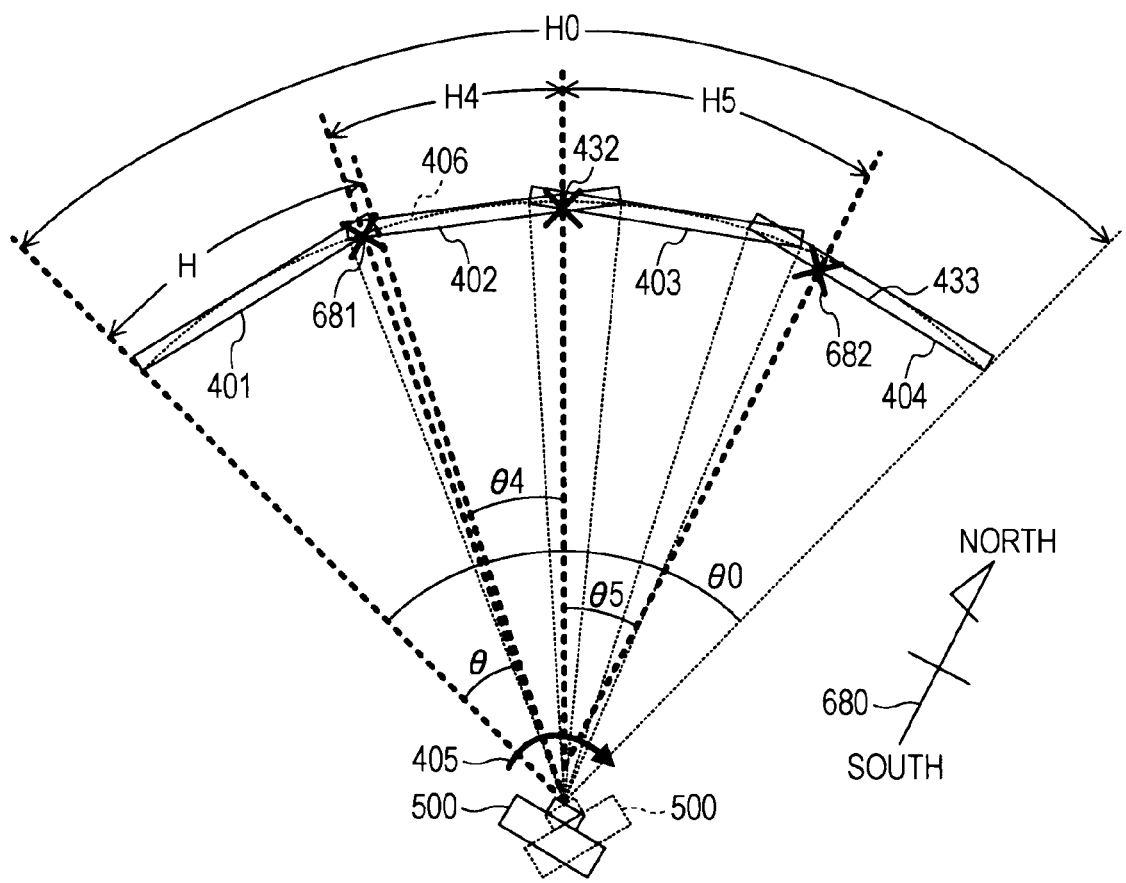

FIGS. 18A and 18B show an outline of a particular orientation and position detection method of detecting the respective particular orientations and positions thereof by the particular orientation position calculation unit 530 according to the second embodiment of the present invention. This example is an example of detecting the panoramic image 431 the particular orientation and the position with regard to shown in FIG. 16A. It should be noted that the detection method for the particular orientation and the position is similar to the example shown in FIGS. 17A and 17B, and a detailed description thereof will be omitted herein. It should be noted that a map symbol 680 shown in FIG. 18B is a map symbol representing east, west, south, and north.

FIG. 18A shows the panoramic image 431. It should be noted that the panoramic image 431 is the same panoramic image as the panoramic image 431 shown in FIG. 8A, and the common part is assigned with the same reference symbol. Herein, the number of the particular orientations contained in the panoramic image 431 is two as shown in FIG. 18B (the particular orientation (northwest) 681 and the particular orientation (north) 682). For example, a length in the horizontal direction of the panoramic image 431 is set as H0, and a distance in the horizontal direction between the center position 432 in the panoramic image 431 and the position 681 in the particular orientation (northwest) is set as H4. Also, an angle defined by the orientation at the center position 432 and the northwest in a case where the image pickup position of the image pickup apparatus 500 is set as the reference is set as an angle θ4. Also, a length in the horizontal direction of the pickup image generated for the first time when the panoramic image 431 is generated is set as H. In this case, by using the above-mentioned Expression 6, the distance H4 in the horizontal direction between the center position 432 and the position 681 in northwest is calculated. Similarly, a distance H5 in the horizontal direction between the center position 432 in the panoramic image 431 and the position 682 in the particular orientation (north) can also be calculated. On the basis of the thus calculated distances H4 and H5 and the center position 432 in the panoramic image 431, positions 681 and 682 in the particular orientation (north and northwest) in the panoramic image 431 are detected.

Also, the thus detected particular orientations (north and northwest) are displayed in the particular orientation display area 607 shown in FIG. 16A. Herein, for example, as shown in FIG. 16A, a case is supposed in which the particular orientation (northwest) is specified among the particular orientations (north and northwest) displayed in the particular orientation display area 607. In this case, an image contained in the certain range (the rectangular 642) including the position 683 of the particular orientation (northwest) in the panoramic image 431 is extracted from the image extraction unit 550. Then, as shown in FIG. 16B, the extracted image 651 is displayed on the specified orientation image display screen 650.

As illustrated above, by using the orientation at the representative position in the panoramic image, it is possible to detect the position in the particular orientation. With this configuration, it is possible to specify the image preferred by the user on the basis of the particular orientation.

It should be noted that in this example, an example is illustrated in which the position in the particular orientation is detected by using a width in the horizontal direction of the pickup image generated for the first time when the panoramic image is generated, but the position may be calculated by using the panorama angle. For example, as shown in FIG. 18B, the length in the horizontal direction of the panoramic image 431 is set as H0, and the panorama angle of the panoramic image 431 is set as θ0. Also, the distance in the horizontal direction between the center position 432 in the panoramic image 431 and the position 681 in the particular orientation (northwest) is set as H4. Also, when an angle defined by the orientation at the center position 432 and the northwest in a case where the image pickup position of the image pickup apparatus 500 is set as the reference is set as an angle θ4, the angle H4 can be obtained by using the following Expression 7.

$$H4=θ4/(θ0/H0)$$ Expression 7

Herein, the panorama angle θ0 can be obtained by using the above-mentioned Expression 3 and is recorded, as shown in FIG. 4, in the image file of the panoramic image 431. Extraction of the image through the specification of the orientation containing the particular target In the above, by specifying the example has been illustrated in which the particular orientation in the panoramic image, an image containing the subject corresponding to the specified particular orientation is extracted. Herein, in a case where a part of an image contained in the panoramic image is extracted, it is supposed that a user's preference can also be reflected by setting a type of the subject contained in the panoramic image as the reference instead of setting the orientation in the panoramic image as the reference. For example, it is conceivable that by specifying the particular target such as the human face, the subject containing this particular target can be extracted. In view of the above, in the following, an example will be described in which the orientation corresponding to the subject containing the particular target among the subjects contained in the panoramic image is detected.

Figure 19A:
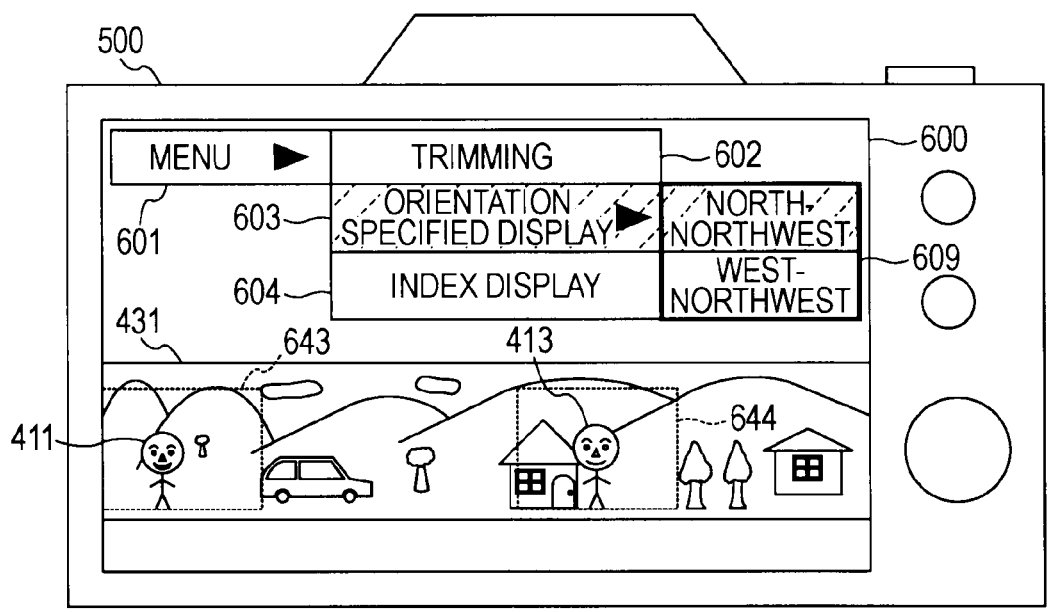
FIGS. 19A and 19B show a display example of a display screen in the display unit according to the second embodiment of the present invention.
Figure 19B:
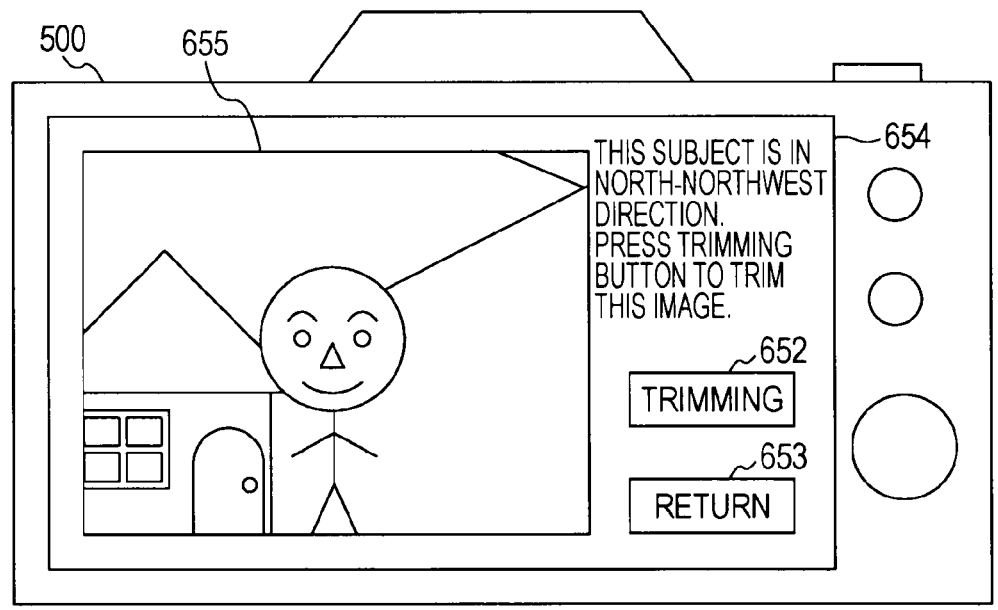

FIGS. 19A and 19B show a display example of the display screen in the display unit 580 according to the second embodiment of the present invention. FIG. 19A shows the menu screen 600 for specifying the orientation corresponding to the subject containing the particular target. It should be noted that the menu button 601, the trimming button 602, and the index display button 604 on the menu screen 600 are similar to the example shown in FIG. 16A and assigned with the same reference numeral, and therefore a description thereof will be omitted this time.

For example, in a state in which the menu screen 600 is displayed on the display unit 580, the user presses the menu button 601 and then presses the orientation specified display button 603. With this pressing of the orientation specified display button 603, the particular target (for example, the human face) among the subjects contained in the panoramic image 431 displayed on the menu screen 600 is detected, and the orientation of the subject containing the detected particular target is displayed on a particular target orientation display area 609.

According to the example shown in FIG. 19A, for example, a case is illustrated in which the human faces 411 and 413 contained in the panoramic image 431 are detected. Also, according to the display example shown in FIG. 19A, a range of the image containing the human face 411 is represented by a dotted line rectangular 643 on the panoramic image 431, and a range of the image containing the human face 413 is represented by a dotted line rectangular 644 on the panoramic image 431.

For example, it is supposed that among the orientations "north-northwest" and "west-northwest" containing the particular target on the particular target orientation display area 609 displayed after the orientation specified display button 603 is pressed on the menu screen 600, the user presses a part "north-northwest". In this manner, when the part for "north-northwest" as the orientation containing the particular target on the particular target orientation display area 609 is pressed, as shown in FIG. 19B, an image 655 corresponding to the pressed orientation "north-northwest" is displayed on a particular target image display screen 654. That is, the image contained in the dotted line rectangular 644 in the panoramic image 431 shown in FIG. 19A is displayed on the particular target image display screen 654. In this case, for example, together with the image 655 corresponding to the pressed orientation "north-northwest", the orientation "north-northwest" and a message related to the particular target (for example, the person is in the north-northwest direction.) are displayed on the particular target image display screen 654. Also, on the particular target image display screen 654, together with the image 655, the trimming button 652 and the return button 653 are displayed. It should be noted that the trimming button 652 and the return button 653 are identical to those shown in FIG. 16B, and therefore a description thereof will be omitted this time.

Figure 20A:
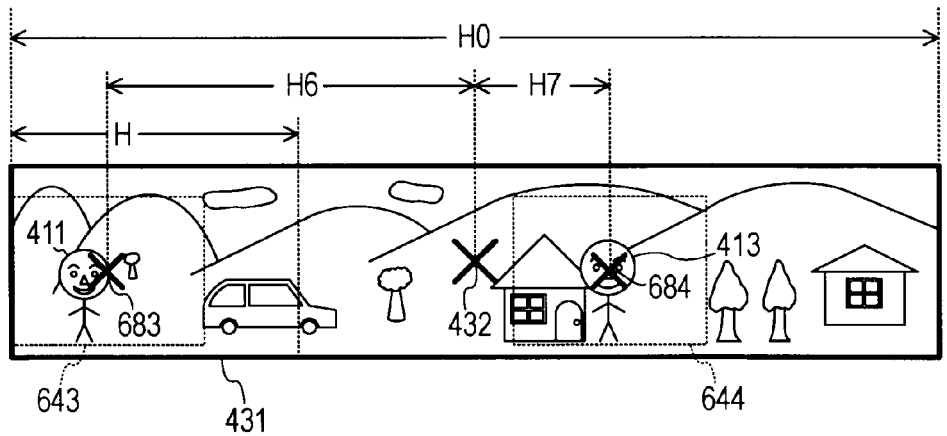
FIGS. 20A and 20B show an outline of a particular target orientation detection method of detecting orientations of the respective particular targets by a particular target orientation calculation unit according to the second embodiment of the present invention.
Figure 20B:
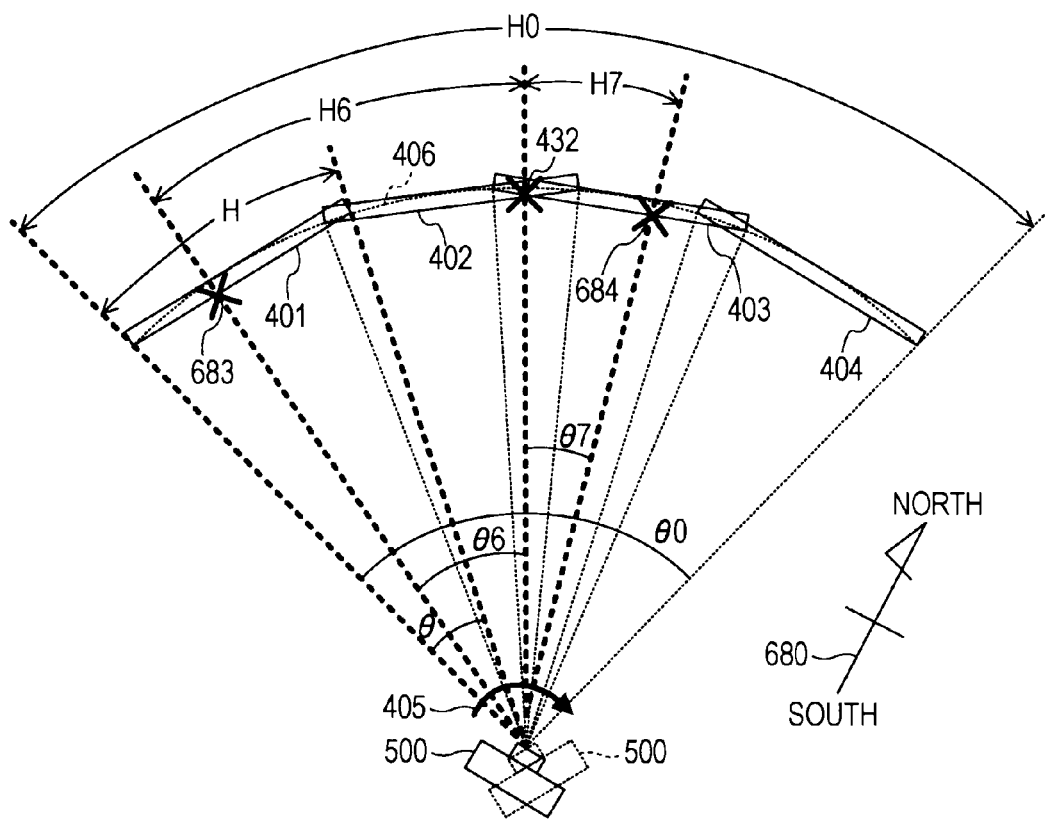

FIGS. 20A and 20B show an outline of a particular target orientation detection method of detecting orientations of the respective particular targets by the particular target orientation calculation unit 540 according to the second embodiment of the present invention. This example is an example of detecting an orientation at a position including the particular target with regard to the panoramic image 431 shown in FIG. 19A. It should be noted that an orientation calculation method for the position in the panoramic image is similar to the above-mentioned orientation calculation method, and a detailed description thereof will be omitted herein.

FIG. 20A shows the panoramic image 431. It should be noted that the panoramic image 431 is the same panoramic image as the panoramic image 431 shown in FIG. 8A, and the common part is assigned with the same reference symbol. Herein, the number of the particular targets contained in the panoramic image 431 is two as shown in FIG. 20A (the human faces 411 and 413). For example, on the basis of face information recorded in the image file of the panoramic image 431, the particular target orientation calculation unit 540 detects the human faces 411 and 413 contained in the panoramic image 431 and identifies these positions and sizes. On the basis of the thus identified position 683 of the human face 411, the particular target orientation calculation unit 540 calculates a distance H6 from the center position 432 in the panoramic image 431 to the position 683 of the human face 411. Similarly, the particular target orientation calculation unit 540 calculates a distance H7 from the center position 432 in the panoramic image 431 to a position 684 of the human face 413. On the basis of the thus calculated distance H6, the particular target orientation calculation unit 540 uses Expression 4 or Expression 5 to calculate the orientation at the position 683 of the human face 411 in the panoramic image 431. Similarly, the particular target orientation calculation unit 540 uses Expression 4 or Expression 5 to calculate the orientation at the position 684 of the human face 413 in the panoramic image 431. Herein, as the thus calculated orientation at the position of the particular target, for example, the orientation can be classified into the orientations in unit of 90 degrees such as east, west, south, and north and the orientations in unit of 90 degrees such as southwest and northeast. In this example, an example will be illustrated in which the classification is made into the orientations in unit of 90 degrees such as south southwest and north northeast. For example, the orientation at the position 683 of the human face 411 is classified into "west-northwest", the orientation at the position 684 of the human face 413 is classified into "north-northwest".

The thus classified orientations (north-northwest and west-northwest) are displayed on the particular target orientation display area 609 shown in FIG. 19A. Herein, for example, as shown in FIG. 19A, a case is supposed in which among the orientations displayed on the particular target orientation display area 609 (north-northwest and west-northwest), the orientation (north-northwest) is specified. In this case, an image contained in the certain range (the rectangular 644) including the position 684 in the orientation (north-northwest) in the panoramic image 431 is extracted by the image extraction unit 550. Then, as shown in FIG. 19B, an extracted image 655 thereof is displayed on the particular target image display screen 654.

As illustrated above, by using the orientation at the representative position in the panoramic image, it is possible to detect the orientation at the position of the particular target. With this configuration, it is possible to specify the image containing the particular target preferred by the user on the basis of the orientation. It should be noted that as the orientation specification display, whether the particular orientation is specified or the image containing the particular orientation is specified on the basis of the orientation may be set through the manual operation by the user. Also, a plurality of particular targets (for example, a normal face of a person, a smiling face of a person, and pets (a dog and a cat)) can be selected through the manual operation by the user, and the orientation at the position of the selected particular target may be detected.

In this manner, according to the second embodiment of the present invention, by using the orientation at the representative position in the panoramic image, the orientation at the representative position in the extracted image is calculated, and this calculated orientation and the extracted image can be recorded in the image file. For this reason, for example, an accurate orientation can be recorded with regard to an image obtained by extracting a part of a panoramic image. With this configuration, for example, when the image is overlapped on the map and displayed by using the image file of the extracted image, the image can be arranged on the map on the basis of the image pickup direction at the time of the image pickup for the subject contained in the image. In this case, the error in the image pickup direction can be reduced.

Operation Example of the Image Pickup Apparatus

Figure 21B:
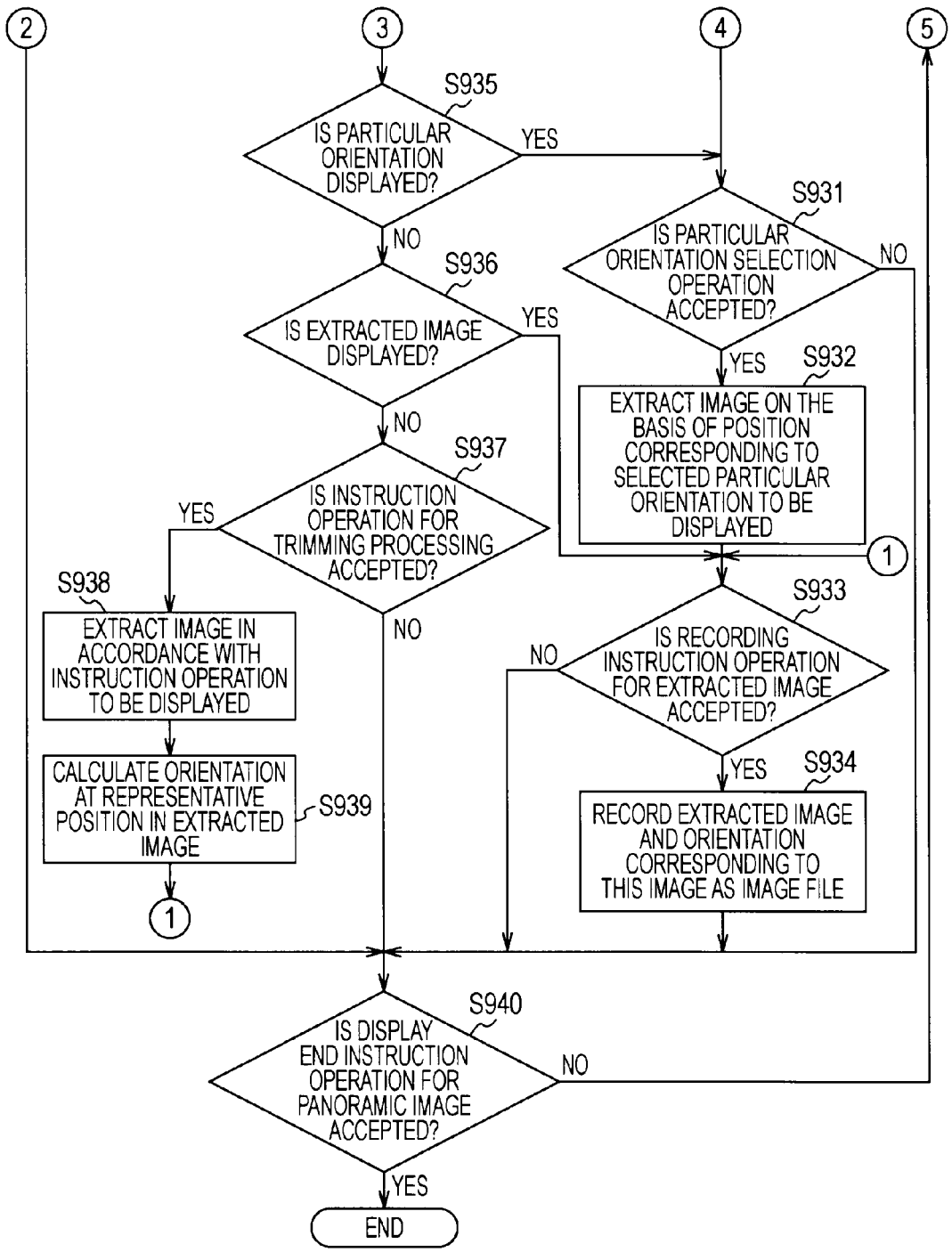
FIG. 21 is a flow chart for a processing procedure of an image extraction processing for a panoramic image by the image pickup apparatus according to the second embodiment of the present invention.

FIG. 21 is a flow chart for a processing procedure of an image extraction processing for a panoramic image by the image pickup apparatus 500 according to the second embodiment of the present invention. In this example, an example will be illustrated in which in a case where the panoramic image display mode is set, an image extraction processing is carried out on a panoramic image specified on an index screen. Also, an example will be illustrated in which the particular orientation is displayed as the orientation specification display.

First, it is determined whether or not the display instruction operation of displaying the panoramic image is accepted by the operation acceptance unit 210 (step S921). For example, on the index screen of the panoramic image, the display specification operation is conducted by selecting a desired panoramic image by the user. In a case where the display instruction operation is not accepted, the monitoring continues until the display instruction operation is accepted. In a case where the display instruction operation is accepted (step S921), the image file obtaining unit 510 obtains the image file stored in the image storage unit 200 in accordance with the display instruction operation (step S922). In this case, the image file obtaining unit 510 decodes the panoramic image of the obtained image file and conducts the resolution conversion to be output to the display control unit 570. Subsequently, the display control unit 570 displays the panoramic image of the obtained image file on the display unit 580 (step S923).

Subsequently, it is determined whether or not the display instruction operation of displaying a panoramic image other than the panoramic image displayed on the display unit 580 (so-called file feeding operation) is accepted by the operation acceptance unit 210 (step S924). In a case where the display instruction operation is not accepted, the flow advances to step S925, and in a case where the display instruction operation is accepted, the flow returns to step S922.

Subsequently, it is determined whether or not the specification operation for the expansion or reduction (so-called zoom scale factor change) or the change of the display position with regard to the image displayed on the display unit 580 is accepted by the operation acceptance unit 210 (step S925). In a case where the specification operation is accepted (step S925), in accordance with the specification operation, the display control unit 570 performs the display change processing on the image displayed on the display unit 580 (step S926), and the flow advances to step S940.

In a case where the instruction operation is not accepted (step S925), it is determined whether or not the instruction operation for the orientation instruction display is accepted by the operation acceptance unit 210 (step S927). For example, as the orientation specified display button 603 shown in FIGS. 13A and 13B is pressed, the instruction operation for the orientation instruction display is conducted. In a case where the instruction operation for the orientation instruction display is accepted (step S927), the particular orientation position calculation unit 530 detects the particular orientation in the panoramic image displayed on the display unit 580 (step S928). Subsequently, the particular orientation position calculation unit 530 detects the position in the panoramic image in the detected particular orientation (step S929). Subsequently, the display control unit 570 displays the detected particular orientation on the display unit 580 (step S930). For example, in the particular orientation display area 607 shown in FIG. 16A, the detected particular orientation is displayed.

Subsequently, it is determined whether or not the selection operation for selecting the particular orientation displayed on the display unit 580 is accepted by the operation acceptance unit 210 (step S931). In a case where the selection operation is accepted (step S931), the image extraction unit 550 extracts the image contained in a certain range including the position in the panoramic image in the selected particular orientation. Then, the display control unit 570 displays the extracted image on the display unit 580 (step S932). Subsequently, it is determined whether or not the recording specification operation of recording the image displayed on the display unit 580 as a new image file is accepted by the operation acceptance unit 210 (step S933). For example, as the trimming button 652 shown in FIG. 16B is pressed, the recording specification operation of recording the image 651 displayed on the specified orientation image display screen 650 is conducted. In a case where the recording specification operation is accepted (step S933), the recording control unit 590 records the image extracted by the image extraction unit 550 and the orientation at the representative position in this image (the particular orientation) as the image file in the image storage unit 200 (step S934). In this case, for example, the resolution conversion is conducted, and the compression in the JPEG format is carried out to record the image file. Then, the flow advances to step S940. It should be noted that in a case where the selection operation is not accepted (step S931), or also in a case where the recording specification operation is not accepted (step S933), the flow advances to step S940.

On the other hand, in a case where the instruction operation for the orientation instruction display is not accepted (step S927), it is determined whether or not the particular orientation is displayed on the display unit 580 (step S935). In a case where the particular orientation is displayed on the display unit 580, the flow advances to step S931. On the other hand, in a case where the particular orientation is not displayed on the display unit 580 (step S935), it is determined whether or not the image extracted from the panoramic image (the image in the particular orientation) is displayed on the display unit 580 (step S936). In a case where the extracted image is displayed (step S936), the flow advances to step S933. On the other hand, in a case where the extracted image is not displayed (step S936), it is determined whether or not the instruction operation for the trimming processing is accepted by the operation acceptance unit 210 (step S937). For example, the instruction operation for the trimming processing is conducted as the range of the image is specified on the trimming processing screen 610 shown in FIG. 13B, and the decision button 605 is pressed. In a case where the instruction operation for the trimming processing is accepted (step S937), the image extraction unit 550 extracts the image contained in the specified range, and the display control unit 570 displays the extracted image on the display unit 580 (step S938). Subsequently, the orientation calculation unit 560 calculates the orientation at the representative position in the extracted image (step S939), and the flow advances to step S933. Then, in a case where the recording specification operation is accepted (step S933), the recording control unit 590 records the image extracted by the image extraction unit 550 and the orientation at the representative position in this image as the image file in the image storage unit 200 (step S934).

On the other hand, in a case where the instruction operation for the trimming processing is not accepted (step S937), it is determined whether or not the display end instruction operation on the panoramic image is accepted by the operation acceptance unit 210 (step S937). In a case where the display end instruction operation on the panoramic image is not accepted, the flow returns to step S924, and in a case where the display end instruction operation on the panoramic image is accepted, the operation of the image extraction processing on the panoramic image is ended.

3. Third Embodiment

According to the second embodiment of the present invention, the example has been illustrated in which the part of the image contained in the panoramic image is extracted to be displayed or subjected to the trimming processing or the like. Herein, as described above, the panoramic image is an image containing a subject in a relatively wide range and is supposed to include an orientation in a relatively wide range while the image pickup position is set as the reference. For this reason, in a case where the panoramic image is displayed, for example, it is conceivable that as the display is carried out while taking into account the orientation in the panoramic image, the display taking advantage of the characteristic of the panoramic image can be carried out. Also, for example, in a case where the panoramic image is displayed on the map, it is conceivable that while the image pickup position at the time of the image pickup is set as the reference, an upper side of the panoramic image can be arranged in a state of facing the image pickup direction. In this case too, for example, it is conceivable that as the display is carried out while taking into account the orientation in the panoramic image, the display taking advantage of the characteristic of the panoramic image can be carried out.

In view of the above, in the following, an example will be illustrated in which in a case where the panoramic image is displayed, the display taking advantage of the characteristic of the panoramic image is carried out on the basis of the respective orientations in the panoramic image.

Configuration Example of an Image Pickup Apparatus

Figure 22:
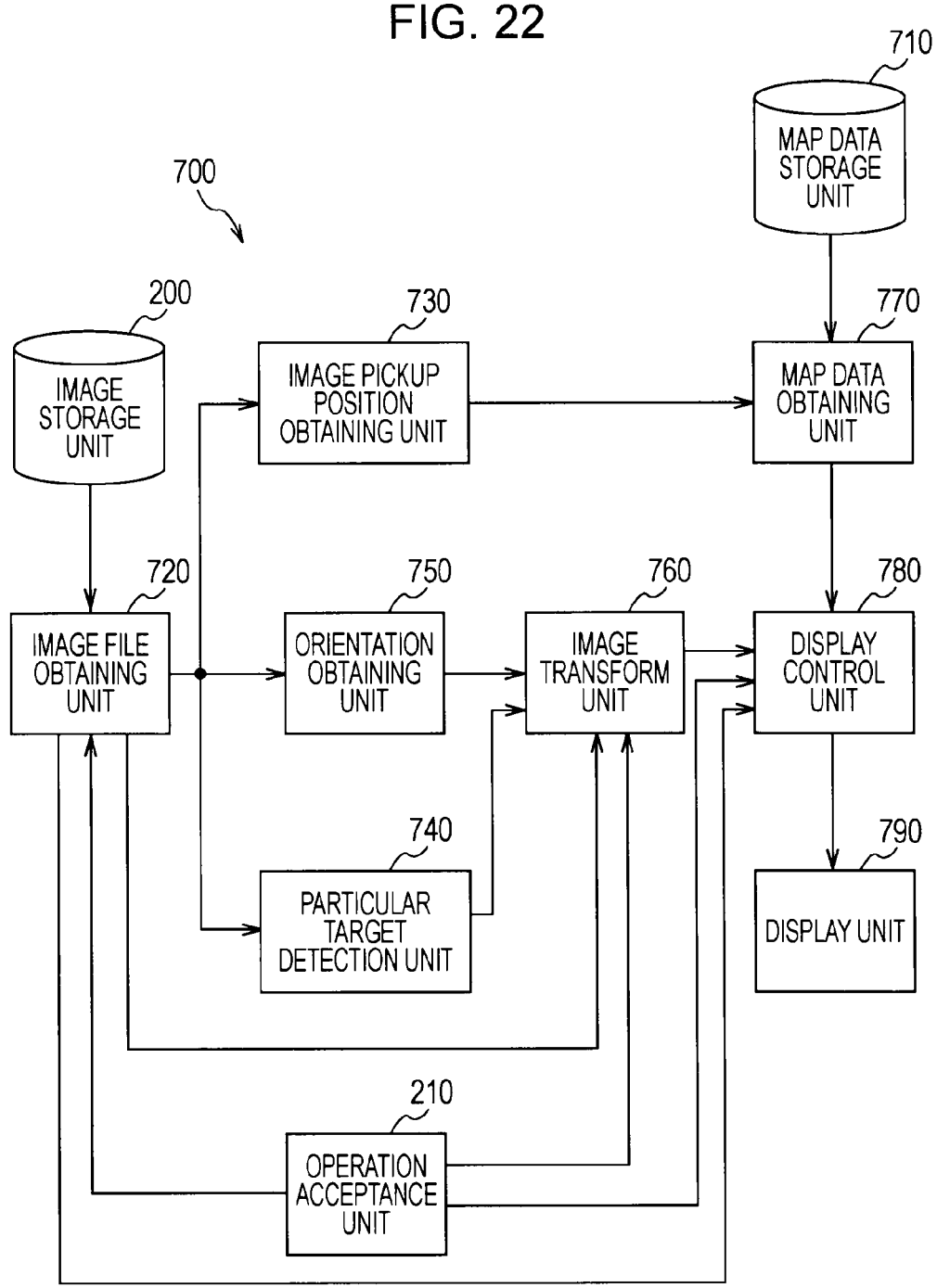
FIG. 22 is a block diagram of a functional configuration example of an image pickup apparatus according to a third embodiment of the present invention.

FIG. 22 is a block diagram of a functional configuration example of an image pickup apparatus 700 according to a third embodiment of the present invention. The image pickup apparatus 700 is provided with the image storage unit 200, a map data storage unit 710, an image file obtaining unit 720, an image pickup position obtaining unit 730, a particular target detection unit 740, and the orientation obtaining unit 750. Also, the image pickup apparatus 700 is provided with an image transform unit 760, a map data obtaining unit 770, a display control unit 780, and a display unit 790.

The image storage unit 200 is configured to store an image file and supply the stored image file to the image file obtaining unit 720. It should be noted that the image storage unit 200 corresponds to the image storage unit 200 shown in FIG. 2.

The operation acceptance unit 210 is an operation acceptance unit for accepting an operation input from the user and outputting an operation content in accordance with the accepted operation input to the image file obtaining unit 720, the image transform unit 760, and the display control unit 780. For example, in a case where the image display mode is set, when the display specification operation of instructing the image display is accepted, the operation acceptance unit 210 outputs the operation content to the image file obtaining unit 720. Also, in a case where the image display mode is set, when the display specification operation of instructing the transform method for the panoramic image displayed on the display unit 790 is accepted, the operation acceptance unit 210 outputs the operation content to the image transform unit 760. Also, in a case where the image display mode is set, when the operation input or the like for changing the scaling factor of the image displayed on the display unit 790 is accepted, the operation acceptance unit 210 outputs the operation content to the display control unit 780. It should be noted that the operation acceptance unit 210 corresponds to the operation acceptance unit 210 shown in FIG. 2.

The map data storage unit 710 is configured to store map data for displaying a map on the display unit 790 and supply the stored map data to the map data obtaining unit 770. For example, the map data stored in the map data storage unit 710 is data identified by latitude and longitude and is divided into a plurality of area in units of a certain latitude width and a certain longitude width. It should be noted that the map data storage unit 710 corresponds to the removal media 192 shown in FIG. 1.

The image file obtaining unit 720 is configured to obtain the image file stored in the image storage unit 200 in accordance with the display specification operation accepted by the operation acceptance unit 210. Then, in accordance with a type of the image of the obtained image file, the image file obtaining unit 720 outputs the image to the image transform unit 760 or the display control unit 780. For example, in a case where the image of the obtained image file is the panoramic image, the image file obtaining unit 720 outputs the panoramic image to the image transform unit 760. On the other hand, in a case where the image of the obtained image file is an image other than the panoramic image, the image is output to the display control unit 780. These images of the image files are decoded and subjected to the resolution conversion to be output. Also, the image file obtaining unit 720 outputs the meta information of the obtained image file to the image pickup position obtaining unit 730, the particular target detection unit 740, and the orientation obtaining unit 750. It should be noted that the image file obtaining unit 720 corresponds to the resolution conversion unit 120, the image compression decompression unit 130, the CPU 160, and the removal media controller 191 shown in FIG. 1.

The image pickup position obtaining unit 730 is configured to obtain the image pickup position related to the image corresponding to the meta information on the basis of the meta information output from the image file obtaining unit 720 and output the obtained image pickup position to the map data obtaining unit 770. It should be noted that the image pickup position obtaining unit 730 corresponds to the CPU 160 shown in FIG. 1.

The particular target detection unit 740 is configured to detect a particular target contained in the image corresponding to the meta information on the basis of the meta information output from the image file obtaining unit 720 and output the particular target information related to the detected particular target to the image transform unit 760. It should be noted that in this example, an example will be illustrated in which on the basis of the meta information recorded at the time of generating the panoramic image, the particular target is detected, but for example, the particular target may be detected from the panoramic image through the image analysis. It should be noted that the particular target detection unit 740 corresponds to the CPU 160 shown in FIG. 1.

The orientation obtaining unit 750 is configured to obtain the orientation at the representative position in the image corresponding to the meta information on the basis of the meta information output from the image file obtaining unit 720 and output the obtained orientation to the image transform unit 760. It should be noted that the orientation obtaining unit 750 corresponds to the CPU 160 shown in FIG. 1.

The image transform unit 760 is configured to transform the panoramic image output from the image file obtaining unit 720 in accordance with the specification operation accepted by the operation acceptance unit 210 and output the panoramic image after the transform to the display control unit 780. For example, the image transform unit 760 transforms the panoramic image output from the image file obtaining unit 720 into a shape like a fan or a plurality of images through the division. In this case, for example, the image transform unit 760 transforms the panoramic image so that the orientation on the map corresponding to the map data output from the map data obtaining unit 770 is matched with the orientation at the representative position in the panoramic image output from the orientation obtaining unit 750. Also, for example, the image transform unit 760 transforms the panoramic image so as not to distort or separate the particular target contained in the panoramic image output from the orientation obtaining unit 750 on the basis of the particular target information output from the particular target detection unit 740. It should be noted that the transform of the panoramic image will be described in detail with reference to FIGS. 23A and 23B to FIGS. 31A and 31B, and the like. Also, the image transform unit 760 corresponds to the CPU 160 shown in FIG. 1.

The map data obtaining unit 770 is configured to obtain the map data from the map data storage unit 710 on the basis of the image pickup position output from the image pickup position obtaining unit 730 and output the obtained map data to the display control unit 780. It should be noted that the map data obtaining unit 770 corresponds to the CPU 160 and the removal media controller 191 shown in FIG. 1. Also, for example, map data stored in another apparatus may be obtained via a network such as a wireless LAN and used.

The display control unit 780 is configured to display the image output from the image file obtaining unit 720 or the image transform unit 760 and the map corresponding to the map data output from the map data obtaining unit 770 on the display unit 790. The display control unit 780 arranges the panoramic image on the map corresponding to the map data output from the map data obtaining unit 770, for example, on the basis of the image pickup position associated with the panoramic image output from the image transform unit 760. Also, the display control unit 780 carries out the display control such as the size change of the map in accordance with the operation input from the operation acceptance unit 210. These display examples will be described in detail with reference to FIGS. 27A and 27B to 31A and 31B, and the like. It should be noted that the display control unit 780 corresponds to the CPU 160 and the LCD controller 171 shown in FIG. 1.

The display unit 790 is a display unit configured to display various images on the basis of the control of the display control unit 780. The display unit 790 corresponds to the LCD 172 shown in FIG. 1.

Transform Example of the Panoramic Image

Figure 23A:
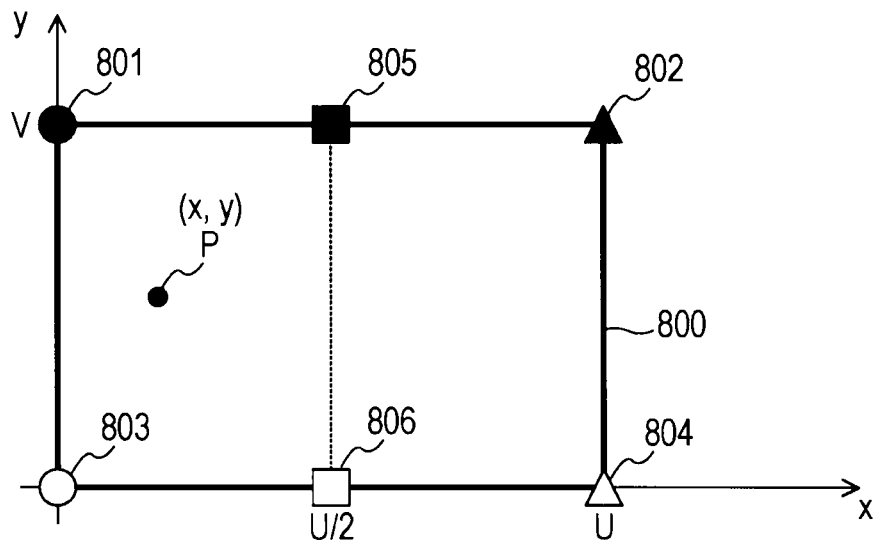
FIGS. 23A and 23B show an outline of a transform method for a panoramic image by an image transform unit according to the third embodiment of the present invention.
Figure 23B:
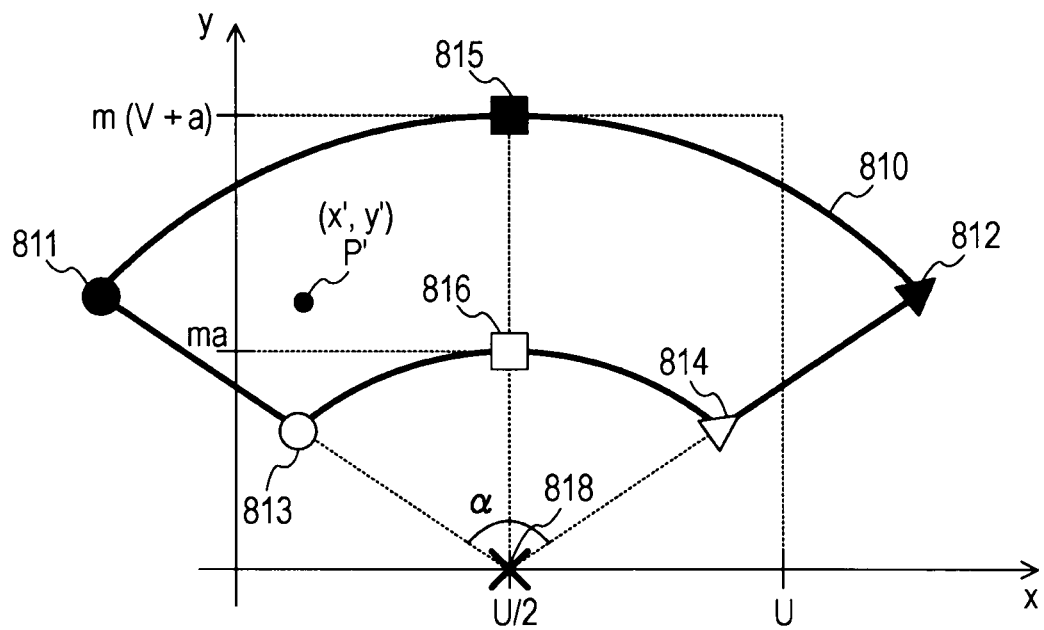

FIGS. 23A and 23B show an outline of a transform method for a panoramic image by the image transform unit 760 according to the third embodiment of the present invention. FIG. 23A schematically shows a panoramic image 800 before a transform by a rectangular. According to the example shown in FIG. 23A, a case will be described as an example in which the panoramic image 800 is transformed into a fan-like shape on xy coordinates where a lower left corner is set as the origin (0, 0), the horizontal axis is set as the x axis, and the vertical axis is set as the y axis in a case where the panoramic image 800 which becomes a transform target is set as a rectangular shape. Also, on the xy coordinates shown in FIG. 23A, apexes of the rectangular-shaped panoramic image 800 are set as points 801 to 804, a middle point of a line segment connecting the points 801 and 802 is set as a point 805, and a middle point of a line segment connecting the points 803 and 804 is set as a point 806. It should be noted that the respective points in the panoramic image 800 shown in FIG. 23A are illustrated in mutually different styles (while marked out or black marked out circles, triangles, and rectangulars). Also, an angle (panorama angle) corresponding to an image pickup range for the panoramic image 800 is set as α, a length in the horizontal direction of the panoramic image 800 is set as U, and a length in the vertical direction of the panoramic image 800 is set as V.

The panoramic image 800 is, for example, an image containing a subject having a wide range in the horizontal direction. In view of the above, in this example, by taking into account a positional relation with the subject viewed by the photographer at the time of the image pickup operation for the panoramic image 800, the panoramic image 800 is transformed into the fan-like shape. Herein, the fan-like shape is, for example, a shape of a fan or a shape obtained by cutting off a part near the center angle on the fan (that is, a shape obtained by two arcs and two straight lines).

FIG. 23B shows a panoramic image 810 after the transform roughly into the fan shape. It should be noted that on the xy coordinates shown in FIG. 23B, positions for the respective points corresponding to the points 801 to 806 shown in FIG. 23A are assigned with the same ones as the styles shown in FIG. 23A.

For example, as shown in FIG. 23B, in a case where the panoramic image 800 is converted into the fan-like shape to generate the panoramic image 810, by using the following Expression 8 and Expression 9, coordinates P1 (x, y) contained in the panoramic image 800 are transformed into coordinates P1' (x', y').

$$x' = (U/2) + m \cdot (y+a) \cdot \cos([90 + \alpha\{(U/2-x)/U\}](\pi/180))$$ Expression 8

$$y' = m \cdot (y+a) \cdot \sin([90 + \alpha\{(U/2-x)/U\}](\pi/180))$$ Expression 9

Herein, m is a value indicating a scaling factor in a case where while a center point 818 is set as the reference, the panoramic image 810 is expanded in a radial pattern, and a is a value indicating a distance in a case where while the center point 818 is set as the reference, the panoramic image 810 is expanded in the vertical direction. Also, α is a center angle of the panoramic image 810 after the transform. By using the above-mentioned Expression 8 and Expression 9, as shown in FIG. 23B, the panoramic image 810 having the fan-like shape can be generated. It should be noted that on the xy coordinates shown in FIGS. 23A and 23B, frames of the panoramic images 800 and 810 are represented by bold lines. Also, the transform method using the above-mentioned Expression 8 and Expression 9 is an example of the transform method of transforming the panoramic image into the fan-like shape on the basis of the size in the horizontal direction in the panoramic image and the panorama angle so that the orientation of the subject contained in the panoramic image after the transform is substantially matched with the orientation on the map.

FIGS. 24A and 24B show an example of a transition of the panoramic image transformed by the image transform unit 760 according to the third embodiment of the present invention. FIG. 24A shows a panoramic image 820 before a transform. The panoramic image 820 is similar to the panoramic image shown in FIG. 6C and the like.

FIG. 24B shows a panoramic image 821 after the panoramic image 820 is transformed into the fan-like shape by using Expression 8 and Expression 9. For example, the panoramic image 821 transformed by using Expression 8 and Expression 9 is transformed so that the center angle is set different in accordance with the panorama angle. For this reason, for example, in a case where a panoramic image having the same lengths in the horizontal direction is transferred, a panoramic image having a large panorama angle has curves in which the two arcs constituting the fan-like shape after the transform are relatively deep. In contrast to this, a panoramic image having a small panorama angle has curves in which the two arcs constituting the fan-like shape after the transform are relatively shallow. In this manner, as the panoramic image is transformed into the fan-like shape, it is possible to display the panoramic image in which the state of the subject viewed by the photographer at the time of the image pickup operation is intuitively easily grasped. Also, instead of displaying the panoramic image 820 shown in FIG. 24A, by displaying the panoramic image 821 transformed into the fan-like shape shown in FIG. 24B, it is possible to provide the panoramic image in a new style to the user. With this configuration, an interest of the user with respect to the panoramic image 820 can be enhanced. Also, the scaling factor m, the distance a, and the total angle α can be changed by the user. As these values are changed through the manual operation by the user, it is possible to display a still larger variety of panoramic images having the fan-like shape.

Figure 26A:
FIGS. 26A to 26C show an example of the transition of the panoramic image transformed by the image transform unit according to the third embodiment of the present invention.
Figure 26B:
Figure 26C:
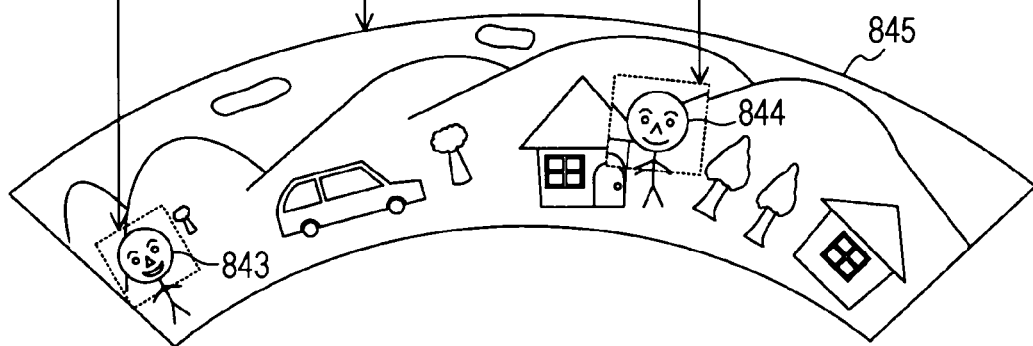

It should be noted that for example, in a case where the panoramic image which becomes the display target contains a particular target which is not desired to be distorted (for example, a human face), the particular target may be displayed without being transformed into the fan-like shape. For example, as shown in FIGS. 25A to 25C, the panoramic image is divided so that the particular target overlaps the border, and the divided panoramic images can be displayed. Also, for example, so as not to distort the particular target, as shown in FIGS. 26A to 26C, the particular target can be extracted and overlapped at a position on the panoramic image transformed into the fan-like shape to be combined.

Another Transform Example of the Panoramic Image

In the above, the example has been illustrated in which the panoramic image is transformed into the fan-like shape. However, for example, in a case where a subject is contained which provides a sense of discomfort when being distorted like the human face or the like, it is important to carry out the display taking advantage of the characteristic of the panoramic image without distorting these subjects. In view of the above, in the following, an example will be illustrated in which without transforming the panoramic image into the fan-like shape, the panoramic image is divided, and the respective images after the division are displayed on the basis of the orientation.

FIGS. 25A to 25C show an example of the transition of the panoramic image transformed by the image transform unit 760 according to the third embodiment of the present invention. FIG. 25A shows a panoramic image 830 before a transform. The panoramic image 830 is similar to the panoramic image shown in FIG. 24A.

FIG. 25B shows an example in which images 831 to 835 after the panoramic image 830 is divided into five images by the image transform unit 760 are arranged as a panoramic image 836 to be displayed. Herein, the number of divisions for the panoramic image may be set through the manual operation by the user or may be set while following a certain rule. With regard to the divided images 831 to 835 shown in FIG. 25B, as illustrated according to the second embodiment of the present invention, the orientations of the respective images can be calculated. In view of the above, for example, while an orientation of the image 833 arranged in the midmost is set as a reference, the image transform unit 760 calculates differences of the orientations for the other images 831, 832, 834, and 835. Then, a rotation processing is performed on the respective images by the calculated difference values, and the images 831, 832, 834, and 835 after the rotation processing are arranged. In this case, for example, as shown in FIG. 25B, the panoramic image 836 may be obtained by arranging so that lower corners of the images 831 to 835 are contacted. Also, as shown in FIG. 25C, a panoramic image 837 may be obtained by arranging so that middle parts of the images 831 to 835 are contacted. Herein, as a rotation method for the images, for example, an affine transform for transforming positions at two points by using a 3×3 matrix (affine matrix) on two dimensional coordinates can be used. For example, the image transform unit 760 the affine transform on the respective values of the respective images while the center positions of the respective images are set as rotation references carries out. Then, after this affine transform is carried out, the respective images can be arranged at predetermined positions.

Herein, for example, in a case where a particular target that should not be divided into the panoramic image (for example, the human face) is contained, the division of the panoramic image may also be performed so as not to separate the particular target. For example, in a case where the particular target is set as the human face, on the basis of the face information recorded in the image file of the panoramic image, it is possible to identify the position of the face in the horizontal direction in the panoramic image. In view of the above, for example, when the division processing is performed, it is determined whether or not the face exists on the border at the time of this division. In a case where the face exists on the border at the time of the division, the face is moved to the left side or the right side so that the border does not overlap the face. For example, in a case where the face is moved so that the border does not overlap the face, the face can be moved to a side at a short distance among the left side or the right side.

Also, in a case where the face exists on the border at the time of the division, so that the border does not overlap the face, the number of images to be divided may be changed. For example, in a case where a setting is made in which the panoramic image is divided into five images, when the face exists on any of borders at the time of the division into the five images, the panoramic image can be divided into four images or six images. Also, after the number of images divided in this manner is changed, in a case where the face exists on any of borders at the time of the division, the number of images to be further divided may be changed.

FIGS. 26A to 26C show an example of the transition of the panoramic image transformed by the image transform unit 760 according to the third embodiment of the present invention. This transform example is a modified example of FIGS. 24A and 24B and is an example of performing the transform so as not to distort the particular target. FIG. 26A shows a panoramic image 840 before the transform. The panoramic image 840 is similar to the panoramic image shown in FIG. 24A. It should be noted that in this example, an example will be illustrated in which the particular target is set as the human face, the face images 843 and 844 containing human faces 841 and 842 contained in the panoramic image 840 are extracted, and the extracted face images 843 and 844 are overlapped with the panoramic image 840 to be combined. It should be noted that the transform method for the panoramic image 840 is similar to the example shown in FIGS. 24A and 24B, and therefore a description thereof will be omitted this time.

For example, the particular target detection unit 740 detects the human faces 841 and 842 contained in the panoramic image 840 on the basis of the face information recorded in the image file of the panoramic image 840. Subsequently, as shown in FIG. 26B, on the basis of the detection information related to the detected human faces 841 and 842, the image transform unit 760 extracts the face images 843 and 844 containing the human faces 841 and 842 from the panoramic image 840. At the time of this extraction, the image transform unit 760 calculates the orientation of the face images 843 and 844 through the above-mentioned orientation calculation method. Then, as shown in FIG. 26C, the image transform unit 760 transforms the panoramic image 840 to generate a panoramic image 845 having the fan-like shape and overlaps and combines the extracted face images 843 and 844 on the panoramic image 845. In this case, for example, the image transform unit 760 rotates the face images 843 and 844 on the basis of the orientation calculated with regard to the face images 843 and 844, about the centers of the face images 843 and 844 as the rotation centers. Then, the face images 843 and 844 after the rotation are combined as the extracted position. It should be noted that in FIG. 26C, the rectangulars corresponding to the face images 843 and 844 after the rotation are represented by the dotted lines. It should be noted that with regard to the panoramic images after the transform shown in FIGS. 24A and 24B to FIGS. 26A to 26C, for example, the display can be conducted while the up and down direction in the respective panoramic images is matched with the up and down direction in the display unit 790.

Arrangement Example of the Panoramic Image on the Map

In the above, the example has been illustrated in which the panoramic image transformed by the image transform unit 760 is displayed. In the following, an example will be illustrated in which the panoramic image is arranged on the map including the image pickup position to be displayed.

Figure 27A:
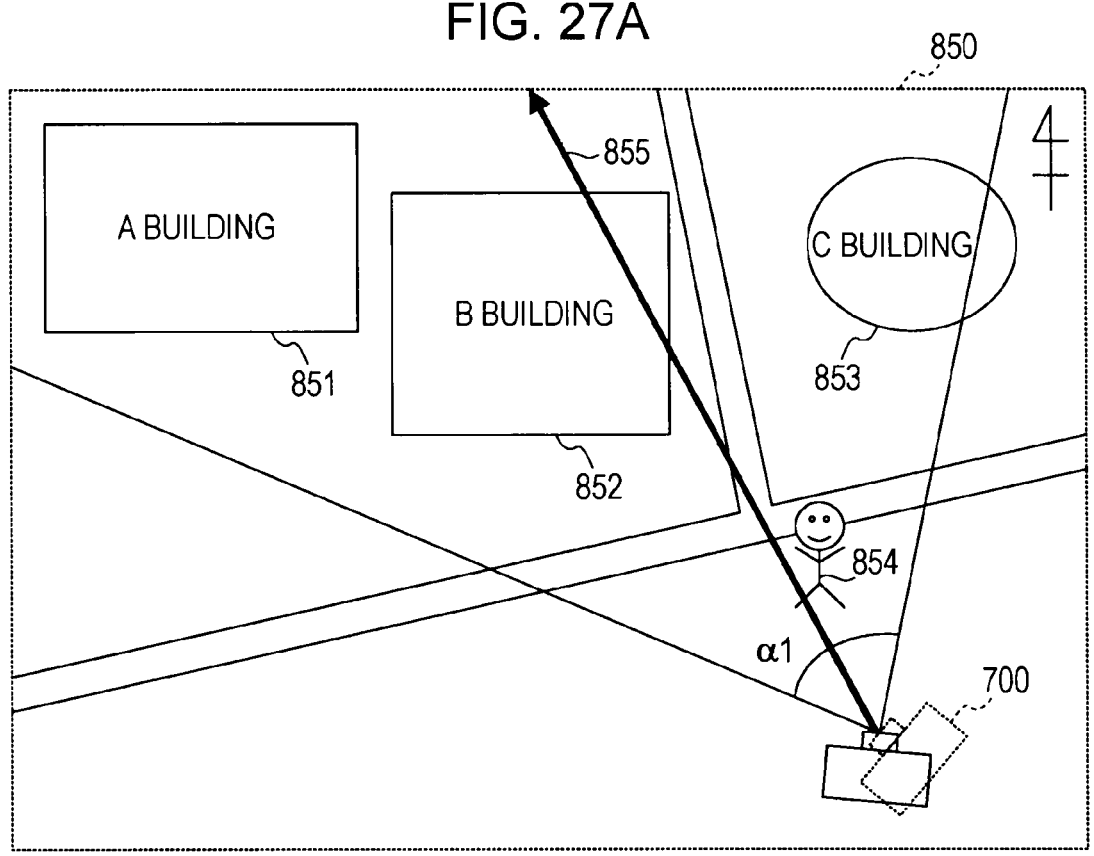
FIGS. 27A and 27B show an outline of a relation between an image pickup operation in an area corresponding to map data stored in a map data storage unit and a panoramic image generated through this image pickup operation according to the third embodiment of the present invention.
Figure 27B:
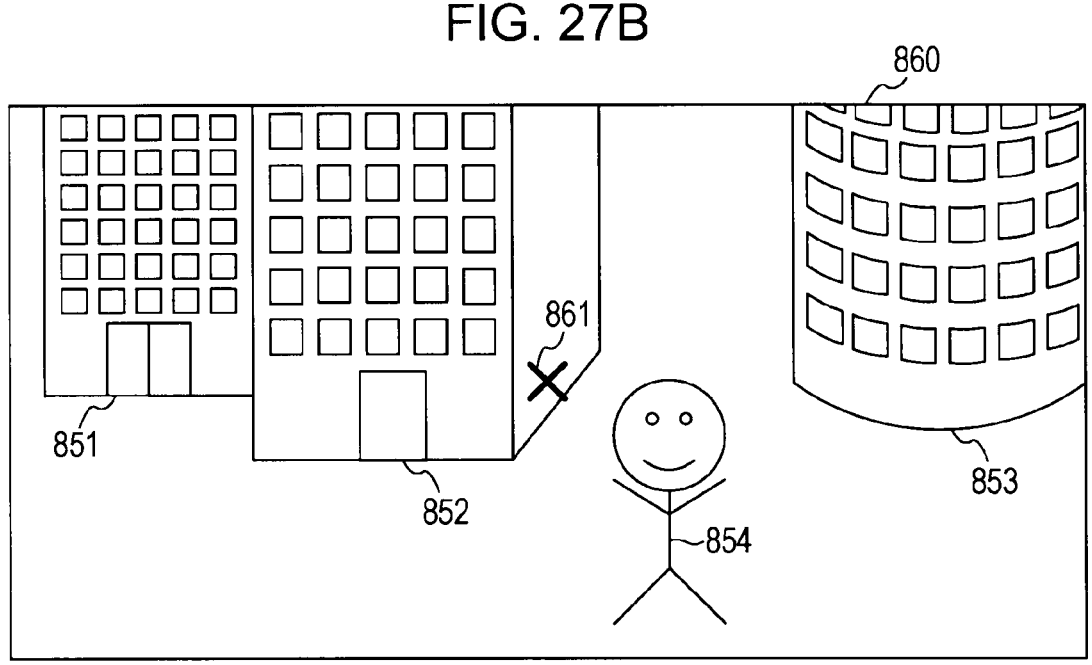

FIGS. 27A and 27B show an outline of a relation between an image pickup operation in an area corresponding to the map data stored in the map data storage unit 710 and a panoramic image generated through this image pickup operation according to the third embodiment of the present invention.

A local area 850 shown in FIG. 27A is a region corresponding to a part of the map data stored in the map data storage unit 710. It should be noted that in FIG. 27, an orientation on the upper side is set as the north. Also, in the local area 850, for example, an A building 851, a B building 852, and a C building 853 exist, and a person 854 stands up while these building become a background. In this state, for example, the image pickup operation for the panoramic image is carried out by the image pickup apparatus 700. An angle of the panoramic image through the image pickup operation is set as α1, and an image pickup direction corresponding to the center position in the panoramic image is represented by an arrow 855. It should be noted that according to the third embodiment of the present invention, although a configuration related to the generation of the panoramic image is omitted as the functional configuration example, a functional configuration similar to the first embodiment of the present invention is provided. Also, in this example, an example will be illustrated in which the panoramic image is generated through the image pickup operation by the image pickup apparatus 700, but for example, a panoramic image generated through the image pickup operation by another image pickup apparatus is stored in the image storage unit 200, and the display may be carried out by using this panoramic image.

FIG. 27B shows a panoramic image 860 generated in the local area 850 shown in FIG. 27A. In this manner, the panoramic image 860 includes the A building 851, the B building 852, the C building 853, and the person 854 standing up while these buildings become the background. Also, a center position 861 in the panoramic image 860 is represented by a cross mark.

FIGS. 28A and 28B to FIGS. 31A and 31B show display examples in a case where on the map corresponding to the map data stored in the map data storage unit 710, the panoramic image generated in the area corresponding to this map according to the third embodiment of the present invention. It should be noted that an image pickup range corresponding to the panoramic image and a direction corresponding to the center position are represented by dotted lines. It should be noted that these dotted lines correspond to those shown in FIG. 27A.

Figure 28A:
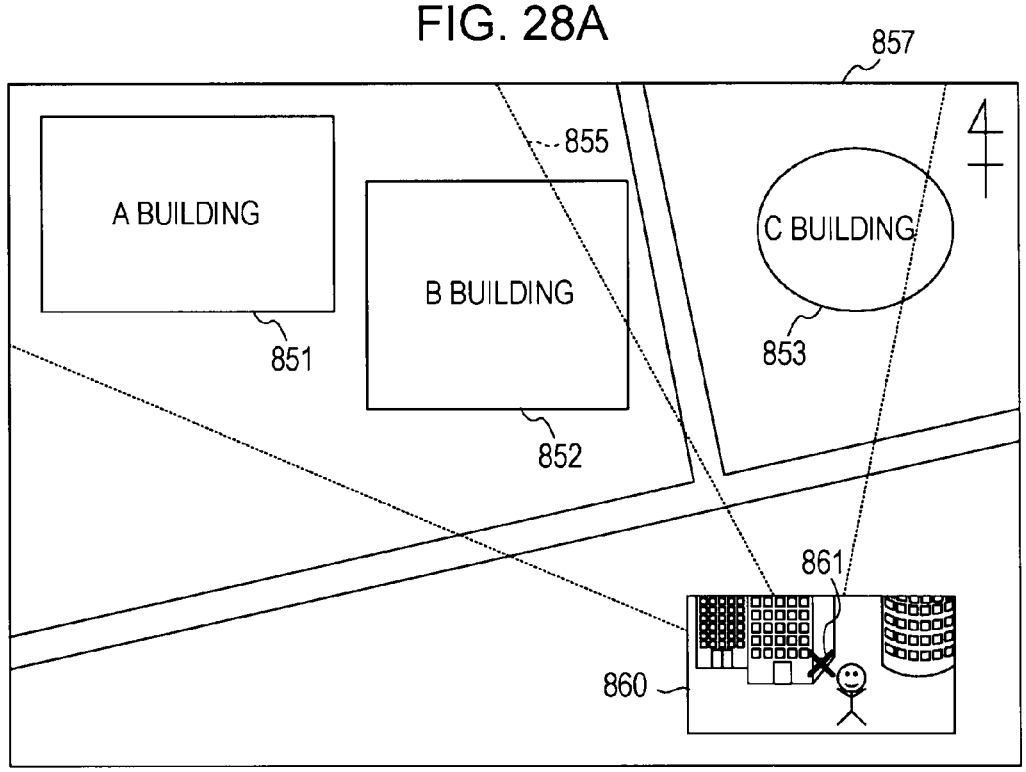
FIGS. 28A and 28B show a display example in a case where on a map corresponding to the map data stored in the map data storage unit, the panoramic image generated in the area corresponding to this map according to the third embodiment of the present invention.

FIG. 28A shows a display example displayed by overlapping the panoramic image 860 on a map 857 corresponding to the local area 850 shown in FIG. 27A. For example, the panoramic image 860 is arranged so that the center position 861 in the panoramic image 860 becomes an image pickup position on the map 857.

Figure 28B:
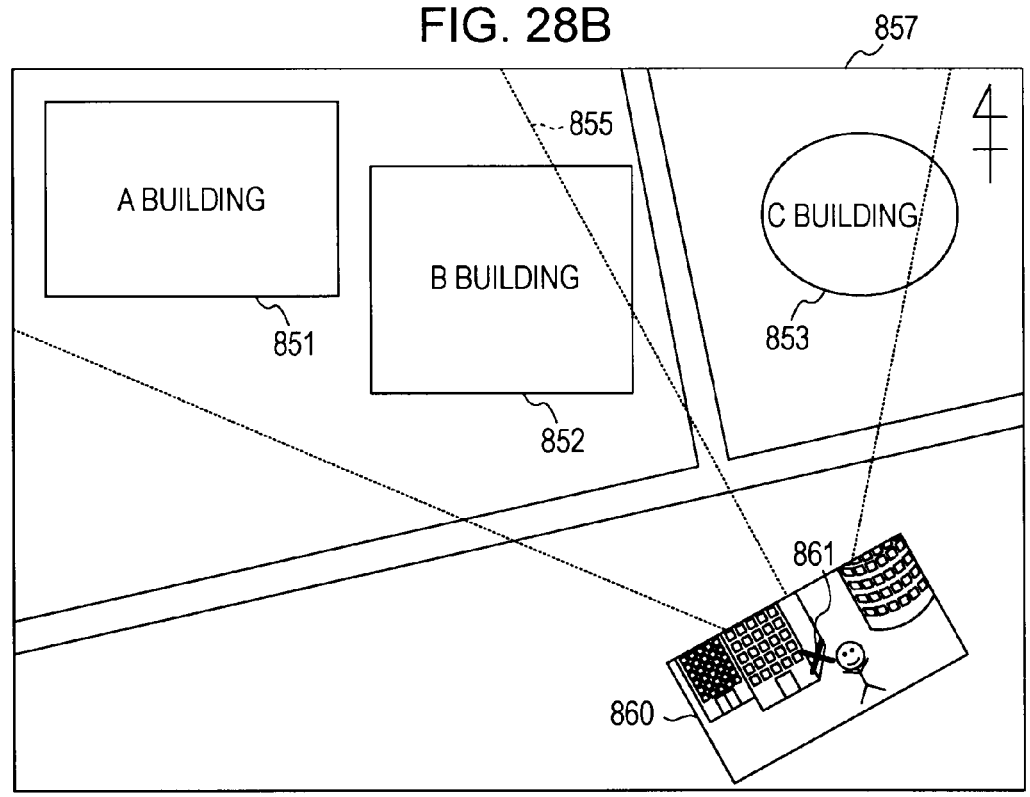

FIG. 28B shows the display example displayed by overlapping the panoramic image 860 on the map 857 so that an up and down direction of the panoramic image 860 is matched with the orientation of the center position 861 in the panoramic image 860. In this case, for example, the panoramic image 860 is arranged so that the center position 861 in the panoramic image 860 becomes the image pickup position on the map 857. In the case of arranging the panoramic image in this manner, for example, the panoramic image 860 is rotated about the center position 861 as the rotation center. As this rotation conversion method, for example, the above-mentioned affine transform can be used. To be more specific, the image transform unit 760 conducts the affine transform on the respective values of the panoramic image 860 while the center position 861 is set as the rotation reference. For example, an angle α2 defined by the orientation of the center position 861 in the panoramic image 860 and the orientation of the north on the map 857 is calculated. Then, the affine transform is conducted so that the panoramic image 860 is rotated by α2 degrees. In this manner, by matching the orientation of the center position 861 in the panoramic image 860 with the orientation on the map 857, a correspondence relation between the panoramic image 860 and the map 857 can be intuitively easily grasped.

Herein, as described above, in a case where the panoramic image is displayed, so that the state of the image pickup operation for the panoramic image can be intuitively grasped, the panoramic image can be displayed by being transformed into the fan-like shape. Also, as described above, the panoramic image can be divided and displayed. In the following, these display examples will be described.

Figure 29:
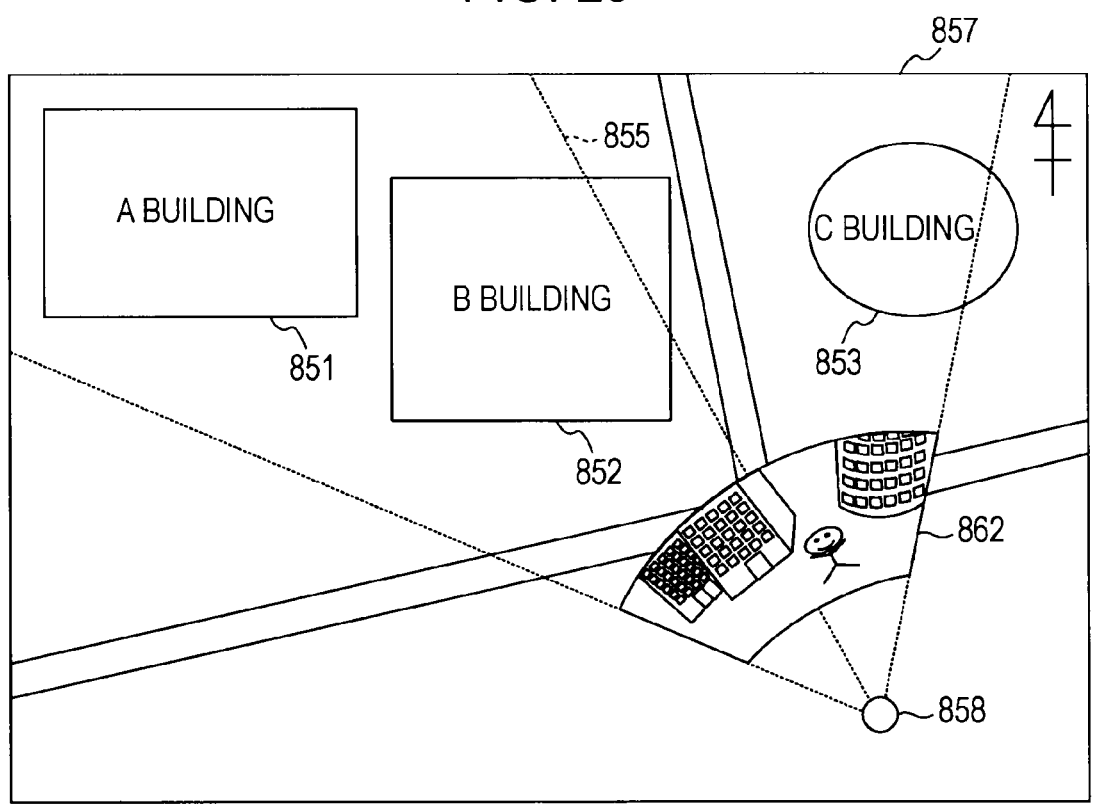
FIG. 29 shows a display example in a case where on the map corresponding to the map data stored in the map data storage unit, the panoramic image generated in the area corresponding to this map according to the third embodiment of the present invention.

FIG. 29 shows a display example displayed by transforming the panoramic image 860 by Expression 8 and Expression 9 and overlapping a panoramic image 862 on the map 857 so that the respective orientations of the panoramic image 862 after the transform are matched with the orientations on the map 857. In this case, for example, the panoramic image 862 is arranged so that the position at the center point of the panoramic image 862 after the transform is matched with an image pickup position 858 on the map 857. Herein, for example, the image pickup position 858 on the map 857 can be displayed, for example, as shown in FIG. 29, as a white marked out circle. It should be noted that the transform method and the rotation method for the panoramic image are similar to the above-mentioned example, and therefore a description thereof will be omitted this time.

In this manner, by displaying the panoramic image 862 and the image pickup position 858, the state of the image pickup operation in the local area 850 corresponding to the map 857 can be intuitively easily grasped. Also, by conducting the display in this manner, an attractiveness of the panoramic image can be enhanced. With this configuration, the interest of the user at the time of displaying the panoramic image can be enhanced.

Figure 30:
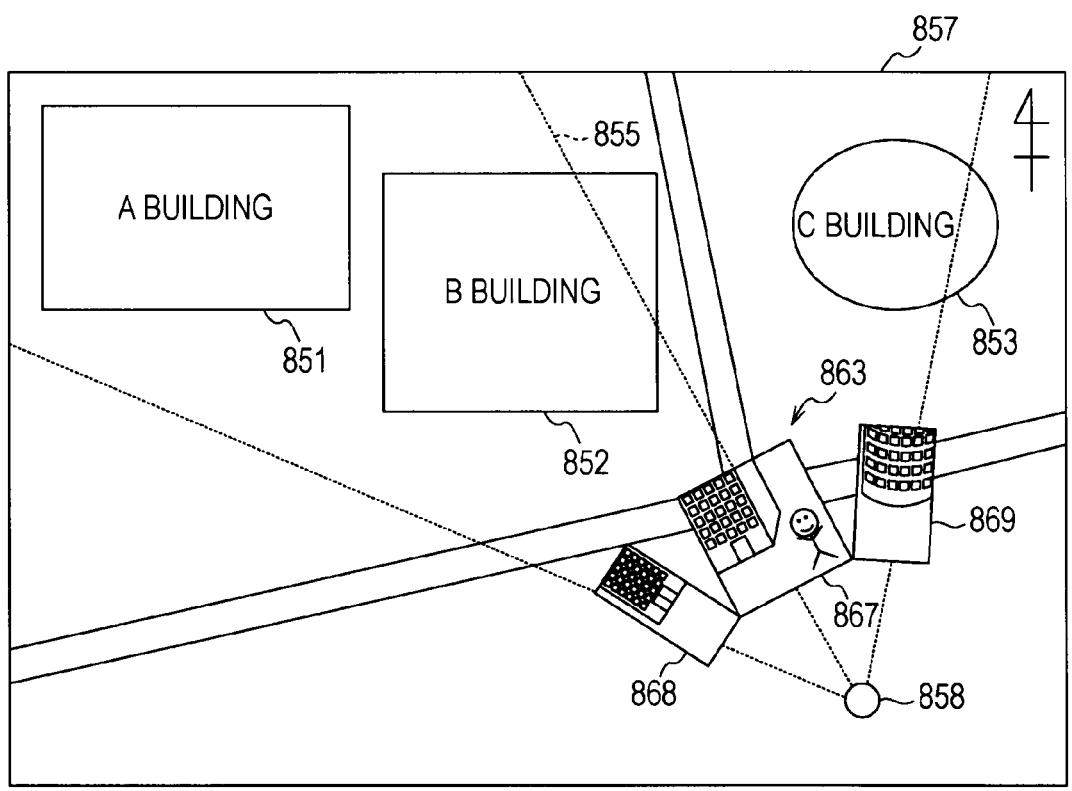
FIG. 30 shows a display example in a case where on the map corresponding to the map data stored in the map data storage unit, the panoramic image generated in the area corresponding to this map according to the third embodiment of the present invention.

FIG. 30 shows a modified example of FIG. 25B. For example, a display example is illustrated in which the panoramic image 860 is divided into three images, an orientation of a middle image 867 constituting a panoramic image 863 after the division is matched with the orientation on the map 857, the panoramic image 863 is overlapped on the map 857 to be displayed. In this case, for example, the panoramic image 863 is arranged so that a position of a center point identified by the panoramic image 863 after the division is matched with the image pickup position 858 on the map 857. Herein, the position of the center point identified by the panoramic image 863 after the division can be, for example, set as the position where the respective orientations at the center positions of three images 867 to 869 constituting the panoramic image 863 after the division cross one another. Also, the image pickup position 858 on the map 857 can be displayed, for example, similarly as in FIG. 29, as a white marked out circle. Also, in this example, while particular targets when the division is carried out are set as the human face and the buildings, so as not to divide these, the number of divisions and the borders are set. These particular targets may be detected, as described above, on the basis of the meta information recorded at the time of generating the panoramic image and also may be detected through the image analysis at the time of the display. It should be noted that the division method and the rotation method for the panoramic image are similar to the above-mentioned example, and therefore a description thereof will be omitted this time.

In this manner, by displaying the panoramic image 863 and the image pickup position 858, the state of the image pickup operation in the local area 850 corresponding to the map 857 can be intuitively easily grasped. Also, it is possible to display the particular target without being distorted. By conducting the display in this manner, the panoramic image can be displayed in a display mode different from the fan-like shape, and therefore the attractiveness can be enhanced. With this configuration, the interest of the user at the time of displaying the panoramic image can be enhanced.

Figure 31A:
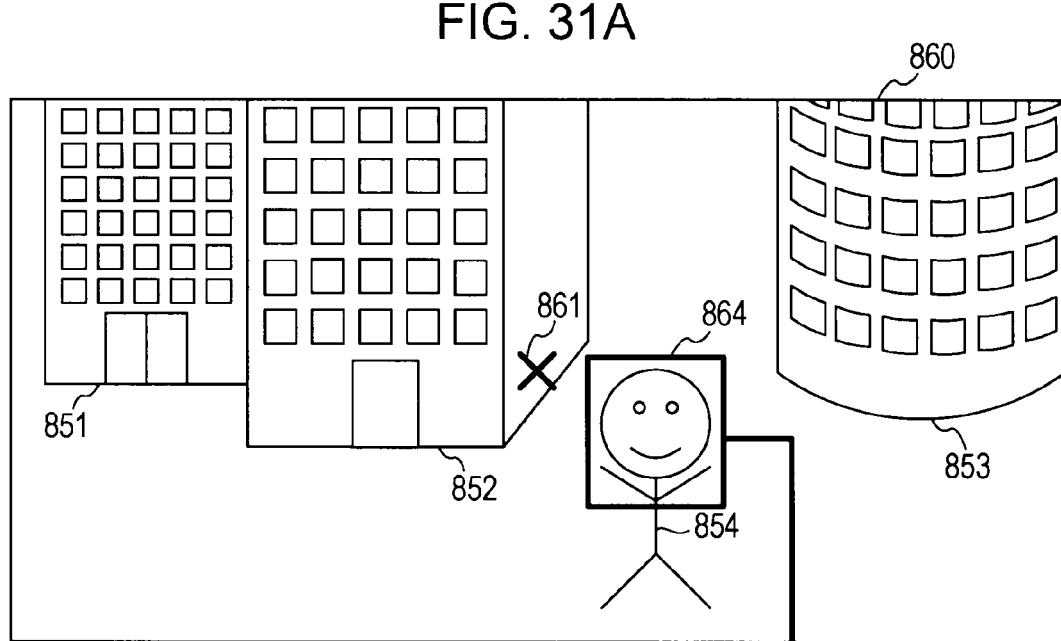
FIGS. 31A and 31B show a display example in a case where on the map corresponding to the map data stored in the map data storage unit, the panoramic image generated in the area corresponding to this map according to the third embodiment of the present invention.
Figure 31B:
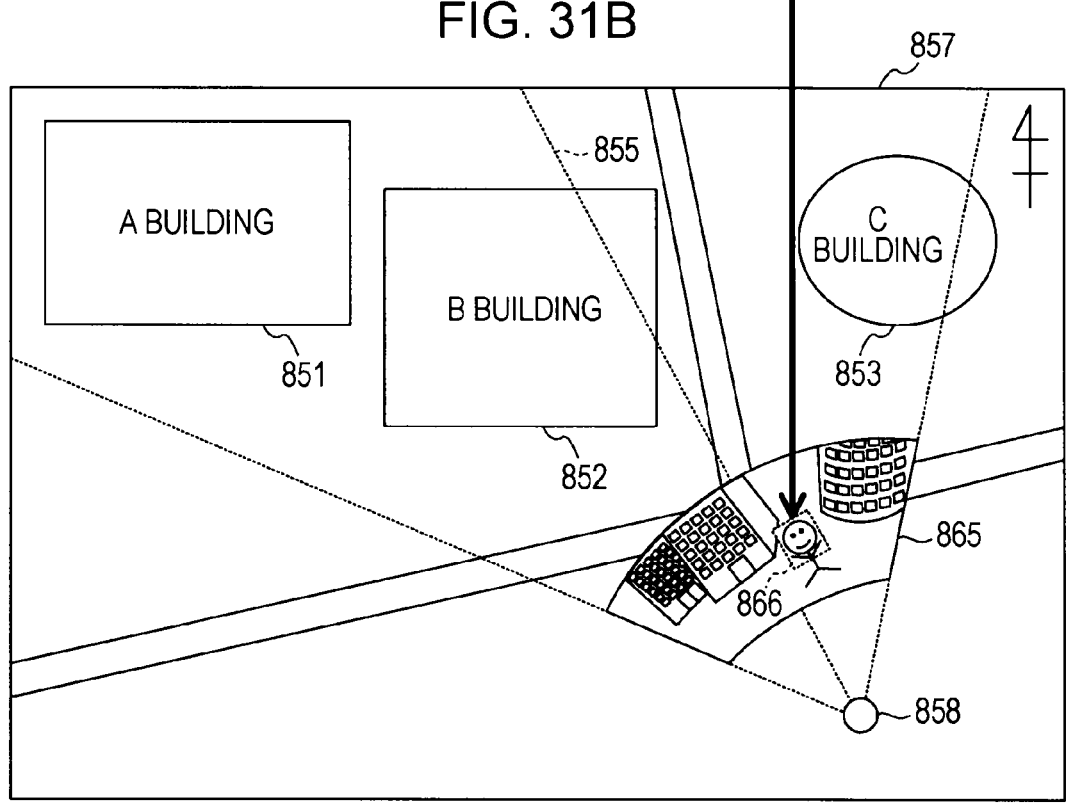

FIGS. 31A and 31B shows a display example in which, similarly as in the example shown in FIGS. 26A to 26C, while the particular target is set as the human face, a face image 864 containing the face of the person 854 contained in the panoramic image 860 is extracted, and the extracted face image 864 is overlapped on a panoramic image 865 to be combined. FIG. 31A shows a relation between the panoramic image 860 and the face image 864 containing the face of the person 854, and FIG. 31B shows an example in which the panoramic image 865 having the fan-like shape generated by transforming the panoramic image 860 is overlapped with an extracted face image 866 to be combined. It should be noted that in FIG. 31B, a rectangular corresponding to the extracted face image 866 is represented by a dotted line. Also, the transform method and the rotation method for the panoramic image are similar to the above-mentioned example, and therefore a description thereof will be omitted this time. Also, the combining method for the face image is similar to the above-mentioned combining method too except that the combination is carried out after the rotation in accordance with the rotation of the panoramic image which becomes the combination target, and therefore a description thereof will be omitted this time.

In this manner, according to the third embodiment of the present invention, in accordance with the orientation corresponding to the subject contained in the panoramic image, the panoramic image can be transformed and displayed. With this configuration, it is possible to display the panoramic image reflecting the orientation corresponding to the subject contained in the panoramic image. With this configuration, a relation between the panoramic image and the subject can be intuitively easily grasped. Also, for example, in accordance with the orientation corresponding to the subject contained in the panoramic image, as the panoramic image is transformed into the fan-like shape or the divided images to be displayed, a relevance between the panoramic image and the subject can be intuitively easily grasped. Also, in a case where the panoramic image after the transform is overlapped on the map and displayed, by arranging the panoramic image in accordance with the orientation corresponding to the subject contained in the panoramic image, a relation between the subject contained in the panoramic image and the image pickup direction can be easily grasped. By displaying the panoramic image in this manner, the attractiveness can be enhanced, and the interest of the user can be enhanced. It should be noted that In the above, the example has been illustrated in which the panoramic image is arranged so that the position of the center point identified by the panoramic image after the transform is matched with the image pickup position on the map, but for example, the arrangement position may be changed in accordance with a user's preference. For example, the panoramic image may be arranged so that the orientation at the center position in the panoramic image after the conversion is matched with the image pickup position on the map.

Operation Example of the Image Pickup Apparatus

FIG. 32 is a flow chart for a processing procedure of an image display processing by the image pickup apparatus 700 according to the third embodiment of the present invention. In this example, an example will be illustrated in which the panoramic image is overlapped on the map to be displayed. Also, in a case where the panoramic image does not contain the particular target, as shown in FIG. 29, the transform processing into the fan-like shape is carried out, and in a case where the panoramic image contains the particular target, an example will be illustrated in which the division transform processing is carried out as shown in FIG. 30.

First, it is determined whether or not the display specification operation of displaying the image on the map is accepted by the operation acceptance unit 210 (step S941). In a case where the display instruction operation is not accepted, the monitoring continues until the display instruction operation is accepted. In a case where the display instruction operation is accepted (step S941), in accordance with the display instruction operation, the image file obtaining unit 720 obtains the image file stored in the image storage unit 200 (step S942). In this case, the image file obtaining unit 720 analyzes the meta information of the obtained image file to determine the type of the image of the obtained image file (the presence or absence of the panoramic image). This determination is carried out, for example, on the basis of the image size included in the meta data or the like. Also, for example, the presence or absence of the panoramic image is recorded in the maker note, and the determination may be carried out on the basis of this maker note.

Subsequently, it is determined whether or not the image of the obtained image file is a panoramic image (step S943). In a case where the image of the obtained image file is not a panoramic image (step S943), while the image pickup position on the map is set as the reference, the display control unit 780 arranges the image of the obtained image file to be displayed on the display unit 790 (step S944). On the other hand, in a case where the image of the obtained image file is the panoramic image (step S943), it is determined whether or not the particular target is contained in the panoramic image (step S945).

In a case where the particular target is not contained in the panoramic image (step S945), the image transform unit 760 transforms the panoramic image into the fan-like shape (step S946). Subsequently, the image transform unit 760 performs the rotation processing on the panoramic image so that the orientation of the panoramic image after the transform is matched with the orientation on the map (step S947). Subsequently, the display control unit 780 arranges the panoramic image on the map to be displayed on the display unit 790 so that the position of the center point of the panoramic image after the transform is matched with the image pickup position on the map (step S948).

On the other hand, in a case where the particular target is contained in the panoramic image (step S945), the image transform unit 760 divides the panoramic image so that the particular target does not overlap the border at the time of the division (step S949). Subsequently, the image transform unit 760 performs the rotation processing on the respective images so that the orientations of the respective images after the transform are matched with the orientation on the map (step S950). Subsequently, the display control unit 780 displays the panoramic image on the map to be displayed on the display unit 790 so that the position of the center point identified by the respective images after the transform is matched with the image pickup position on the map (step S951).

Another Transform Example of the Panoramic Image

In the above, the example has been illustrated in which after the panoramic image is transformed into the fan-like shape, on the basis of the orientation at the center position in the panoramic image, the panoramic image after the transform is rotated and arranged on the map. Herein, for example, when the panoramic image is transformed into the fan-like shape, if the rotation processing in accordance with the orientation at the center position in the panoramic image is performed, it is supposed that the transform processing can be carried out promptly. In view of the above, in the following, an example will be illustrated in which by using an expression modified from Expression 8 and Expression 9, the panoramic image is transformed.

Figure 33A:
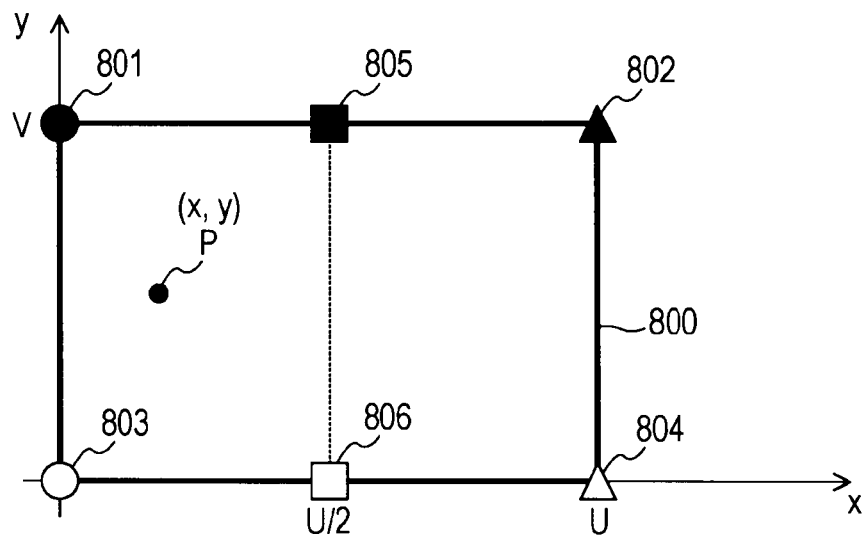
FIGS. 33A and 33B show an outline of a transform method for a panoramic image by the image transform unit according to the third embodiment of the present invention.
Figure 33B:
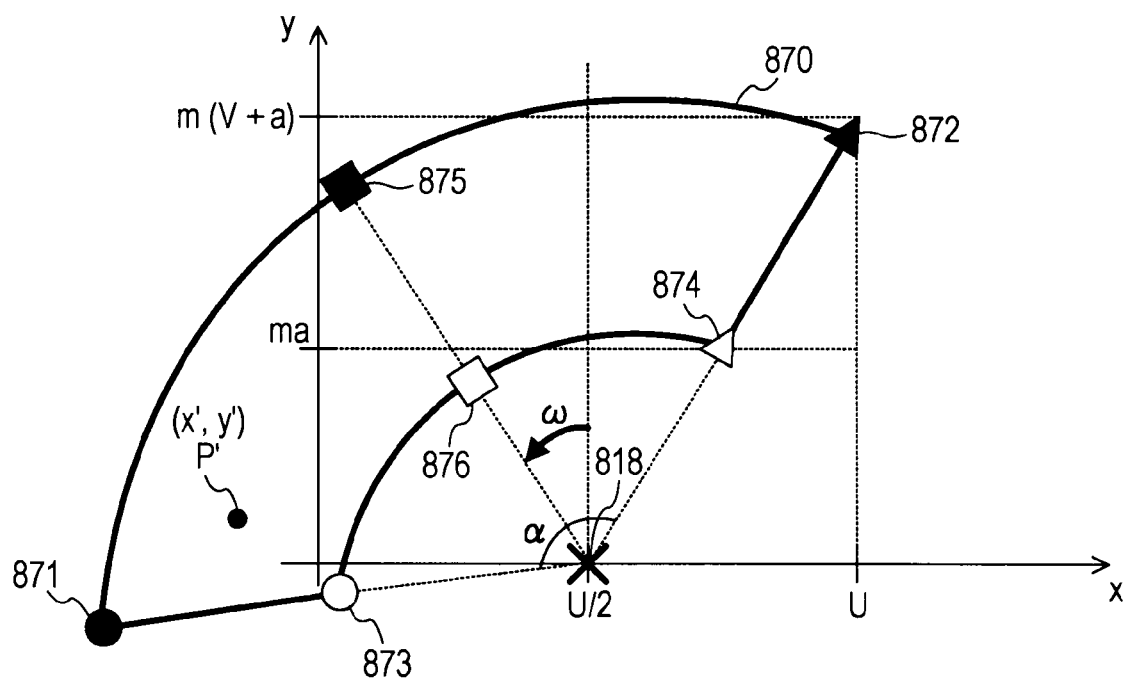

FIGS. 33A and 33B show an outline of a transform method for a panoramic image by the image transform unit 760 according to the third embodiment of the present invention. Herein, the transform method shown in FIGS. 33A and 33B is a modified example of the transform method shown in FIG. 23 and is identical except that the rotation processing is carried out by an angle w defined by the orientation on the map and the orientation at the representative position in the panoramic image. For this reason, in the following, different points from the transform method shown in FIG. 23 will be mainly described. The common part is assigned with the same reference numeral, and a description thereof will be omitted. FIG. 33A schematically shows the panoramic image 800 before by a rectangular similarly as in FIG. 23A.

FIG. 33B shows a panoramic image 870 after the transform into the fan-like shape. It should be noted that in the xy coordinates shown in FIG. 33B, the positions of the respective points corresponding to the points 801 to 806 shown in FIG. 33A are assigned with the same styles shown in FIG. 23A.

For example, as shown in FIG. 33B, in a case where the panoramic image 800 is transformed into the fan-like shape to generate the panoramic image 870, by using the following Expression 10 and Expression 11, coordinates P1 (x, y) contained in the panoramic image 800 are transformed into coordinates P1' (x', y').

$$x'=(U/2)+m\cdot(y+a)\cdot\cos([90+\alpha\{(U/2-x)/U\}+\omega]\cdot(\pi/180))\quad\text{Expression 10}$$

$$y'=m\cdot(y+a)\cdot\sin([90+\alpha\{(U/2-x)/U\}+\omega]\cdot(\pi/180))\quad\text{Expression 11}$$

Herein, ω is a value indicating the rotation angle and denotes an angle defined by the orientation on the map and the orientation at the representative position in the panoramic image. By using the above-mentioned Expression 10 and Expression 11, the two-stage transform processings are not carried out in which the rotation processing in accordance with the orientation is performed after the fan-like shape is generated by using Expression 8 and Expression 9. That is, the transform processing of matching the orientation on the map with the orientation at the representative position in the panoramic image can be performed through the one-stage transform processing, the panoramic image having the fan-like shape taking into account the orientation can be generated promptly.

In this manner, according to the embodiments of the present invention, at the time of recording the panoramic image, the orientation at the representative position in the panoramic image can be recorded. Also, in a case where a part of the image is extracted from the panoramic image, the orientation at the representative position in the extracted image is calculated, and this orientation can be used for the extracted image. Also, by using the orientation of the subject contained in the panoramic image, the desired image can be extracted from the panoramic image. Furthermore, when the panoramic image is displayed, by using the orientation of the subject contained in the panoramic image, the panoramic image can be transformed and displayed. That is, according to the embodiments of the present invention, it is possible to appropriately use the orientation related to the panoramic image.

4. Modified Examples

It should be noted that according to the embodiments of the present invention, the image pickup apparatus has been described as the example, but the embodiments of the present invention can be applied to electronic devices such as image processing apparatuses like a mobile phone device provided with an image pickup function, a personal computer, a car navigation system, and the like which can deal with the panoramic image. Also, the embodiments of the present invention can be applied to electronic devices such as image processing apparatuses which can output the image extracted from the panoramic image or the panoramic images after the transform to another display apparatus and display these images on the display apparatus.

It should be noted that the embodiments of the present invention have been described as an example for embodying the present invention, and as specified in the embodiments of the present invention, the items according to the embodiments of the present invention respectively have corresponding relations with invention identification items in the scope of the claims. Similarly, the invention identification item in the scope of the claims has the corresponding relation with the item according to the embodiments of the present invention having the same name as the invention identification item. It should be however noted that the present invention is not limited to the embodiments, and various modifications can be applied on the embodiments to embody the present invention within a range not departing form the gist of the present invention.

Also, the processing procedures described according to the embodiments of the present invention can be treated as a method including the series of these steps. Also, the series of these processings can be treated as a program for instructing a computer to execute the processings or a recording medium storing the program. As this recording medium, for example, a CD (Compact Disc), an MD (MiniDisc), a DVD (Digital Versatile Disk), a memory card, Blu-ray Disc (registered trademark), and the like can be used.

The present application contains subject matter related to that disclosed in Japanese Priority Patent Application JP 2009-127127 filed in the Japan Patent Office on May 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
   circuitry configured to
      accept a specification operation that specifies a range of a part in a panoramic image generated by combining a plurality of pickup images,
      extract an image included in the specified range from the panoramic image,
      calculate an orientation with respect to Earth and corresponding to a representative position in the extracted image on the basis of characteristic information of an image pickup circuit by which the plurality of pickup images are generated, a representative position in the panoramic image, an orientation corresponding to the representative position, and the representative position in the extracted image, and record the calculated orientation in association with the extracted image.

2. An electronic device comprising:
   circuitry configured to
      accept a specification operation that specifies a range of a part in a panoramic image generated by combining a plurality of pickup images,
      extract an image included in the specified range from the panoramic image,
      calculate an orientation with respect to Earth at the representative position in the extracted image on the basis of a size in a horizontal direction in the panoramic image, an angle corresponding to an image pickup range for the panoramic image, a representative position in the panoramic image, an orientation associated with the representative position, and the representative position in the extracted image, and
      record the calculated orientation in association with the extracted image.

3. An electronic device comprising:
   circuitry configured to
      extract an image included in a specified range from a panoramic image which is generated by combining a plurality of captured images, and
      calculate an orientation with respect to Earth and associated with a representative position of the extracted image according to an orientation associated with a representative position of the panoramic image and a position of the extracted image within the panoramic image.

4. The electronic device according to claim 3, wherein the circuitry is further configured to associate the orientation calculated with the extracted image.

5. The electronic device according to claim 4, wherein the circuitry associates the orientation calculated with the extracted image by recording the orientation calculated with the extracted image.

6. The electronic device according to claim 3, wherein the representative position is a center position of the panoramic image.

7. The electronic device according to claim 3, wherein the panoramic image is generated by combining a plurality of captured images, and
the representative position is a position of a first image in a time axis among the plurality of captured images.

8. The electronic device according to claim 7, wherein the representative position is a center position of the first image.

9. A method comprising:
extracting an image included in a specified range from a panoramic image which is generated by combining a plurality of captured images; and
calculating an orientation with respect to Earth and associated with a representative position of the extracted image according to an orientation associated with a representative position of the panoramic image and a position of the extracted image within the panoramic image.

10. The method according to claim 9, further comprising associating the orientation calculated at the calculating to the extracted image.

11. The method according to claim 10, wherein the orientation calculated at the calculating is associated to the extracted image by recording the orientation calculated at the calculating with the extracted image.

12. The method according to claim 9, wherein the representative position is a center position of the panoramic image.

13. The method according to claim 9, wherein the panoramic image is generated by combining a plurality of captured images, and
the representative position is a position of a first image in a time axis among the plurality of captured images.

14. The method according to claim 13, wherein the representative position is a center position of the first image.

15. A non-transitory computer-readable storage medium storing computer-readable instructions thereon, which, when executed by a computer, cause the computer to perform a method comprising:
extracting an image included in a specified range from a panoramic image which is generated by combining a plurality of captured images; and
calculating an orientation with respect to Earth and associated with a representative position of the extracted image according to an orientation associated with a representative position of the panoramic image and a position of the extracted image within the panoramic image.

16. The non-transitory computer-readable storage medium according to claim 15, further comprising associating the orientation calculated at the calculating to the extracted image.

17. The non-transitory computer-readable storage medium according to claim 16, wherein the orientation calculated at the calculating is associated to the extracted image by recording the orientation calculated at the calculating with the extracted image.

18. The non-transitory computer-readable storage medium according to claim 15, wherein the representative position is a center position of the panoramic image.

19. The non-transitory computer-readable storage medium according to claim 15, wherein the panoramic image is generated by combining a plurality of captured images, and
the representative position is a position of a first image in a time axis among the plurality of captured images.

20. The non-transitory computer-readable storage medium according to claim 19, wherein the representative position is a center position of the first image.

* * * * *